US011859601B2

(12) United States Patent
Son et al.

(10) Patent No.: US 11,859,601 B2
(45) Date of Patent: Jan. 2, 2024

(54) FLUID ROUTING PLUG

(71) Applicant: Kerr Machine Co., Sulphur, OK (US)

(72) Inventors: Nicholas Son, Davis, OK (US); Micheal Cole Thomas, Ardmore, OK (US); Christopher Todd Barnett, Stratford, OK (US); Kelcy Jake Foster, Ardmore, OK (US); John Keith, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 18/341,070

(22) Filed: Jun. 26, 2023

(65) Prior Publication Data
US 2023/0332584 A1 Oct. 19, 2023

Related U.S. Application Data

(63) Continuation of application No. 17/884,736, filed on Aug. 10, 2022, now Pat. No. 11,686,296, which is a
(Continued)

(51) Int. Cl.
*F04B 15/02* (2006.01)
*F04B 1/0452* (2020.01)
(Continued)

(52) U.S. Cl.
CPC ............ *F04B 15/02* (2013.01); *F04B 1/0452* (2013.01); *F04B 1/0538* (2013.01); *F04B 7/0003* (2013.01); *F04B 7/0088* (2013.01); *F04B 7/0208* (2013.01); *F04B 53/1022* (2013.01); *F04B 53/1032* (2013.01);
(Continued)

(58) Field of Classification Search
CPC ........ F04B 53/22; F04B 53/16; F04B 53/162; F04B 39/14; F04B 39/12; F04B 39/121; F04B 39/122; F04B 39/127; F04B 35/002; F04B 7/0084; F04B 7/0003; F04B 11/0091; F04B 53/1087; F04B 1/0452; F04B 53/007; F04B 53/109; F04B 15/02; F04B 1/0538; F04B 53/1022; F04B 53/1032; F04B 7/0266; F04B 7/0208; F04B 7/0088; F16L 55/11; F16L 39/00; F16K 15/066; F16K 11/105
See application file for complete search history.

(56) References Cited

U.S. PATENT DOCUMENTS 677,137 A 6/1901 Leavitt
2,771,846 A 11/1956 Horton et al.
(Continued)

FOREIGN PATENT DOCUMENTS

CN 105756880 A 7/2016
CN 108843531 A 11/2018
(Continued)

*Primary Examiner* — Bryan M Lettman
(74) *Attorney, Agent, or Firm* — Tomlinson McKinstry, P.C.

(57) ABSTRACT

A fluid routing plug for use with a fluid end section. The fluid end section being one of a plurality of fluid end sections making up a fluid end side of a high pressure pump. The fluid routing plug is installed within a horizontal bore formed in a fluid end section and is configured to route fluid throughout the fluid end section.

20 Claims, 68 Drawing Sheets

Related U.S. Application Data continuation-in-part of application No. 17/668,529, filed on Feb. 10, 2022, now Pat. No. 11,578,711, which is a continuation-in-part of application No. 16/951,605, filed on Nov. 18, 2020, now Pat. No. 11,300,111, said application No. 17/668,529 is a continuation-in-part of application No. 17/550,552, filed on Dec. 14, 2021, now Pat. No. 11,644,018, which is a continuation-in-part of application No. 17/515,707, filed on Nov. 1, 2021, now Pat. No. 11,359,615, which is a continuation of application No. 16/951,741, filed on Nov. 18, 2020, now Pat. No. 11,162,479.

(60) Provisional application No. 63/235,251, filed on Aug. 20, 2021, provisional application No. 62/936,789, filed on Nov. 18, 2019, provisional application No. 62/940,513, filed on Nov. 26, 2019, provisional application No. 62/953,763, filed on Dec. 26, 2019, provisional application No. 62/957,489, filed on Jan. 6, 2020, provisional application No. 62/959,570, filed on Jan. 10, 2020, provisional application No. 62/960,194, filed on Jan. 13, 2020, provisional application No. 62/960,366, filed on Jan. 13, 2020, provisional application No. 62/968,634, filed on Jan. 31, 2020, provisional application No. 62/990,817, filed on Mar. 17, 2020, provisional application No. 63/008,036, filed on Apr. 10, 2020, provisional application No. 63/018,021, filed on Apr. 30, 2020, provisional application No. 63/019,789, filed on May 4, 2020, provisional application No. 63/027,584, filed on May 20, 2020, provisional application No. 63/033,244, filed on Jun. 2, 2020, provisional application No. 63/040,086, filed on Jun. 17, 2020, provisional application No. 63/125,459, filed on Dec. 15, 2020, provisional application No. 63/148,065, filed on Feb. 10, 2021, provisional application No. 63/150,340, filed on Feb. 17, 2021, provisional application No. 63/155,835, filed on Mar. 3, 2021, provisional application No. 63/168,364, filed on Mar. 31, 2021, provisional application No. 63/283,487, filed on Nov. 28, 2021, provisional application No. 63/233,241, filed on Aug. 14, 2021, provisional application No. 63/240,889, filed on Sep. 4, 2021, provisional application No. 63/246,099, filed on Sep. 20, 2021, provisional application No. 63/301,524, filed on Jan. 21, 2022, provisional application No. 63/304,070, filed on Jan. 28, 2022, provisional application No. 63/310,269, filed on Feb. 15, 2022, provisional application No. 63/312,541, filed on Feb. 22, 2022, provisional application No. 63/309,168, filed on Feb. 11, 2022, provisional application No. 63/046,826, filed on Jul. 1, 2020, provisional application No. 63/076,587, filed on Sep. 10, 2020, provisional application No. 63/089,882, filed on Oct. 9, 2020, provisional application No. 63/053,797, filed on Jul. 20, 2020.

(51) Int. Cl.
| | | |
|---|---|---|
| *F04B 1/0538* | (2020.01) | |
| *F04B 7/00* | (2006.01) | |
| *F04B 7/02* | (2006.01) | |
| *F04B 53/10* | (2006.01) | |
| *F04B 53/16* | (2006.01) | |
| *F04B 53/22* | (2006.01) | |
| *F16K 11/10* | (2006.01) | |
| *F16L 55/11* | (2006.01) | |

(52) U.S. Cl.
CPC ............ *F04B 53/162* (2013.01); *F04B 53/22* (2013.01); *F16K 11/105* (2013.01); *F16L 55/11* (2013.01); *F04B 7/0084* (2013.01); *F04B 7/0266* (2013.01)

(56) References Cited

U.S. PATENT DOCUMENTS

| | | | |
|---|---|---|---|
| 2,828,696 | A | 4/1958 | Wright |
| 3,062,198 | A | 11/1961 | Richardson |
| 3,181,473 | A | 5/1965 | Duron |
| 3,309,013 | A | 3/1967 | Bauer |
| 3,370,545 | A | 2/1968 | Waibel |
| 3,508,849 | A | 4/1970 | Weber |
| 3,528,613 | A | 9/1970 | Berlyn |
| 3,531,052 | A | 9/1970 | Berlyn |
| 3,702,624 | A | 11/1972 | Fries |
| 3,746,483 | A | 7/1973 | Hindel |
| 3,777,779 | A | 12/1973 | Scwaller |
| 4,078,574 | A | 3/1978 | Kosarzecki |
| 4,174,194 | A | 11/1979 | Hammelmann |
| 4,412,792 | A | 11/1983 | LaBorde |
| 4,551,077 | A | 11/1985 | Pacht |
| 4,616,983 | A | 10/1986 | Hanafi |
| 4,878,815 | A | 11/1989 | Stachowiak |
| 5,037,276 | A | 8/1991 | Tremoulet |
| 5,059,101 | A | 10/1991 | Valvaara |
| 5,064,354 | A | 11/1991 | Robertson |
| 5,127,807 | A | 7/1992 | Eslinger |
| 5,230,363 | A | 7/1993 | Winn, Jr. et al. |
| 5,253,987 | A * | 10/1993 | Harrison ............... F04B 53/108 417/571 |
| 5,302,087 | A | 4/1994 | Pacht |
| 5,382,057 | A | 1/1995 | Richter |
| 5,605,449 | A | 2/1997 | Reed |
| 5,636,975 | A | 6/1997 | Tiffany et al. |
| 5,924,853 | A | 7/1999 | Pacht |
| 6,231,323 | B1 * | 5/2001 | Jezek .................... F04B 53/164 137/493.9 |
| 6,341,950 | B1 | 1/2002 | Schuller et al. |
| 8,240,634 | B2 | 8/2012 | Jarchau et al. |
| 9,188,122 | B1 | 11/2015 | Reed |
| 9,328,745 | B2 | 5/2016 | Bartlok et al. |
| 9,371,919 | B2 | 6/2016 | Forrest et al. |
| 9,670,922 | B2 * | 6/2017 | Pacht ..................... F04B 1/145 |
| 10,184,470 | B2 | 1/2019 | Barnett |
| 2009/0194717 | A1 * | 8/2009 | Jarchau ............... F04B 53/1022 251/12 |
| 2012/0272764 | A1 | 11/2012 | Pendleton |
| 2013/0045123 | A1 | 2/2013 | Roman et al. |
| 2013/0263932 | A1 | 10/2013 | Baxter |
| 2014/0127062 | A1 | 5/2014 | Buckley et al. |
| 2014/0348677 | A1 | 11/2014 | Moeller |
| 2015/0071803 | A1 * | 3/2015 | Huang ................ F04B 39/1046 417/560 |
| 2015/0144826 | A1 * | 5/2015 | Bayyouk .............. F04B 53/1087 251/359 |
| 2015/0147194 | A1 | 5/2015 | Foote |
| 2015/0211641 | A1 * | 7/2015 | Pacht ..................... F04B 1/145 251/359 |
| 2016/0090980 | A1 | 3/2016 | Howard et al. |
| 2019/0017503 | A1 | 1/2019 | Foster et al. |
| 2019/0032685 | A1 | 1/2019 | Foster et al. |
| 2019/0040966 | A1 * | 2/2019 | Myers ..................... F16K 1/42 |
| 2019/0063427 | A1 | 2/2019 | Nowell et al. |
| 2019/0128104 | A1 | 5/2019 | Graham |
| 2020/0182240 | A1 | 6/2020 | Nowell et al. |

(56) References Cited

U.S. PATENT DOCUMENTS

2022/0243724 A1 8/2022 Li
2022/0260161 A1 8/2022 Nowell et al.

FOREIGN PATENT DOCUMENTS

CN 109989912 A 7/2019
CN 111255677 A 6/2020

* cited by examiner

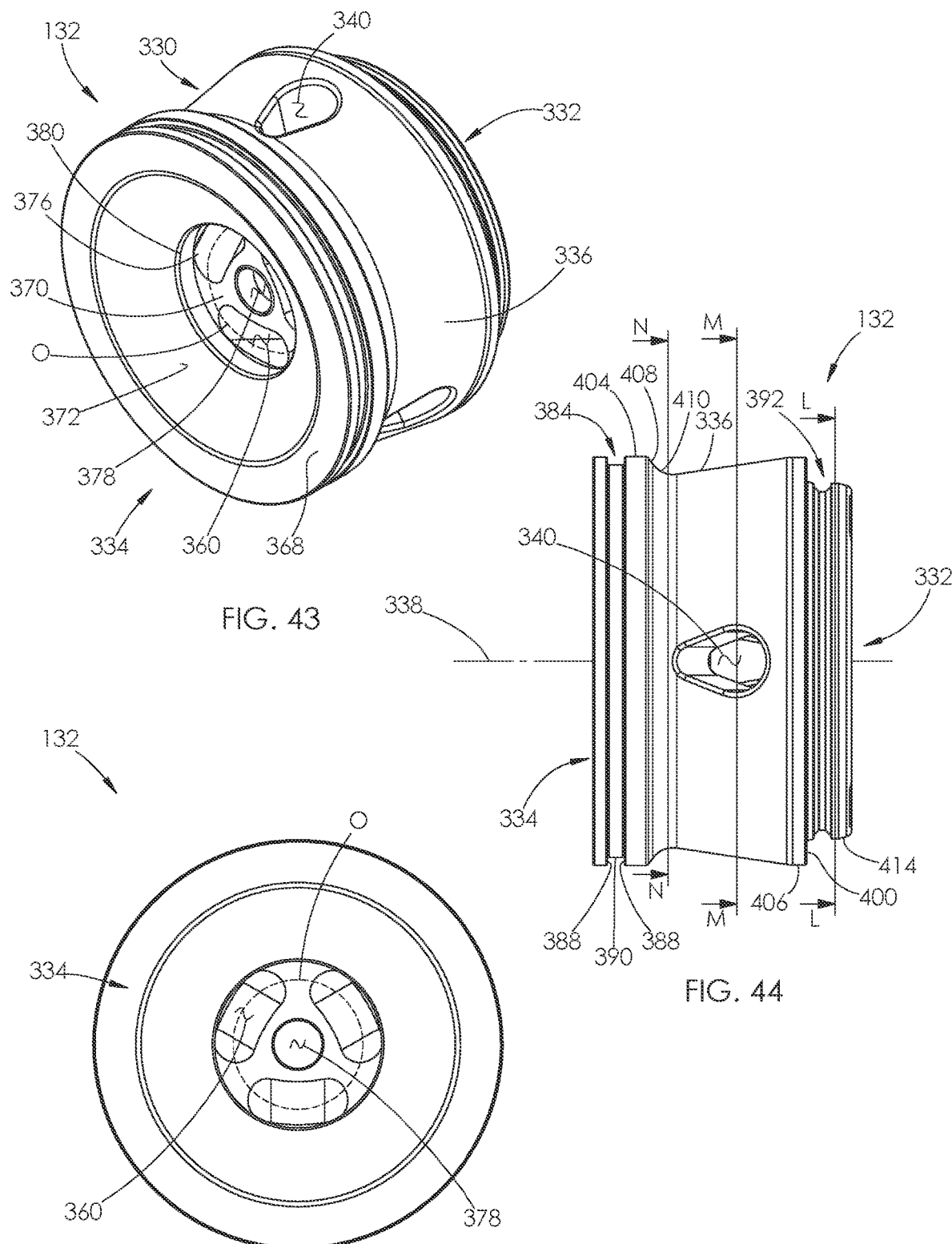

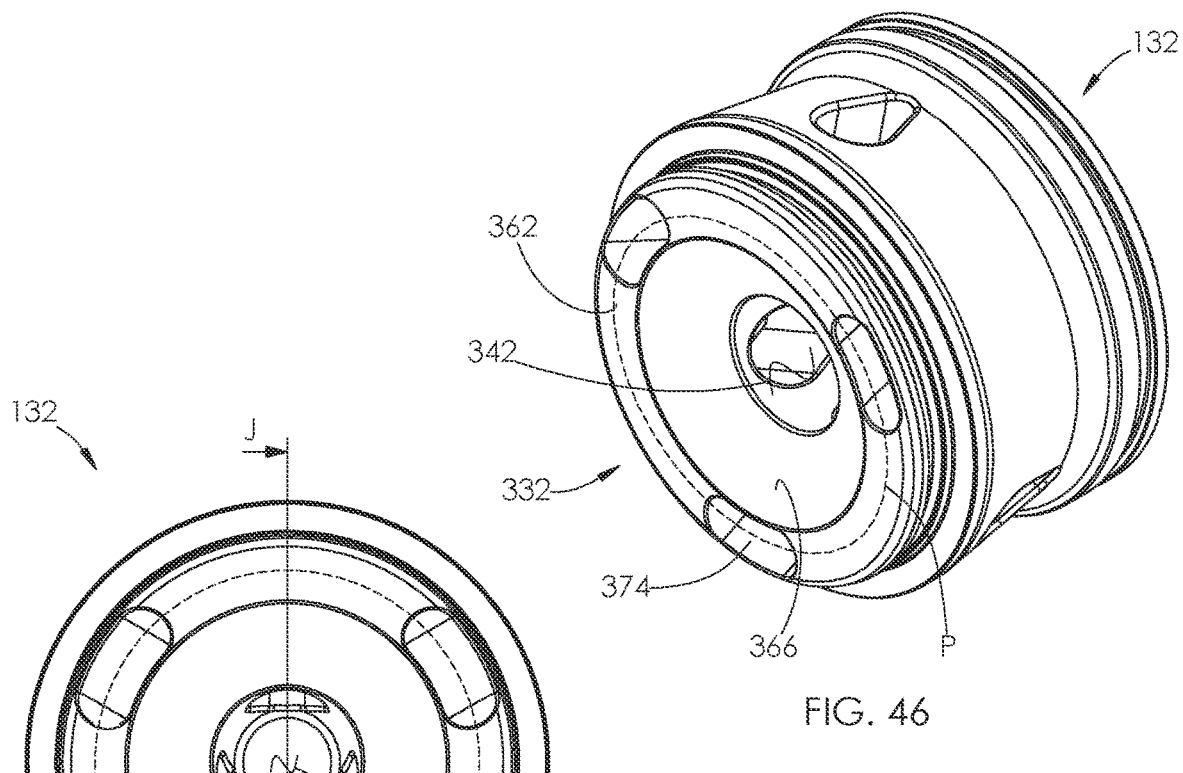
FIG. 46
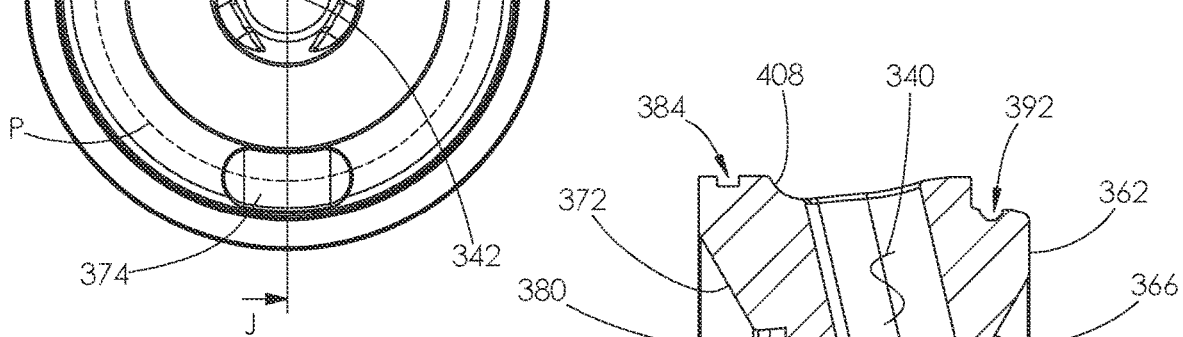
FIG. 47
FIG. 48

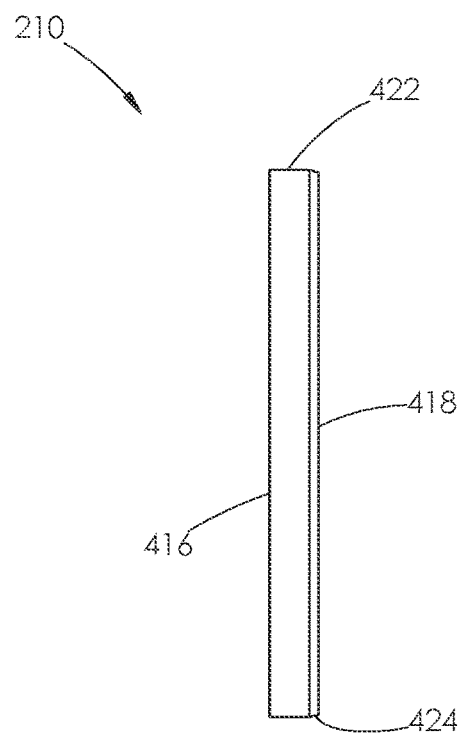 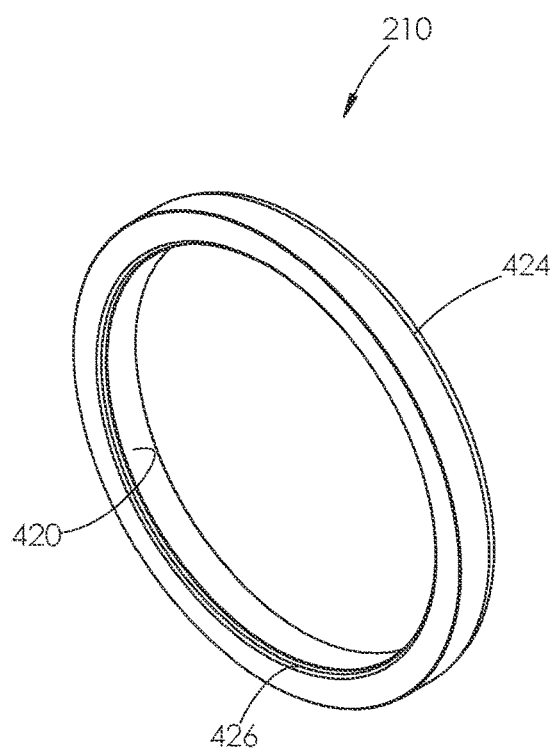
FIG. 60  FIG. 61
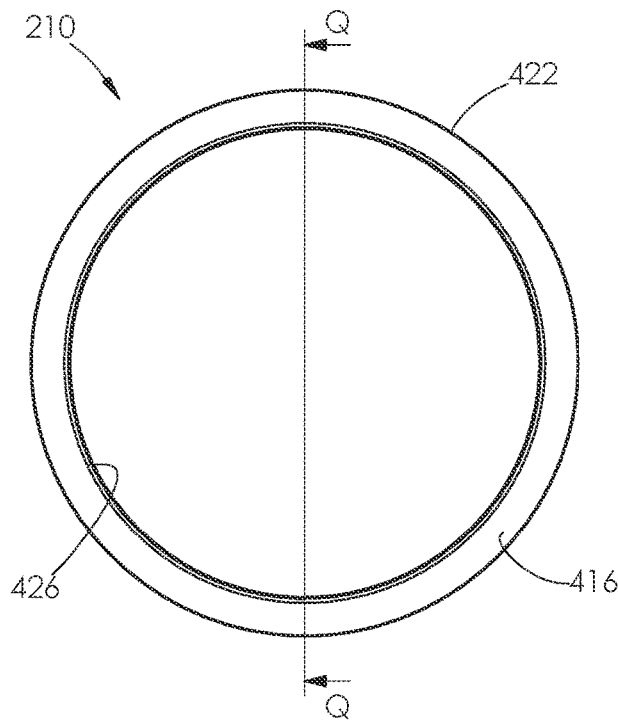 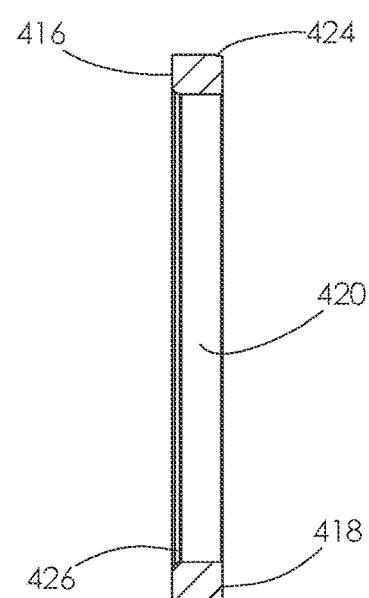
FIG. 62  FIG. 63

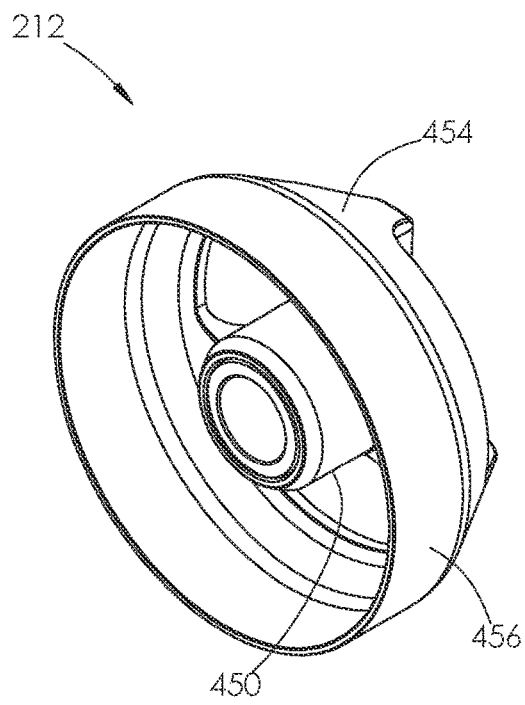 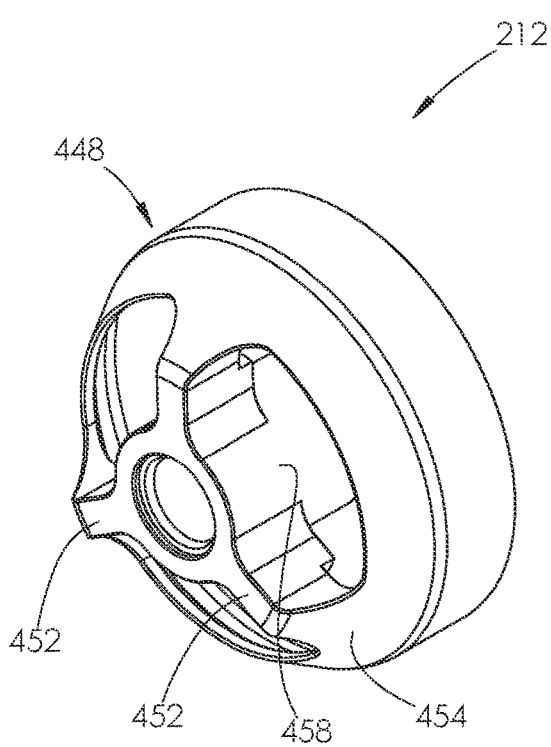
FIG. 68     FIG. 69
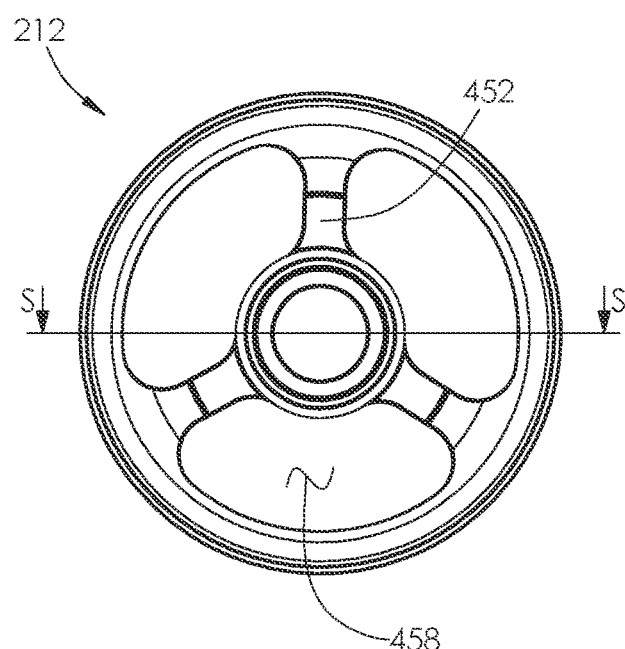 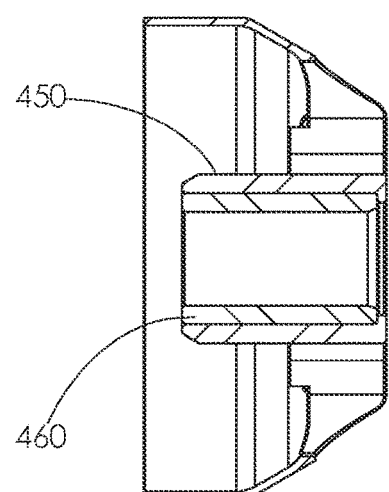
FIG. 70     FIG. 71

FLUID ROUTING PLUG

RELATED APPLICATIONS

This application is a Continuation of U.S. patent application Ser. No. 17/884,736, authored by Son et al., and filed on Aug. 10, 2022, which is a Continuation-in-Part of U.S. patent application Ser. No. 17/668,529, authored by Thomas et al., and filed on Feb. 10, 2022, the entire contents of which are incorporated herein by reference (hereinafter "the '529 application"). This application also claims the benefit of the following U.S. provisional patent applications: Ser. No. 63/233,241, authored by Foster et al, and filed on Aug. 14, 2021; Ser. No. 63/235,251, authored by Foster et al., and filed on Aug. 20, 2021; Ser. No. 63/240,889, authored by Foster et al., and filed on Sep. 4, 2021; Ser. No. 63/246,099, authored by Foster et al., and filed on Sep. 20, 2021; Ser. No. 63/301,524, authored by Foster et al., and filed on Jan. 21, 2022; Ser. No. 63/304,070, authored by Foster et al., and filed on Jan. 28, 2022; Ser. No. 63/310,269, authored by Foster et al., and filed on Feb. 15, 2022; and Ser. No. 63/312,541, authored by Foster et al., and filed on Feb. 22, 2022. The entire contents of all of the above listed provisional patent applications are incorporated herein by reference.

BACKGROUND

Various industrial applications may require the delivery of high volumes of highly pressurized fluids. For example, hydraulic fracturing (commonly referred to as "fracking") is a well stimulation technique used in oil and gas production, in which highly pressurized fluid is injected into a cased wellbore. As shown for example in FIG. 1, the pressured fluid flows through perforations 10 in a casing 12 and creates fractures 14 in deep rock formations 16. Pressurized fluid is delivered to the casing 12 through a wellhead 18 supported on the ground surface 20. Sand or other small particles (commonly referred to as "proppants") are normally delivered with the fluid into the rock formations 16. The proppants help hold the fractures 14 open after the fluid is withdrawn. The resulting fractures 14 facilitate the extraction of oil, gas, brine, or other fluid trapped within the rock formations 16.

Fluid ends are devices used in conjunction with a power source to pressurize the fluid used during hydraulic fracturing operations. A single fracking operation may require the use of two or more fluid ends at one time. For example, six fluid ends 22 are shown operating at a wellsite 24 in FIG. 2. Each of the fluid ends 22 is attached to a power end 26 in a one-to-one relationship. The power end 26 serves as an engine or motor for the fluid end 22. Together, the fluid end 22 and power end 26 function as a high pressure pump.

Continuing with FIG. 2, a single fluid end 22 and its corresponding power end 26 are typically positioned on a truck bed 28 at the wellsite 24 so that they may be easily moved, as needed. The fluid and proppant mixture to be pressurized is normally held in large tanks 30 at the wellsite 24. An intake piping system 32 delivers the fluid and proppant mixture from the tanks 30 to each fluid end 22. A discharge piping system 33 transfers the pressurized fluid from each fluid end 22 to the wellhead 18, where it is delivered into the casing 12 shown in FIG. 1.

Fluid ends operate under notoriously extreme conditions, enduring the same pressures, vibrations, and abrasives that are needed to fracture the deep rock formations 16, shown in FIG. 1. Fluid ends may operate at pressures of 5,000-15,000 pounds per square inch (psi) or greater. Fluid used in hydraulic fracturing operations is typically pumped through the fluid end at a pressure of at least 8,000 psi, and more typically between 10,000 and 15,000 psi. However, the pressure may reach up to 22,500 psi. The power end used with the fluid end typically has a power output of at least 2,250 horsepower during hydraulic fracturing operations. A single fluid end typically produces a fluid volume of about 400 gallons, or 10 barrels, per minute during a fracking operation. A single fluid end may operate in flow ranges from 170 to 630 gallons per minute, or approximately 4 to 15 barrels per minute. When a plurality of fluid ends are used together, the fluid ends collectively may deliver as much as 4,200 gallons per minute or 100 barrels per minute to the wellbore.

In contrast, mud pumps known in the art typically operate at a pressure of less than 8,000 psi. Mud pumps are used to deliver drilling mud to a rotating drill bit within the wellbore during drilling operations. Thus, the drilling mud does not need to have as high of fluid pressure as fracking fluid. A fluid end does not pump drilling mud. A power end used with mud pumps typically has a power output of less than 2,250 horsepower. Mud pumps generally produce a fluid volume of about 150-600 gallons per minute, depending on the size of pump used.

In further contrast, a fluid jetting pump known in the art typically operates at pressures of 30,000-90,000 psi. Jet pumps are used to deliver a highly concentrated stream of fluid to a desired area. Jet pumps typically deliver fluid through a wand. Fluid ends do not deliver fluid through a wand. Unlike fluid ends, jet pumps are not used in concert with a plurality of other jet pumps. Rather, only a single jet pump is used to pressurize fluid. A power end used with a jet pump typically has a power output of about 1,000 horsepower. Jet pumps generally produce a fluid volume of about 10 gallons per minute.

High operational pressures may cause a fluid end to expand or crack. Such a structural failure may lead to fluid leakage, which leaves the fluid end unable to produce and maintain adequate fluid pressures. Moreover, if proppants are included in the pressurized fluid, those proppants may cause erosion at weak points within the fluid end, resulting in additional failures.

It is not uncommon for conventional fluid ends to experience failure after only several hundred operating hours. Yet, a single fracking operation may require as many as fifty (50) hours of fluid end operation. Thus, a traditional fluid end may require replacement after use on as few as two fracking jobs. There is a need in the industry for a fluid end configured to avoid or significantly delay the structures or conditions that cause wear or failures within a fluid end.

BRIEF DESCRIPTION OF THE DRAWINGS

First Embodiment

FIG. 43 is a front perspective view of the fluid routing plug shown in FIGS. 40 and 41.

FIG. 44 is a side elevational view of the fluid routing plug shown in FIG. 43.

FIG. 45 is a front elevational view of the fluid routing plug shown in FIG. 43.

FIG. 46 is a rear perspective view of the fluid routing plug shown in FIG. 43.

FIG. 47 is a rear elevational view of the fluid routing plug shown in FIG. 43.

FIG. 48 is a cross-sectional view of the fluid routing plug shown in FIG. 47, taken along line J-J.

FIG. 60 is a side elevational view of the hardened insert shown in FIGS. 40 and 41.

FIG. 61 is a front perspective view of the hardened insert shown in FIG. 60.

FIG. 62 is a front elevational view of the hardened insert shown in FIG. 60.

FIG. 63 is a cross-sectional view of the hardened insert shown in FIG. 62, taken along line Q-Q.

FIG. 68 is a front perspective view of the suction valve guide shown in FIGS. 40 and 41.

FIG. 69 is a rear perspective view of the suction valve guide shown in FIG. 68.

FIG. 70 is a front elevational view of the suction valve guide shown in FIG. 68.

FIG. 71 is a cross-sectional view of the suction valve guide shown in FIG. 70, taken along line S-S.

Alternative Embodiments

Figure 81:
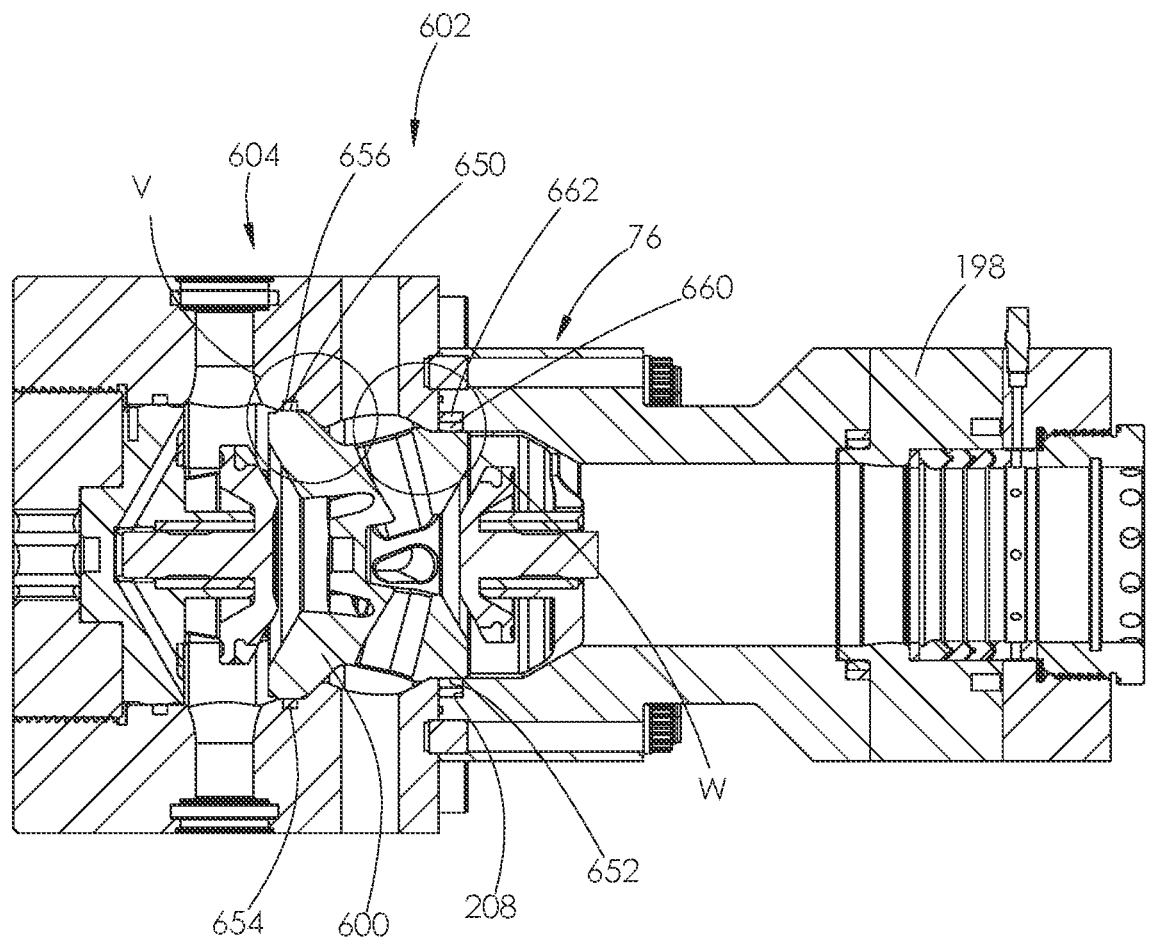

FIG. 81 is a cross-sectional view of an alternative embodiment of a fluid end section having an alternative embodiment of a fluid routing plug installed therein.

Figure 82:
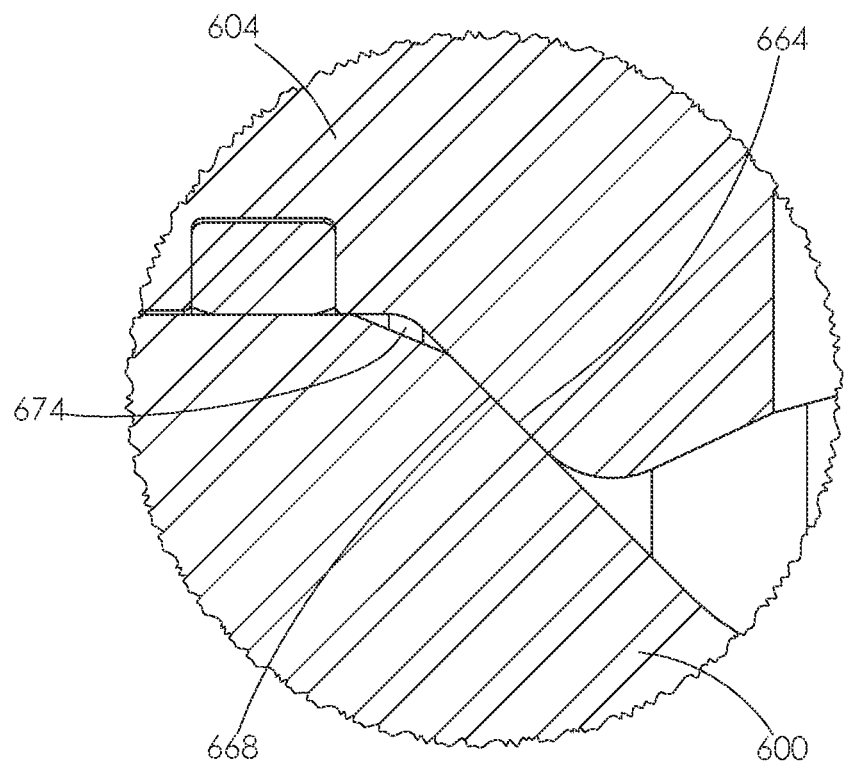

FIG. 82 is an enlarged view of area V shown in FIG. 81.

Figure 83:
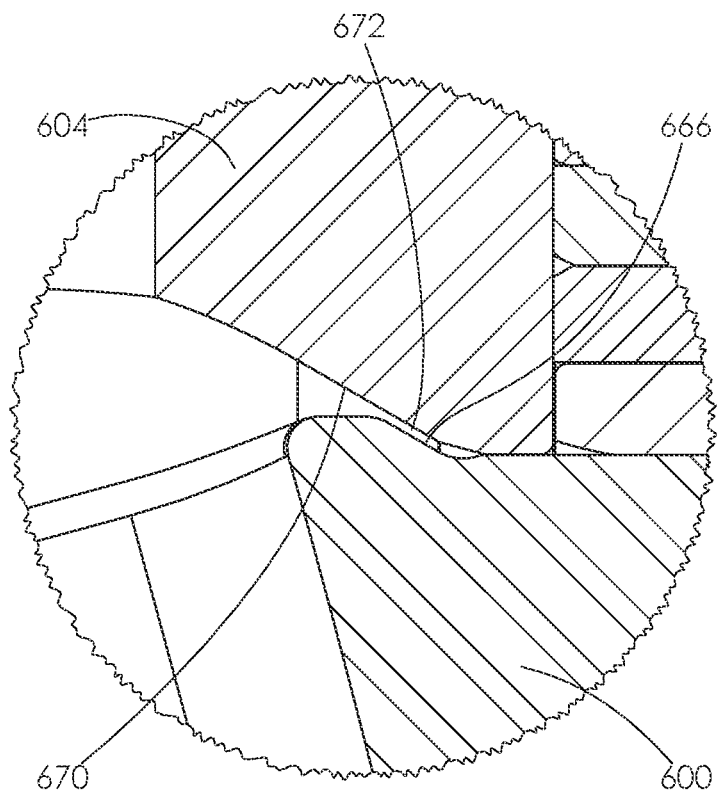

FIG. 83 is an enlarged view of area W shown in FIG. 81.

Figure 84:
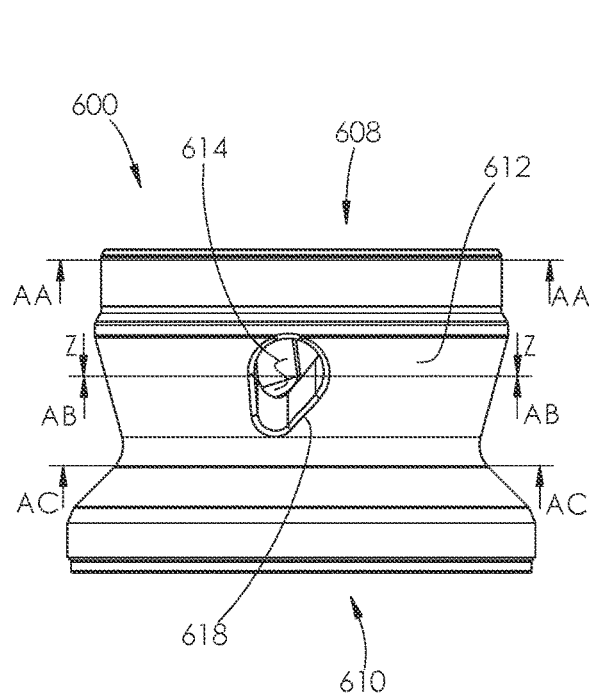

FIG. 84 is a top plan view of the fluid routing plug shown in FIG. 81.

Figure 85:
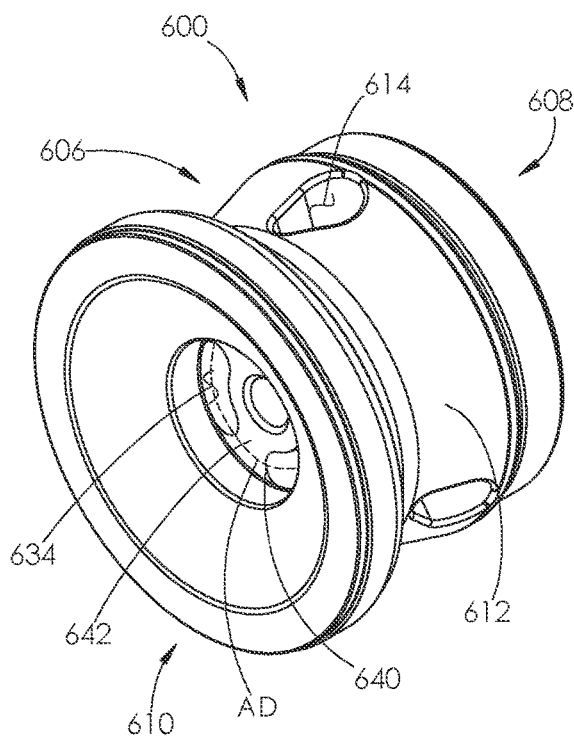

FIG. 85 is a front perspective view of the fluid routing plug shown in FIG. 84.

Figure 86:
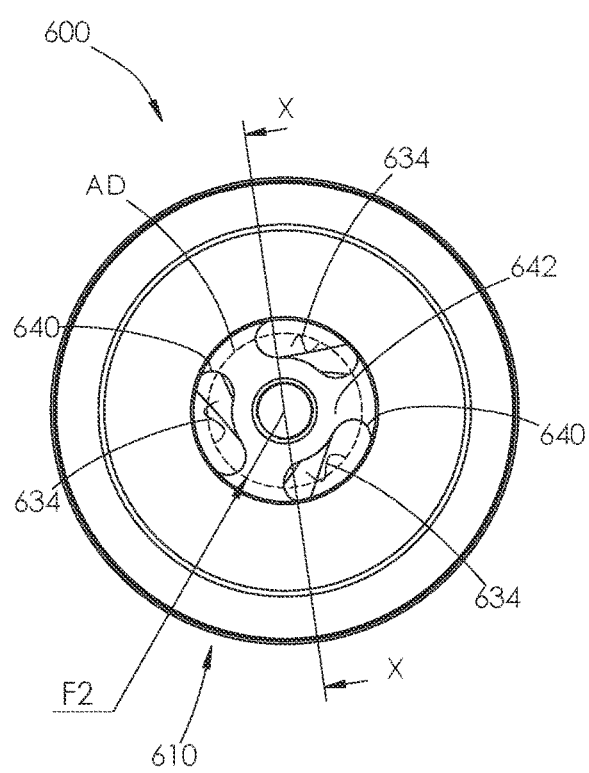

FIG. 86 is a front elevational view of the fluid routing plug shown in FIG. 84.

Figure 87:
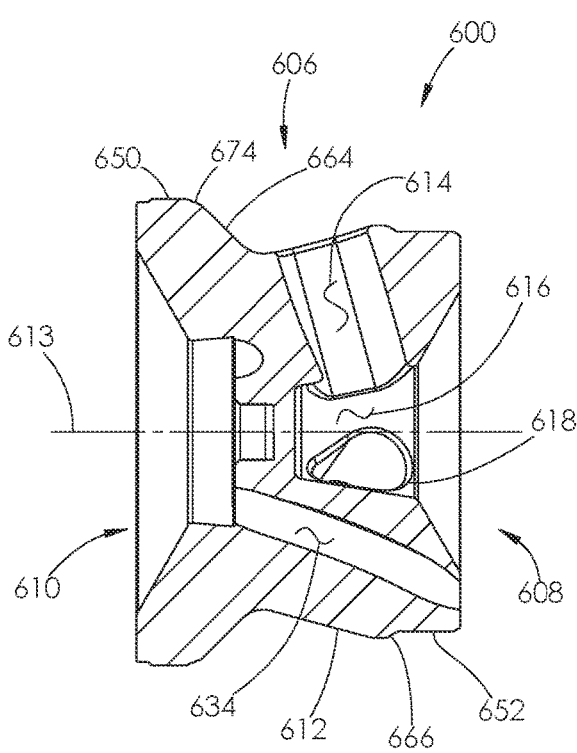

FIG. 87 is a cross-sectional view of the fluid routing plug shown in FIG. 86, taken along line X-X.

Figure 88:
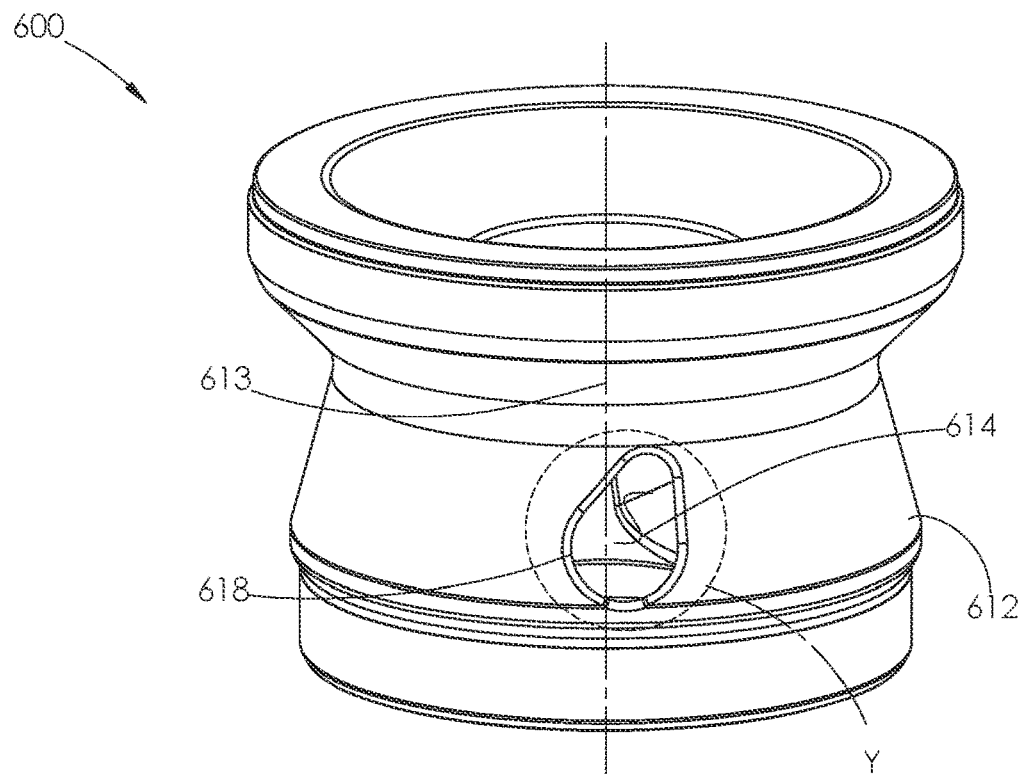

FIG. 88 is a top perspective view of the fluid routing plug shown in FIG. 84.

Figure 89:
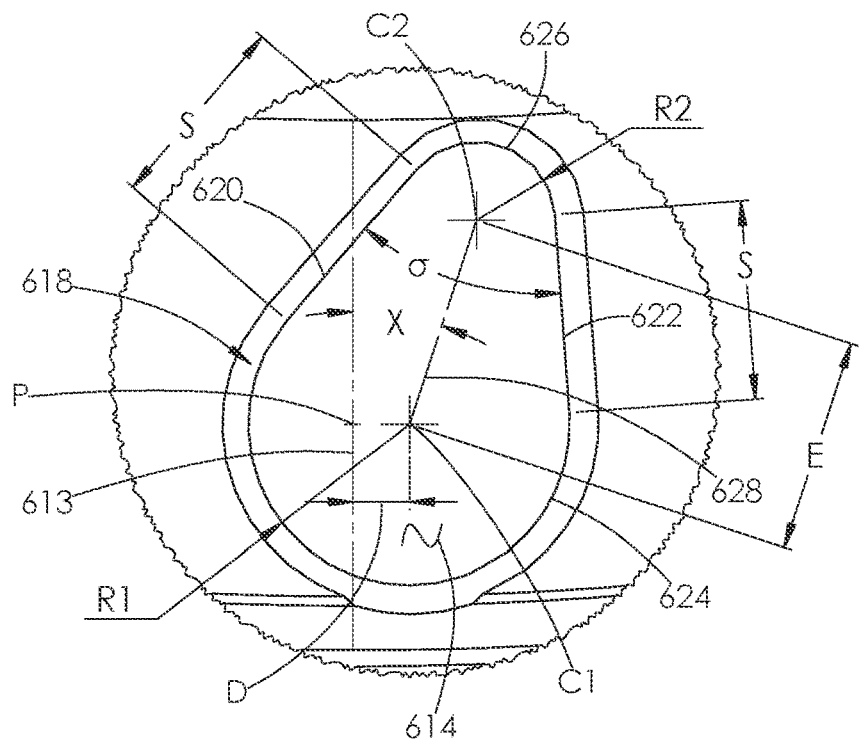

FIG. 89 is an enlarged view of area Y shown in FIG. 88.

Figure 90:
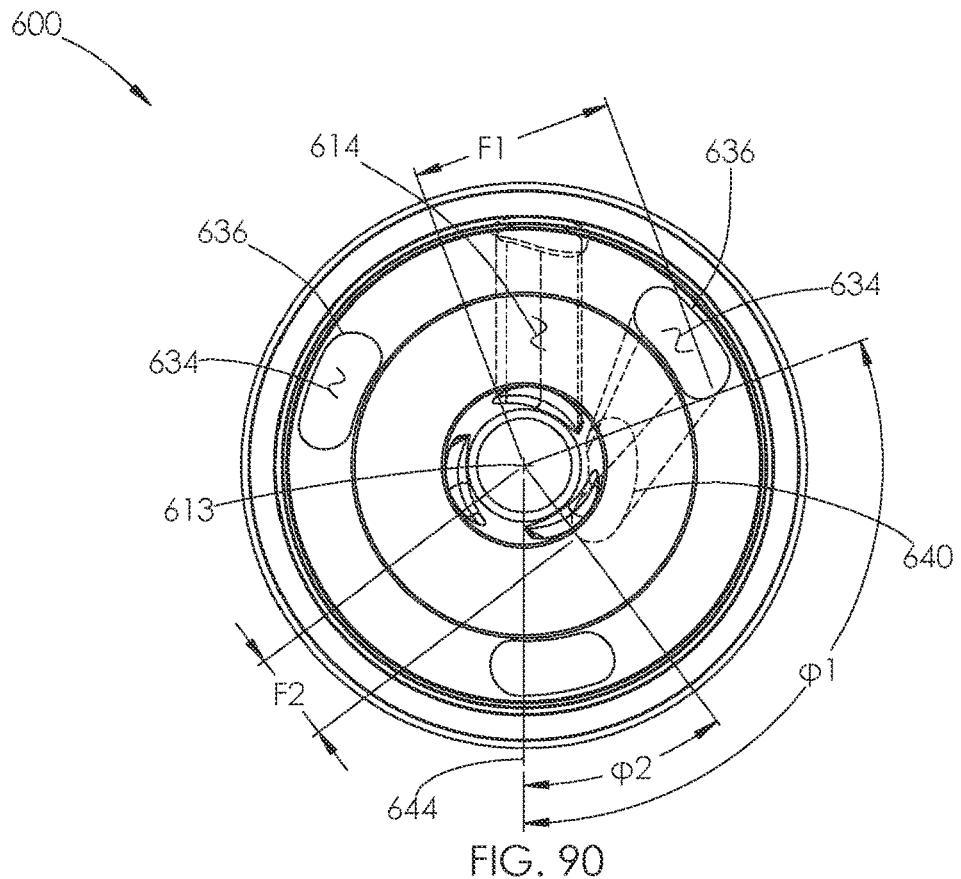

FIG. 90 is a rear elevational view of the fluid routing plug shown in FIG. 84, but one of the suction passages and one of the discharge passages are shown in phantom.

Figure 91:
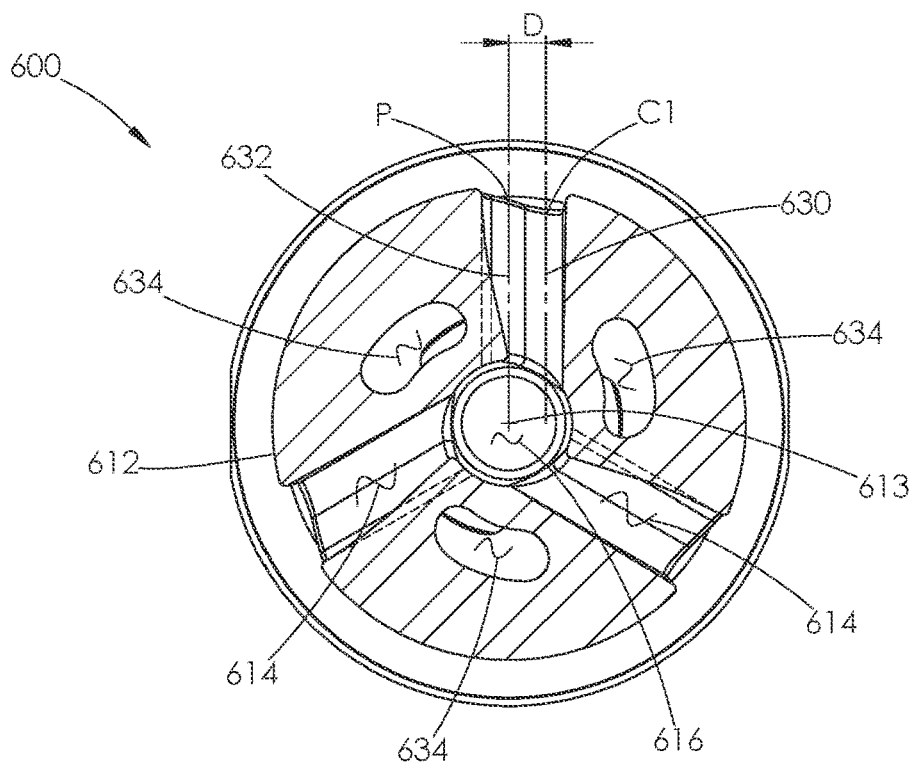

FIG. 91 is a cross-sectional view of the fluid routing plug shown in FIG. 84, taken along line Z-Z.

Figure 92:
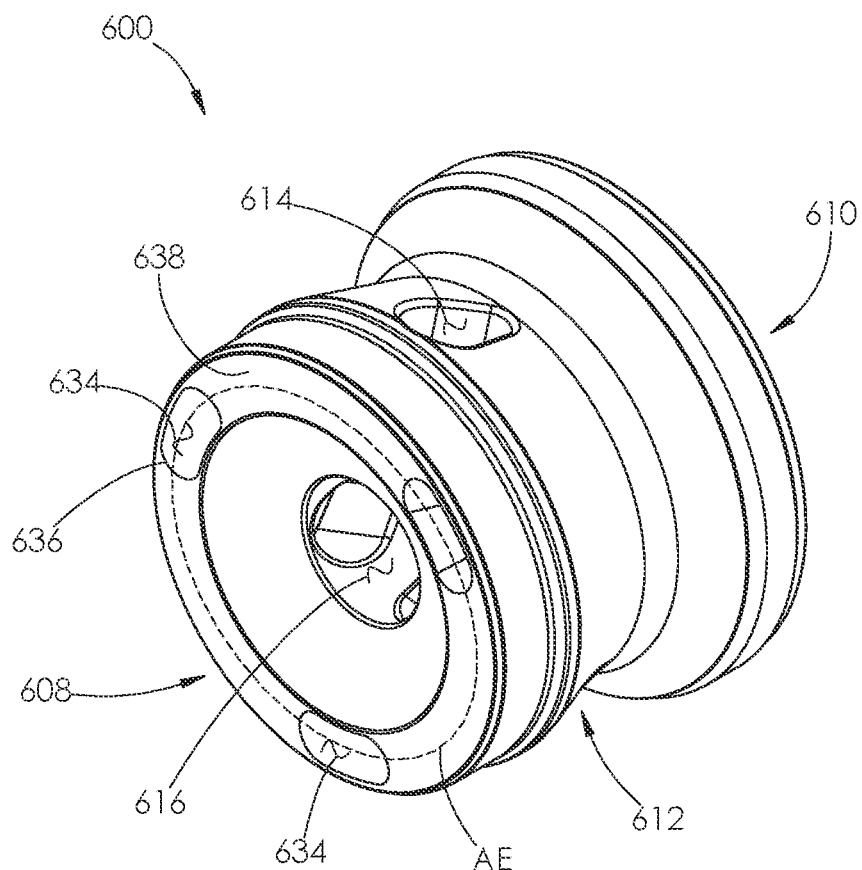

FIG. 92 is a rear perspective view of the fluid routing plug shown in FIG. 84.

Figure 93:
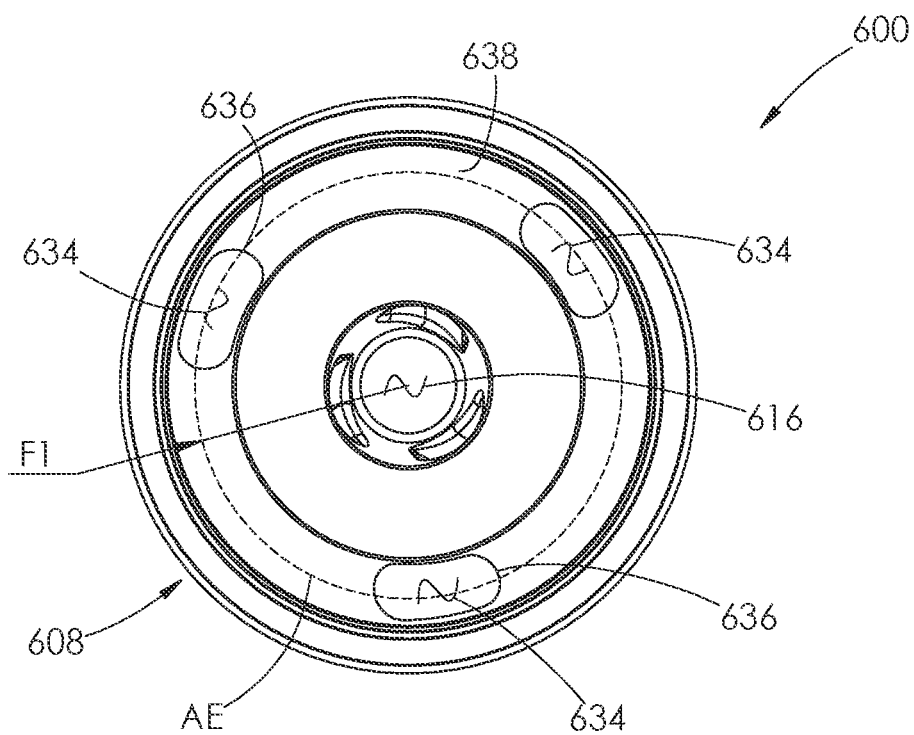

FIG. 93 is a rear elevational view of the fluid routing plug shown in FIG. 84.

Figure 94:
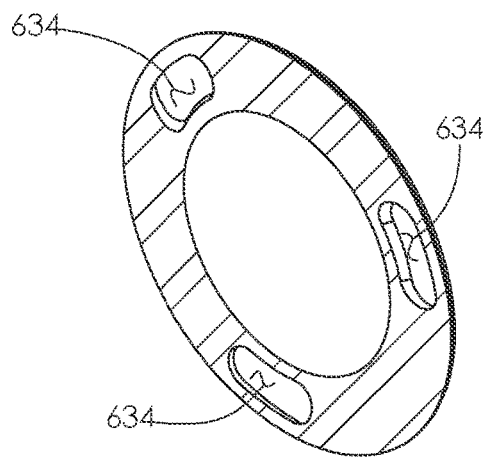

FIG. 94 is a perspective cross-sectional view of the fluid routing plug shown in FIG. 84, taken along line AA-AA.

Figure 95:
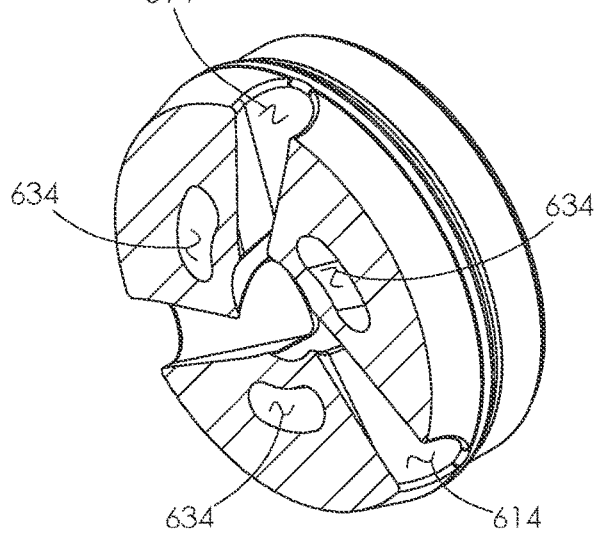

FIG. 95 is a perspective cross-sectional view of the fluid routing plug shown in FIG. 84, taken along line AB-AB.

Figure 96:
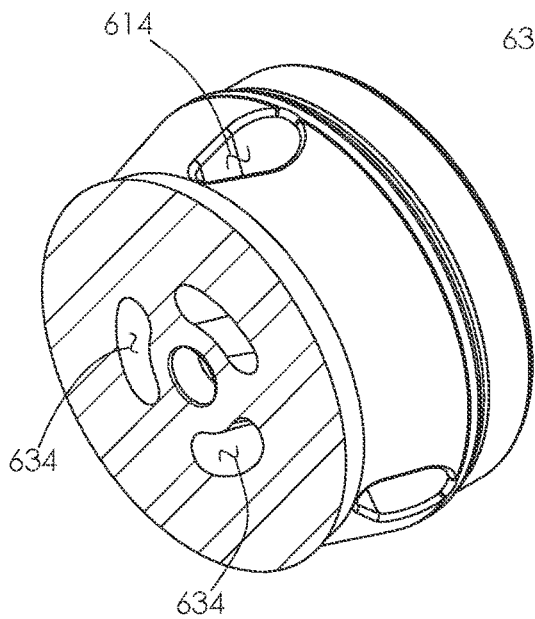

FIG. 96 is a perspective cross-sectional view of the fluid routing plug shown in FIG. 84, taken along line AC-AC.

Figure 97:
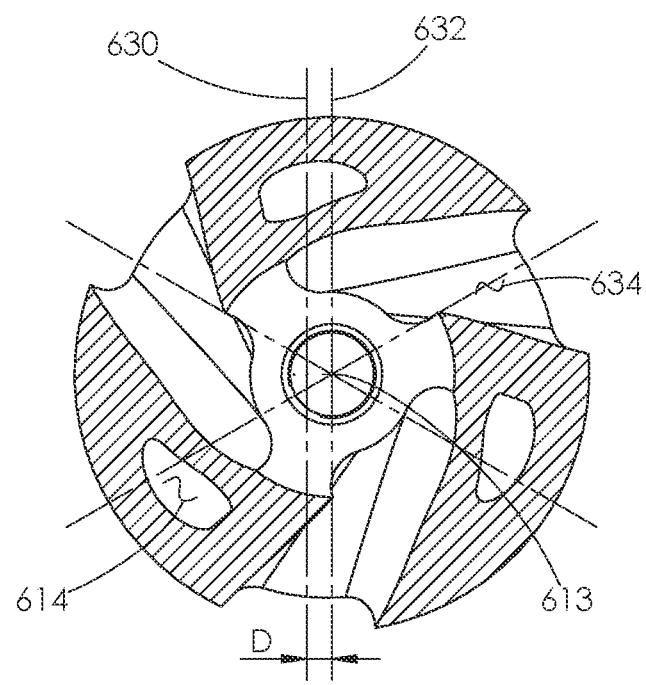

FIG. 97 is a front elevational and conical-sectional view of the fluid routing plug shown in FIG. 84. The conical-section is taken from line AD in FIGS. 85 and 86 to line AE in FIGS. 92 and 93.

Figure 98:
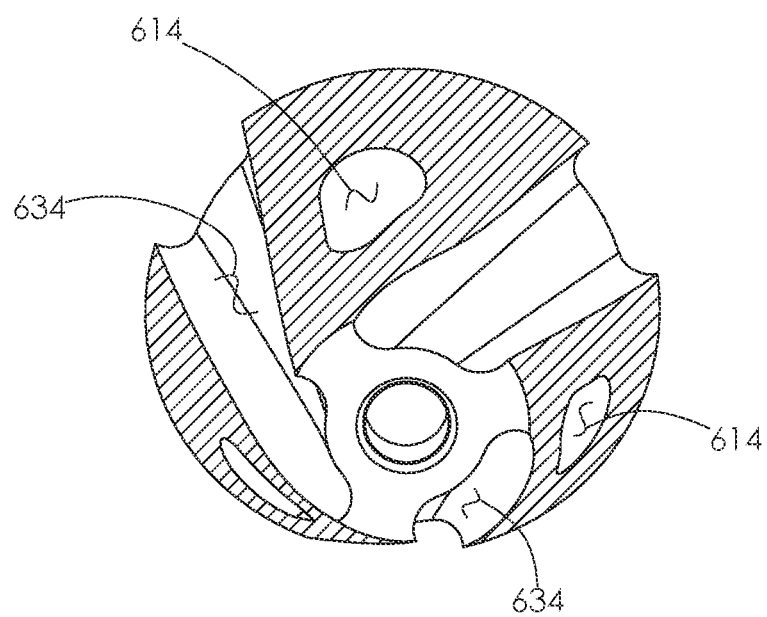

FIG. 98 is a front perspective and conical-sectional view of the fluid routing plug shown in FIG. 97.

Figure 99:
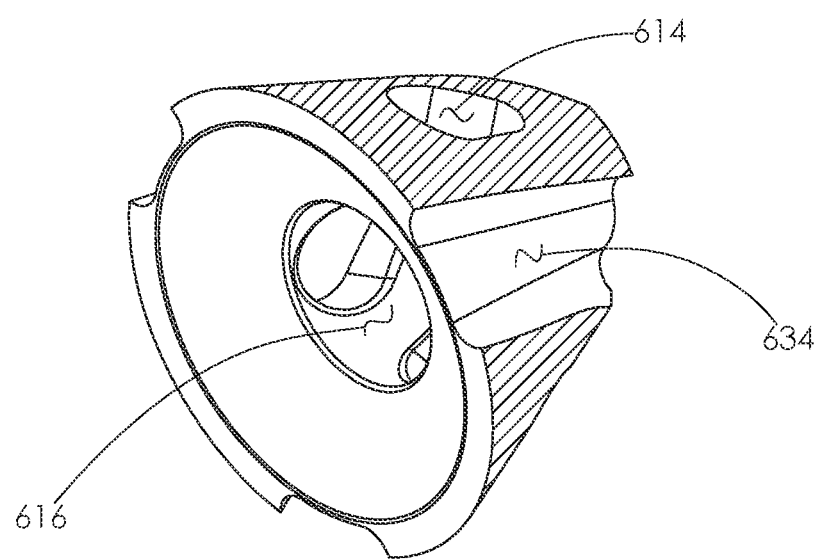

FIG. 99 is a rear perspective and conical-sectional view of the fluid routing plug shown in FIG. 97.

Figure 100:
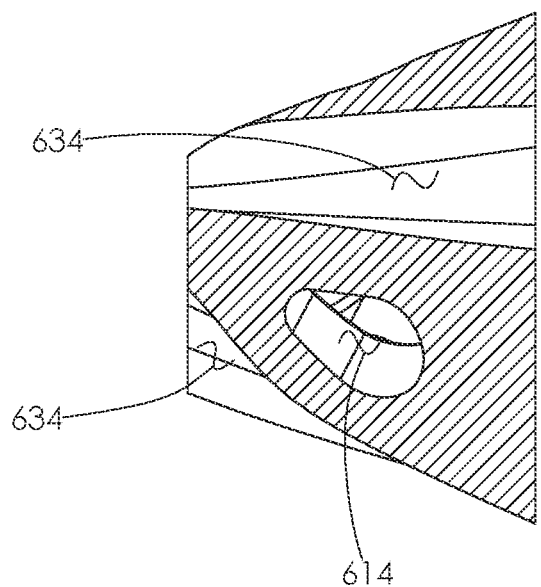

FIG. 100 is a side elevational and conical-sectional view of the fluid routing plug shown in FIG. 97.

Figure 101:
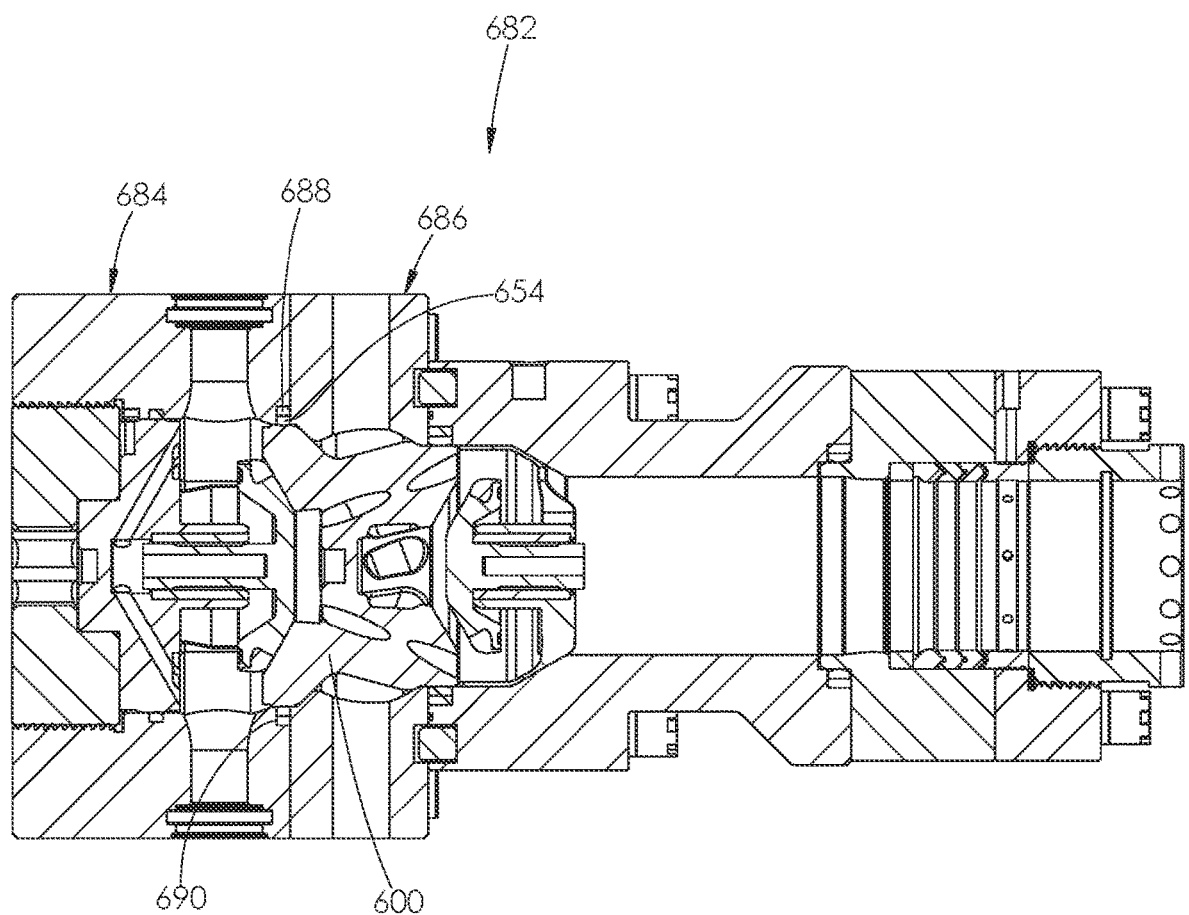

FIG. 101 is a cross-sectional view of another embodiment of a fluid end section having the fluid routing plug shown in FIG. 84 installed therein.

Figure 102:
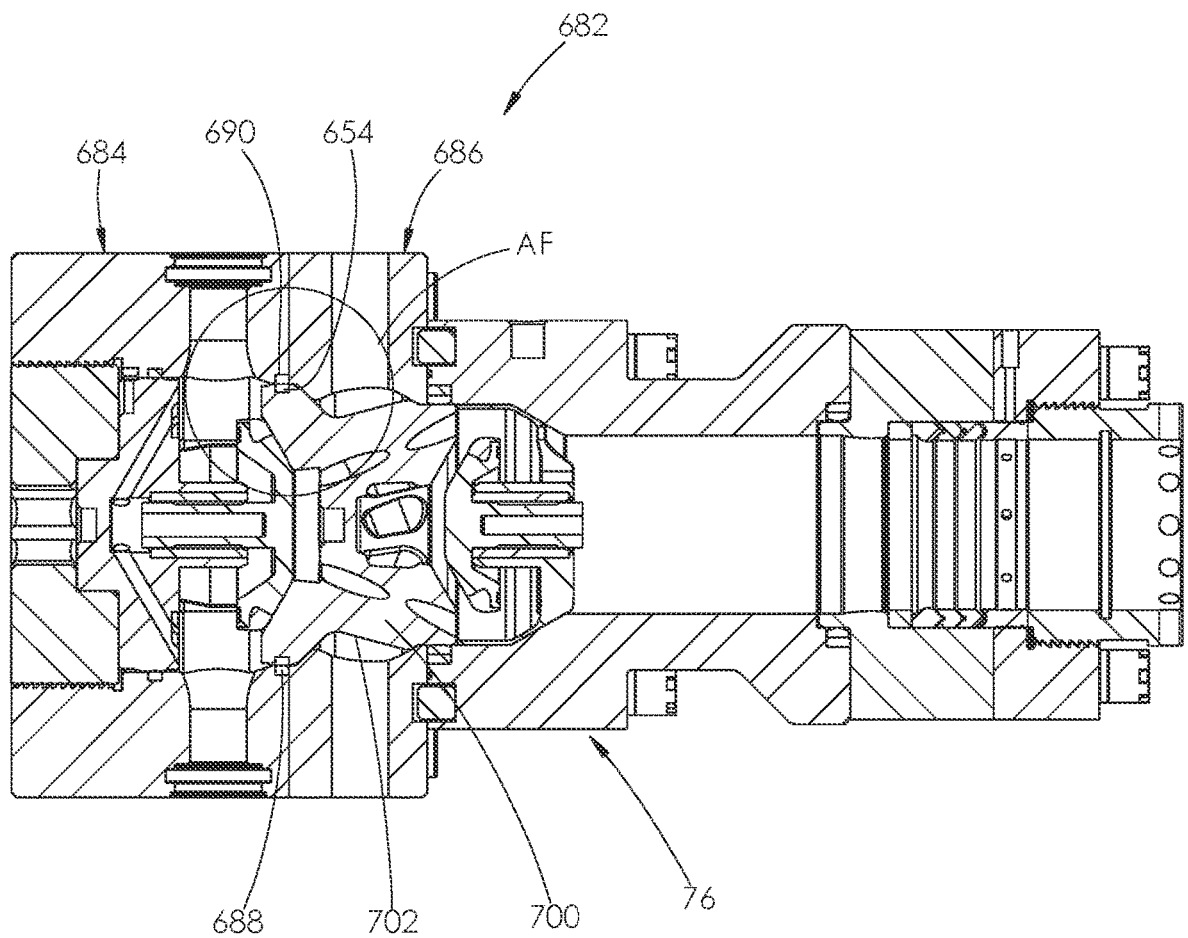

FIG. 102 is the cross-sectional view the fluid end section shown in FIG. 101 having another embodiment of a fluid routing plug installed therein.

Figure 103:
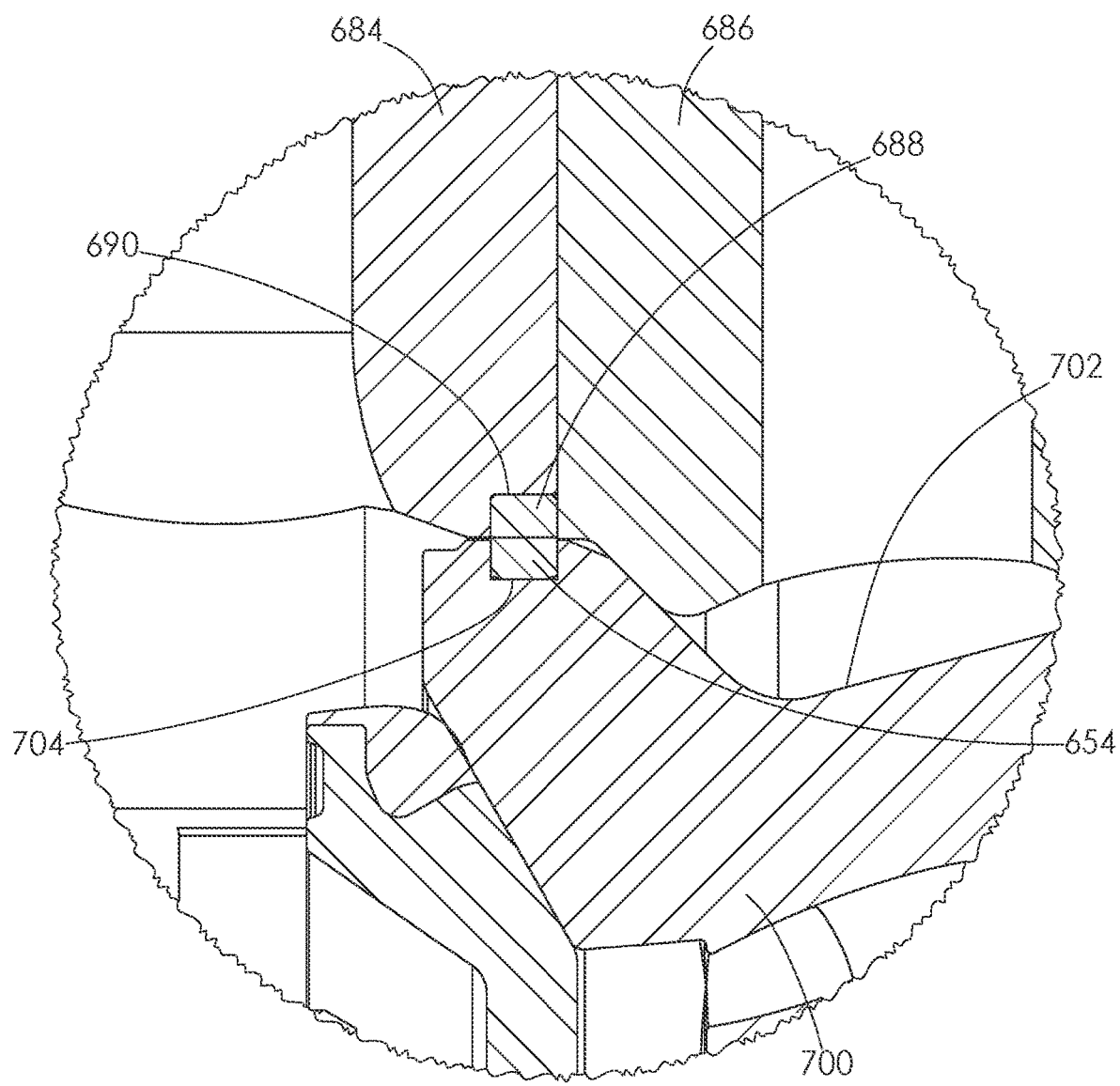

FIG. 103 is an enlarged view of area AF shown in FIG. 102.

Figure 104:
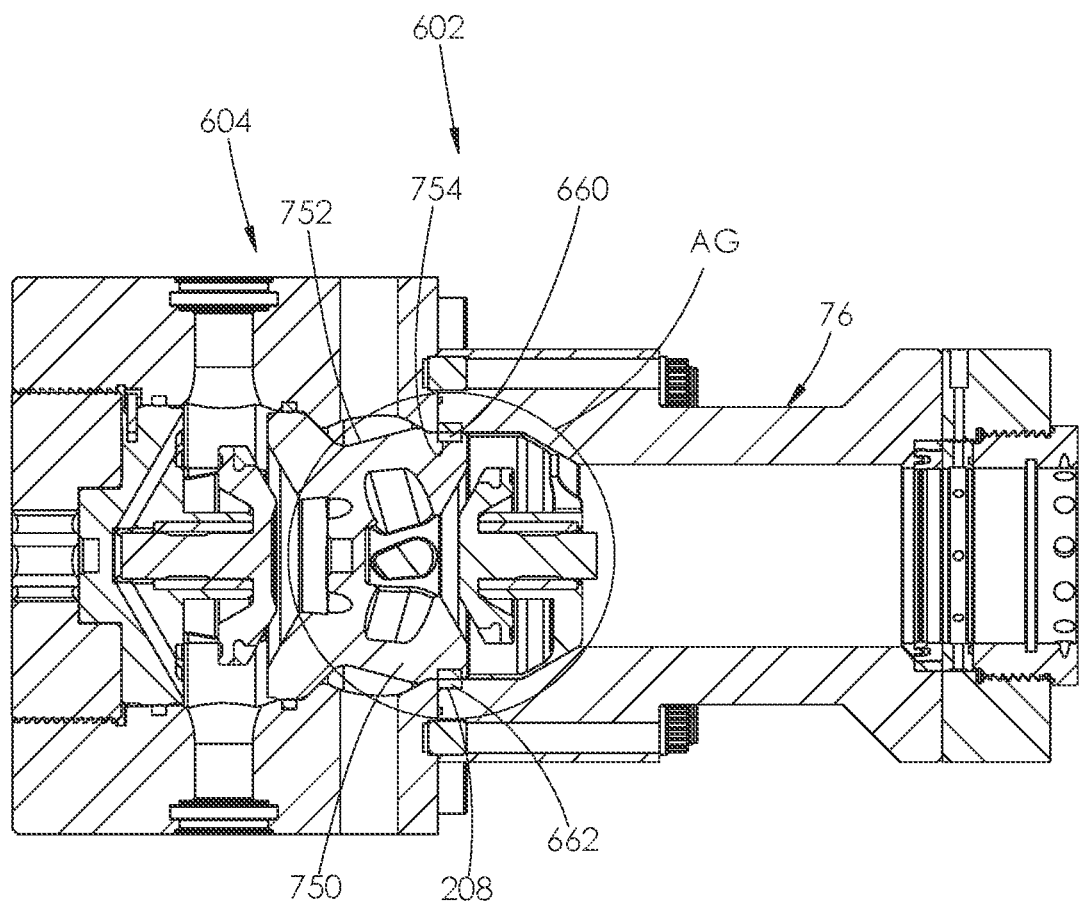

FIG. 104 is the cross-sectional view the fluid end section shown in FIG. 81 having another embodiment of a fluid routing plug installed therein.

Figure 105:
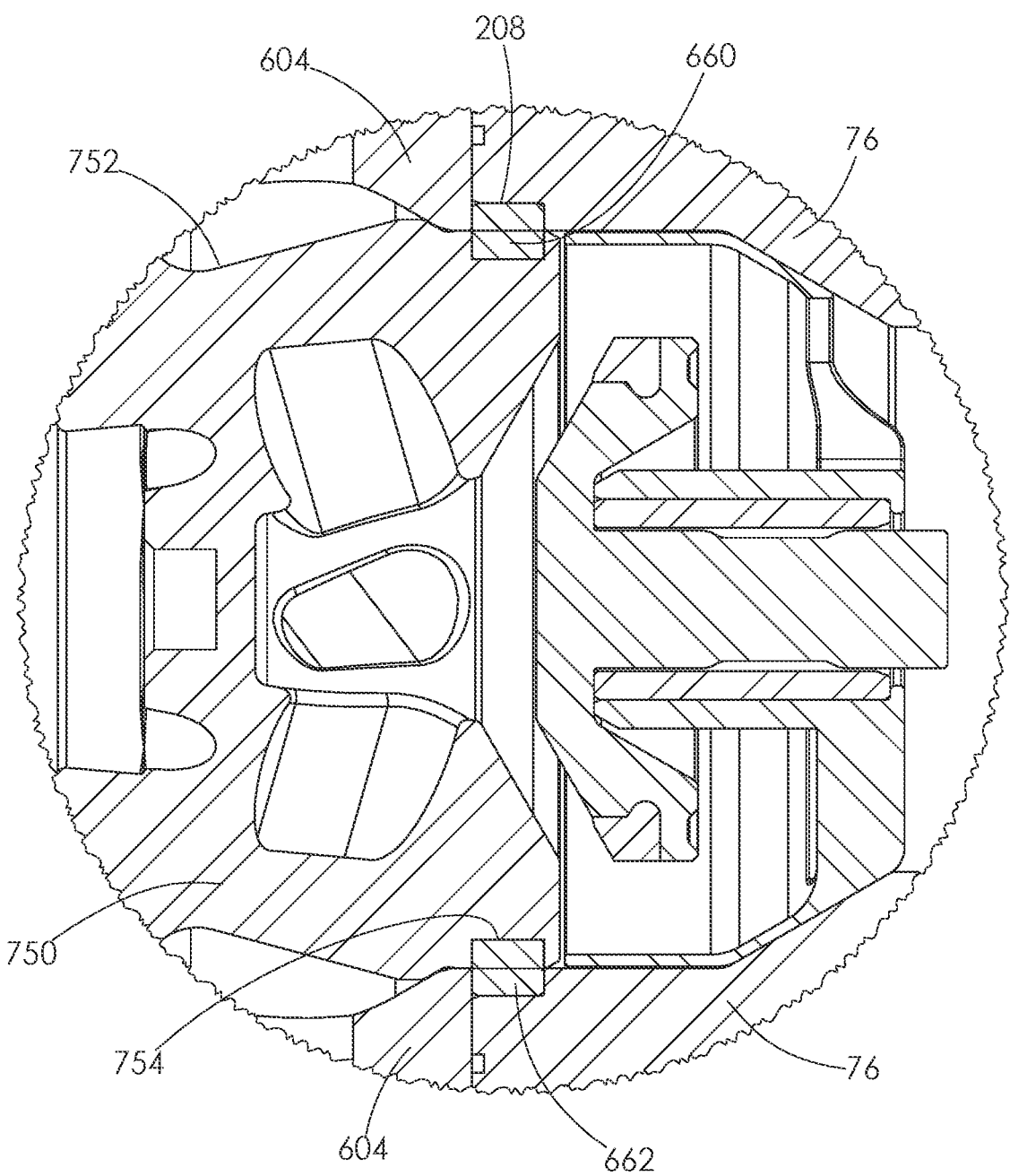

FIG. 105 is an enlarged view of area AG shown in FIG. 104.

Figure 106:
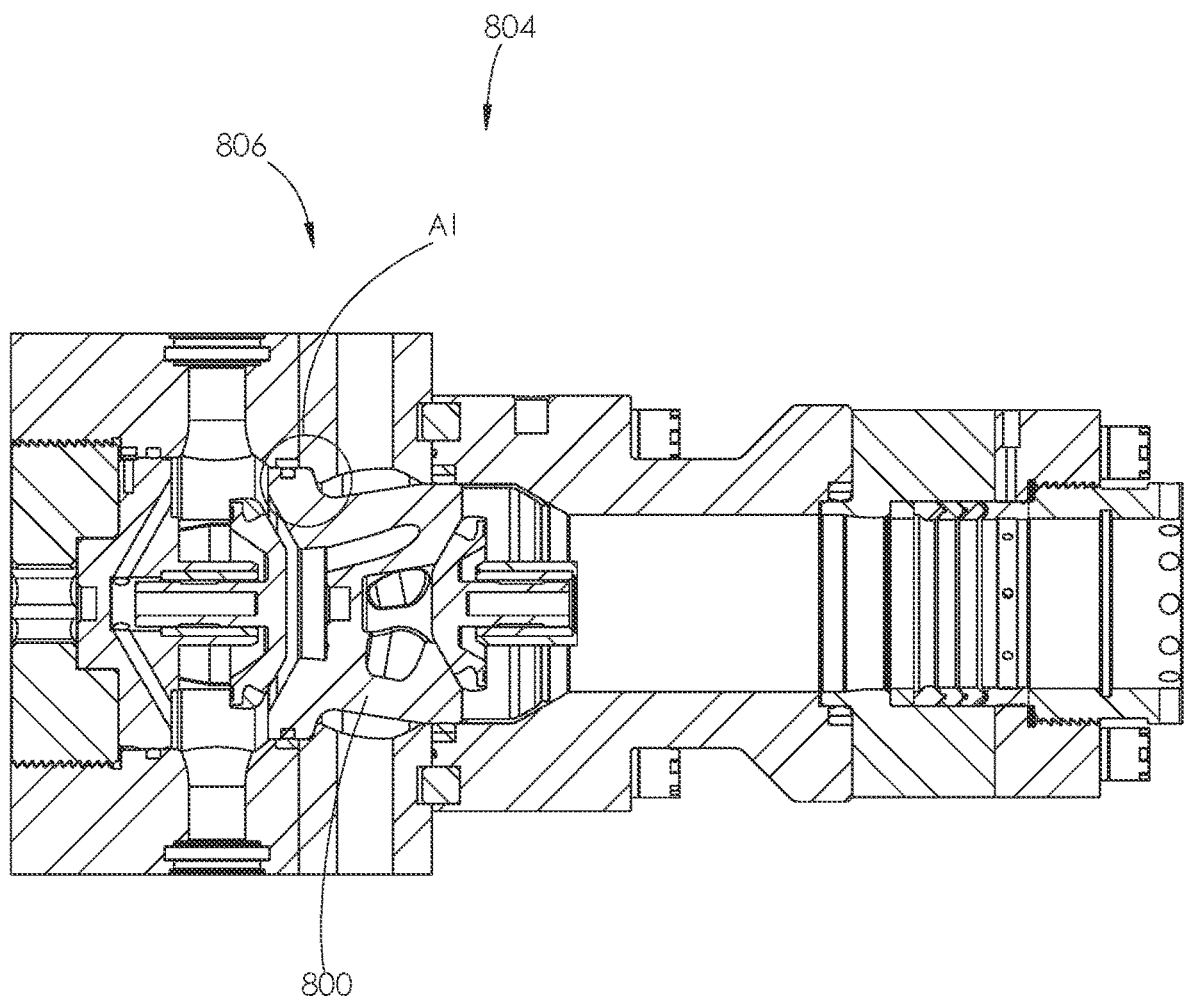

FIG. 106 is a cross-sectional view of another embodiment of a fluid end section having another embodiment of a fluid routing plug installed therein.

Figure 107:
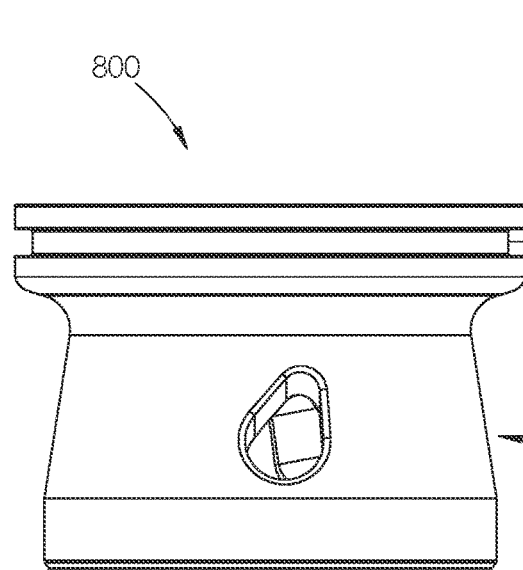

FIG. 107 is a top plan view of the fluid routing plug shown in FIG. 106.

Figure 108:
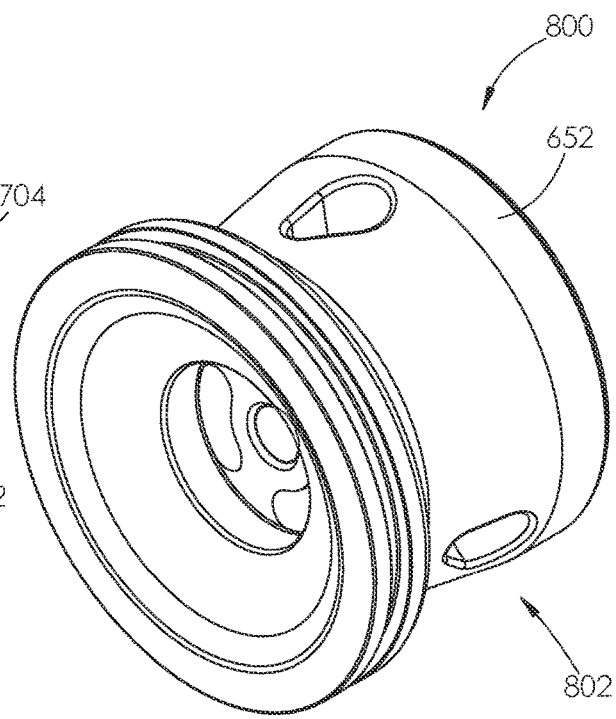

FIG. 108 is a front perspective view of the fluid routing plug shown in FIG. 107.

Figure 109:
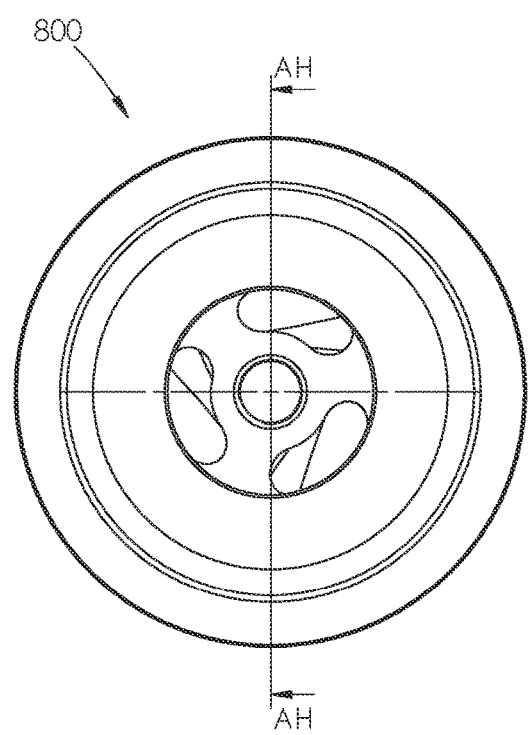

FIG. 109 is a front elevational view of the fluid routing plug shown in FIG. 107.

Figure 110:
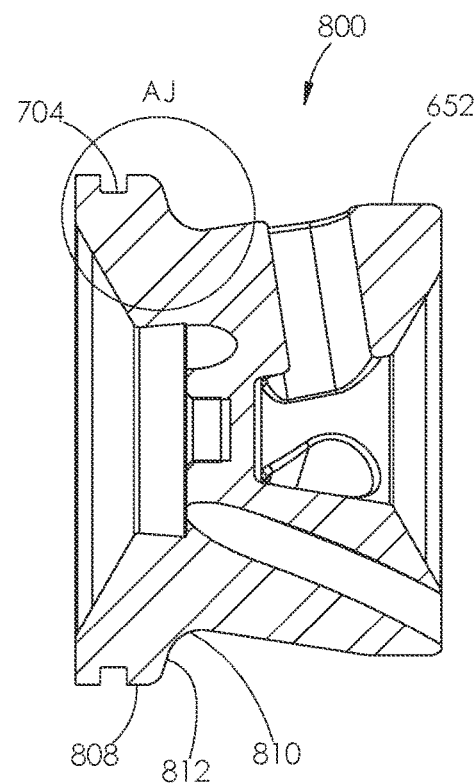

FIG. 110 is a cross-sectional view of the fluid routing plug shown in FIG. 109, taken along line AH-AH.

Figure 111:
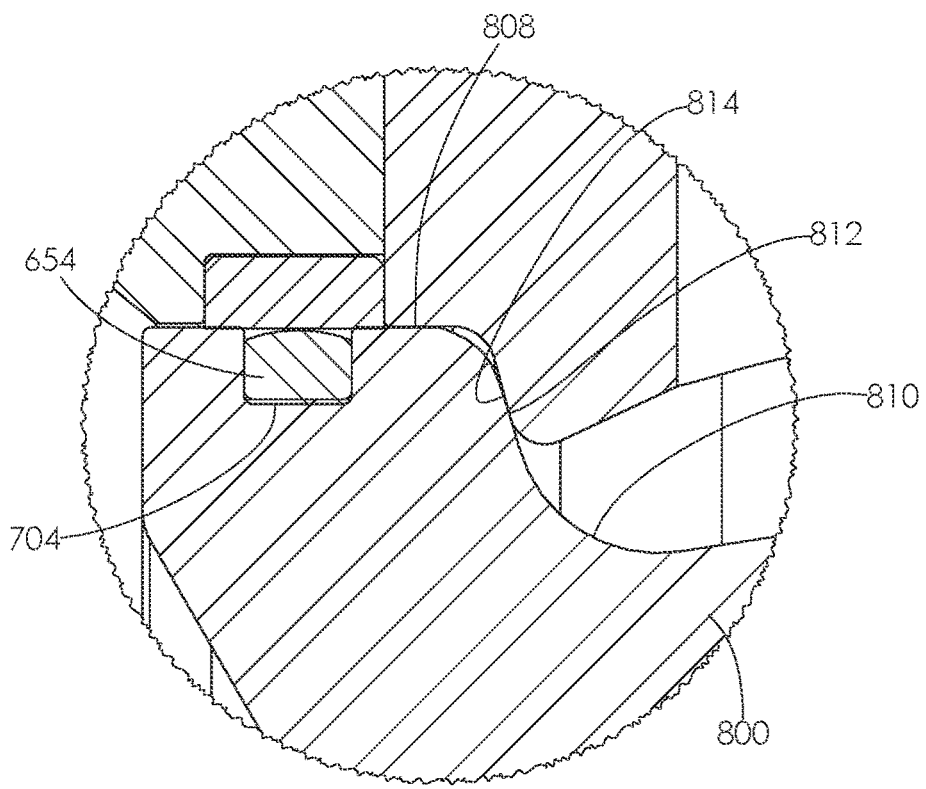

FIG. 111 is an enlarged view of area AI shown in FIG. 106.

Figure 112:
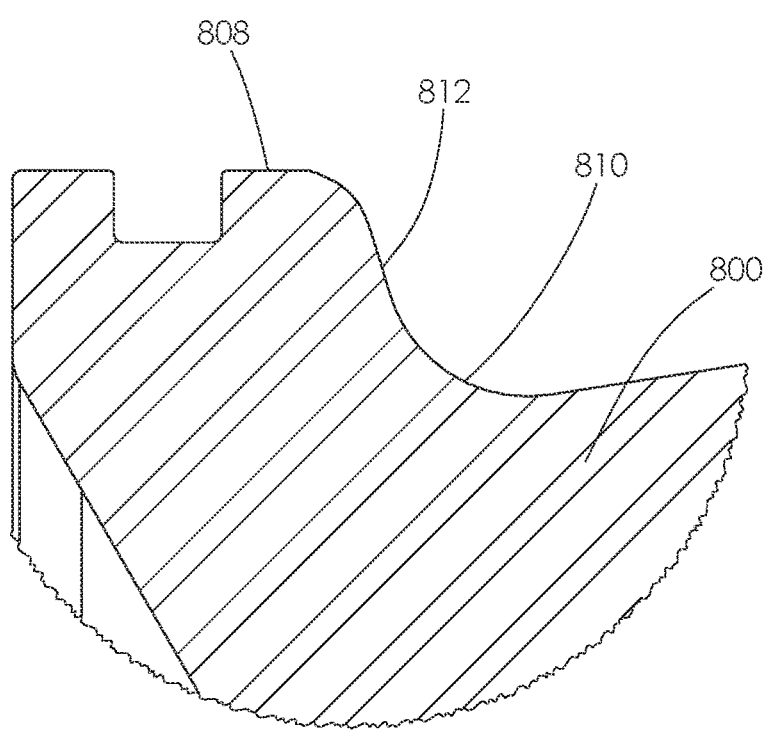

FIG. 112 is an enlarged view of area AJ shown in FIG. 110.

Figure 113:
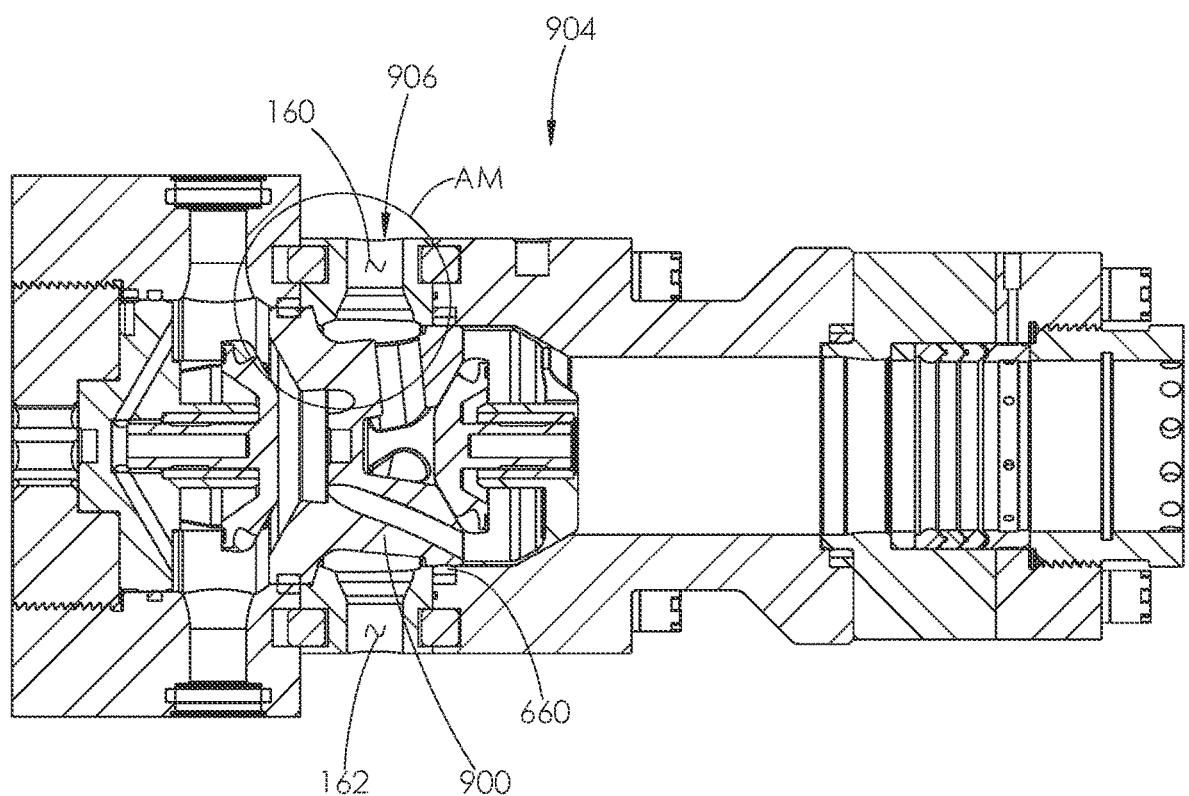

FIG. 113 is a cross-sectional view of another embodiment of a fluid end section having another embodiment of a fluid routing plug installed therein.

Figure 114:
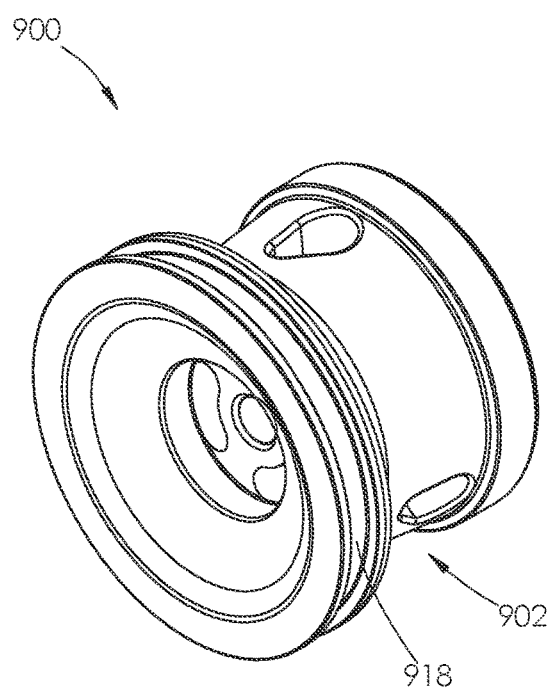

FIG. 114 is a top plan view of the fluid routing plug shown in FIG. 113.

Figure 115:
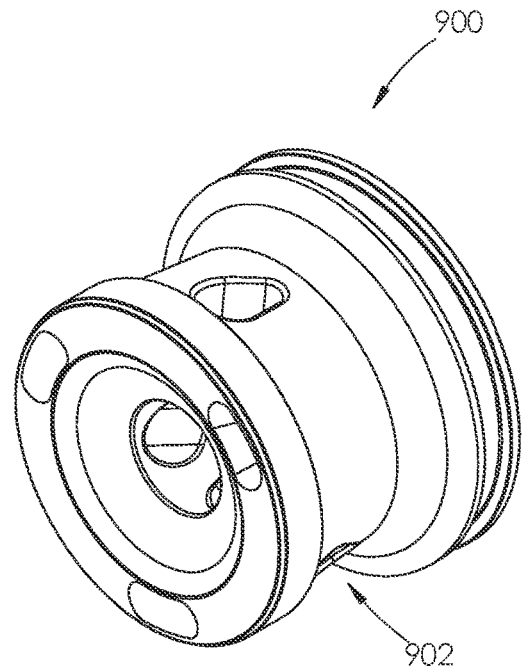

FIG. 115 is a front perspective view of the fluid routing plug shown in FIG. 114.

Figure 116:
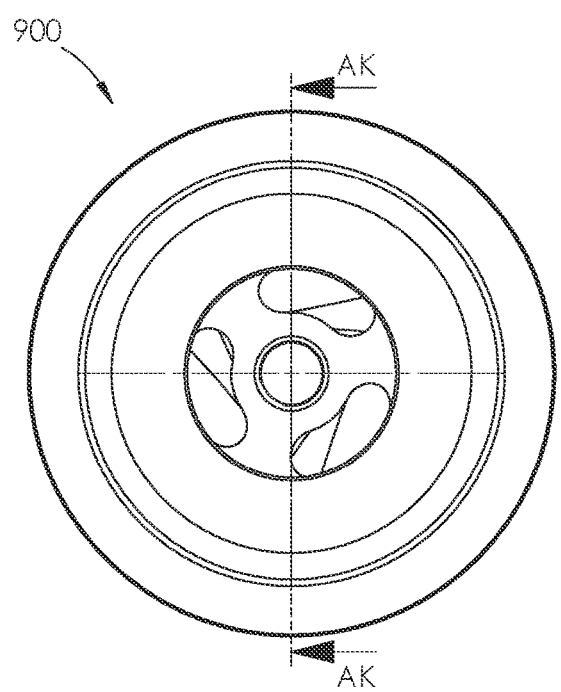

FIG. 116 is a front elevational view of the fluid routing plug shown in FIG. 114.

Figure 117:
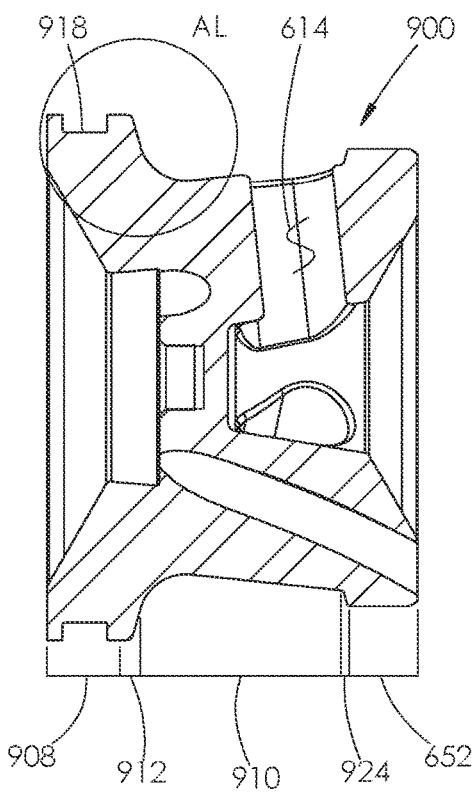

FIG. 117 is a cross-sectional view of the fluid routing plug shown in FIG. 116, taken along line AK-AK.

Figure 118:
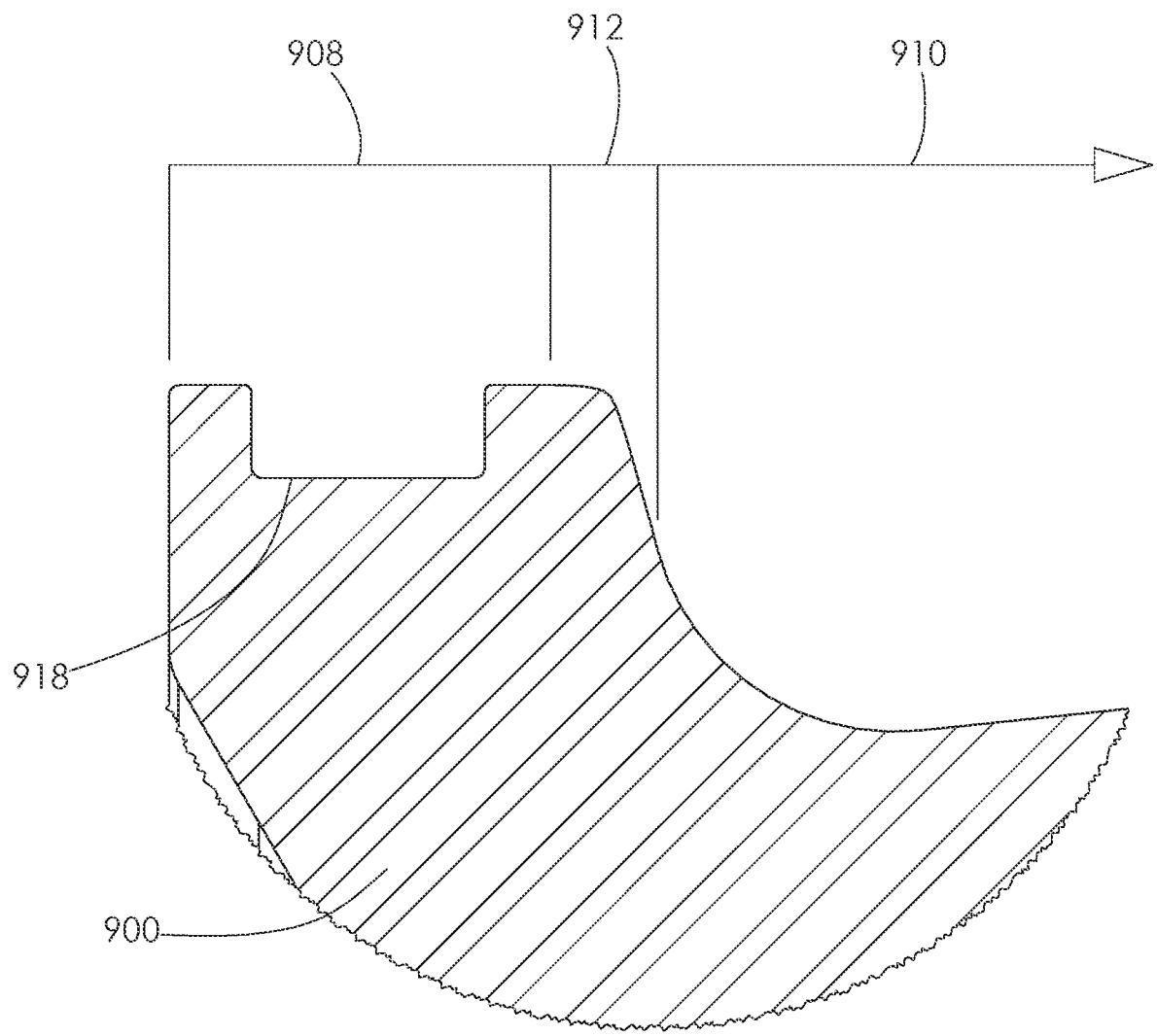

FIG. 118 is an enlarged view of area AL shown in FIG. 117.

Figure 119:
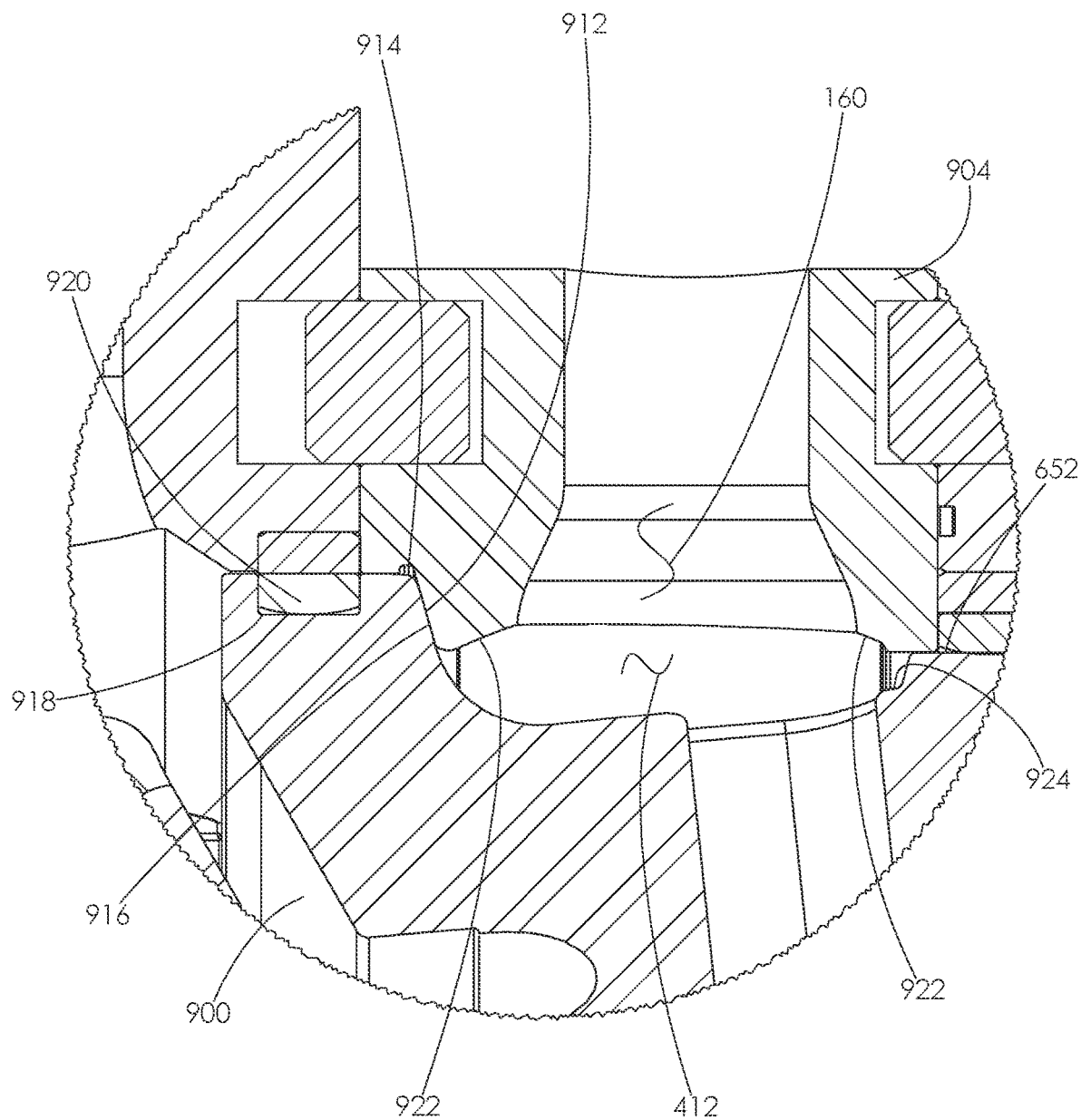

FIG. 119 is an enlarged view of area AM shown in FIG. 113.

DETAILED DESCRIPTION

Fluid End Assembly

Figure 3:
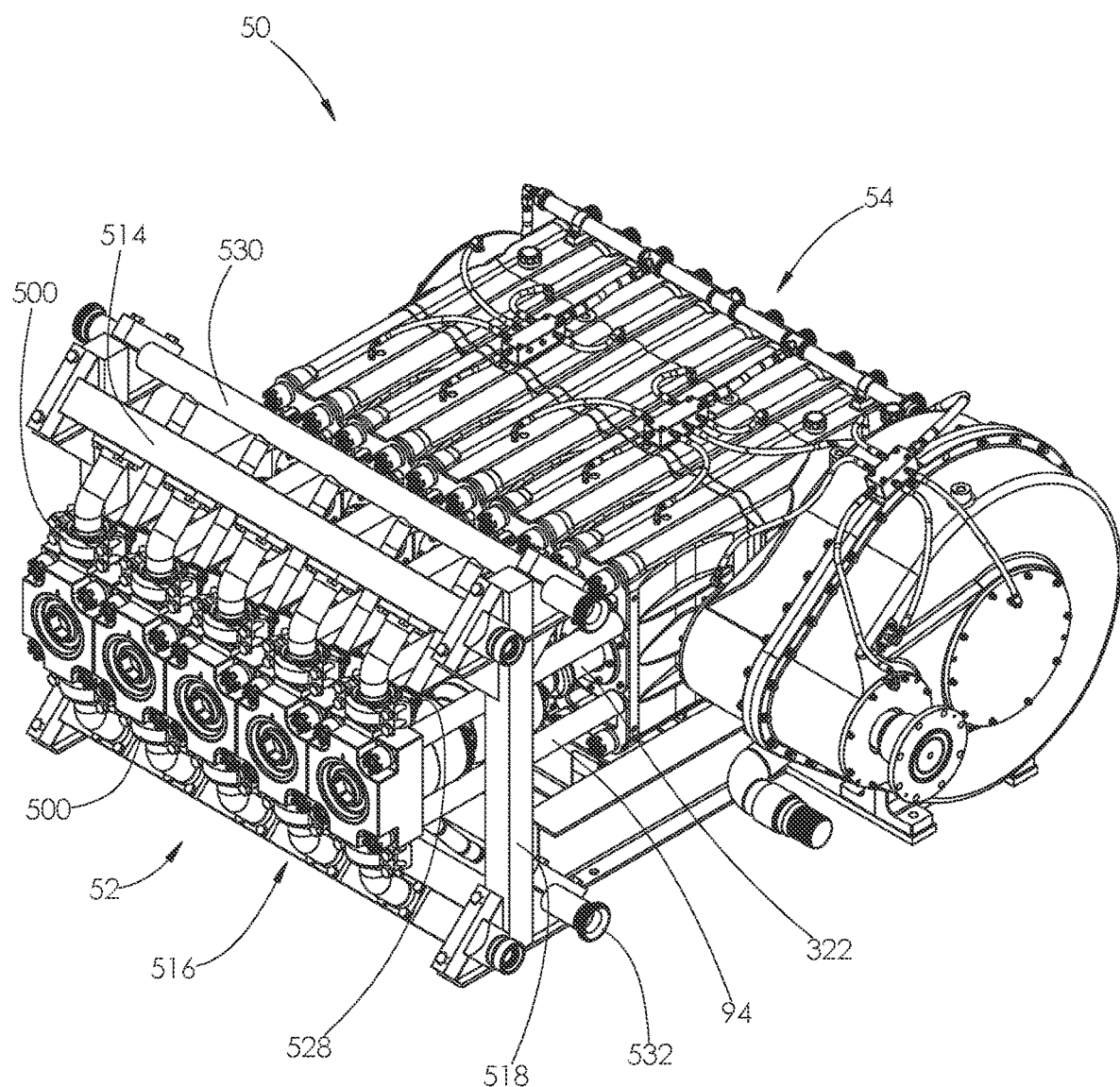
FIG. 3 is a font perspective view of one embodiment of a high pressure pump disclosed herein.
Figure 80:
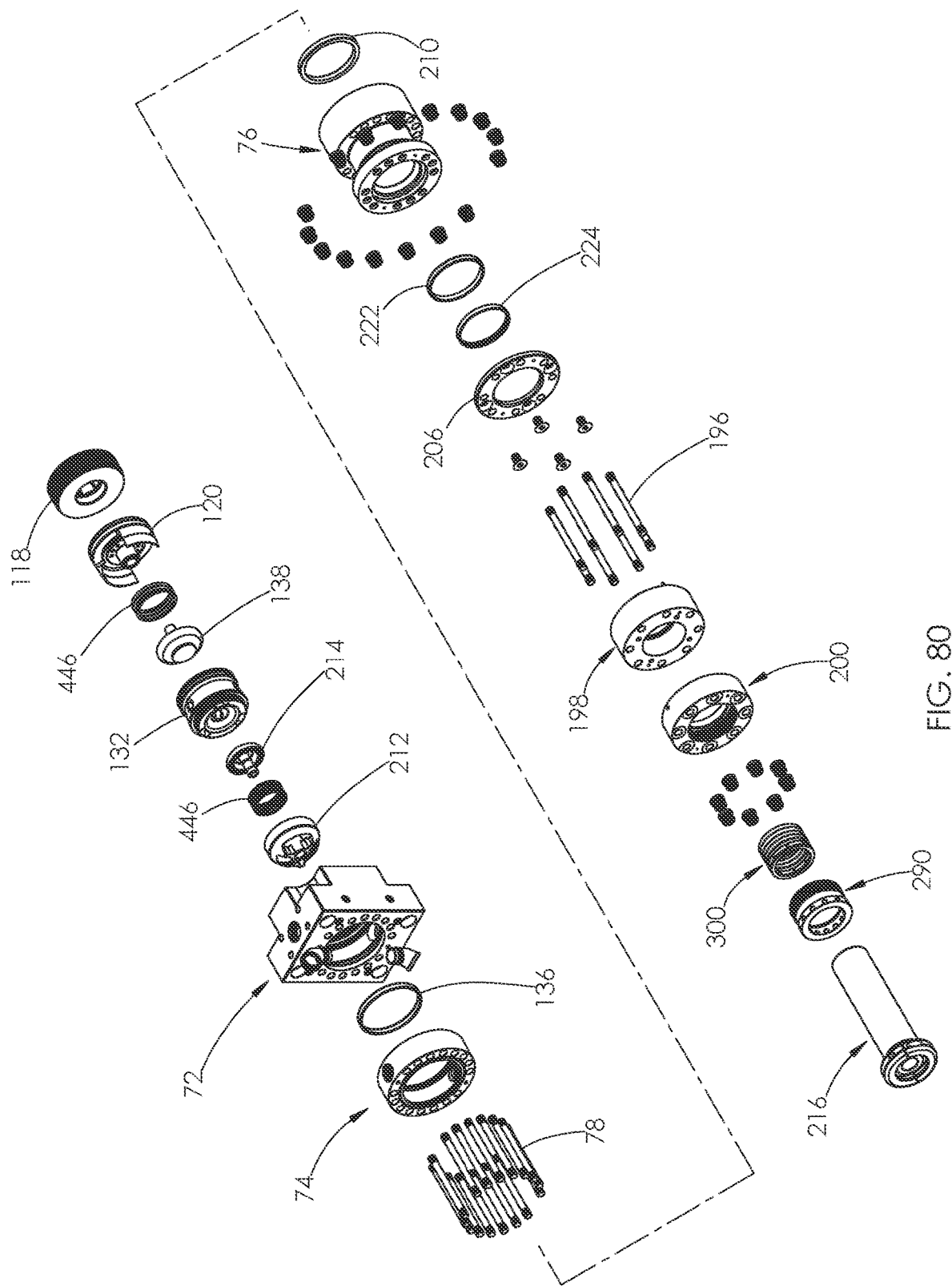
FIG. 80 is a rear perspective and exploded view of the fluid end section shown in FIGS. 9, 29, 40, and 41.

Turning now to FIGS. 3-80, a high pressure pump 50 is shown in FIG. 3. The pump 50 comprises a fluid end assembly 52 joined to a power end assembly 54. The power end assembly 54 is described in more detail in U.S. patent application Ser. No. 17/884,691, authored by Keith et al., and filed on Aug. 10, 2022, the entire contents of which are incorporated herein by reference (hereinafter "the '691 application"). In alternative embodiments, the fluid end assembly 52 may be attached to other power end designs known in the art. The fluid end assembly 52 is described herein. Fluid is routed throughout the fluid end assembly using a fluid routing plug 132. The fluid routing plug 132 and various embodiments thereof are described herein.

Fluid End Section

Figure 4:
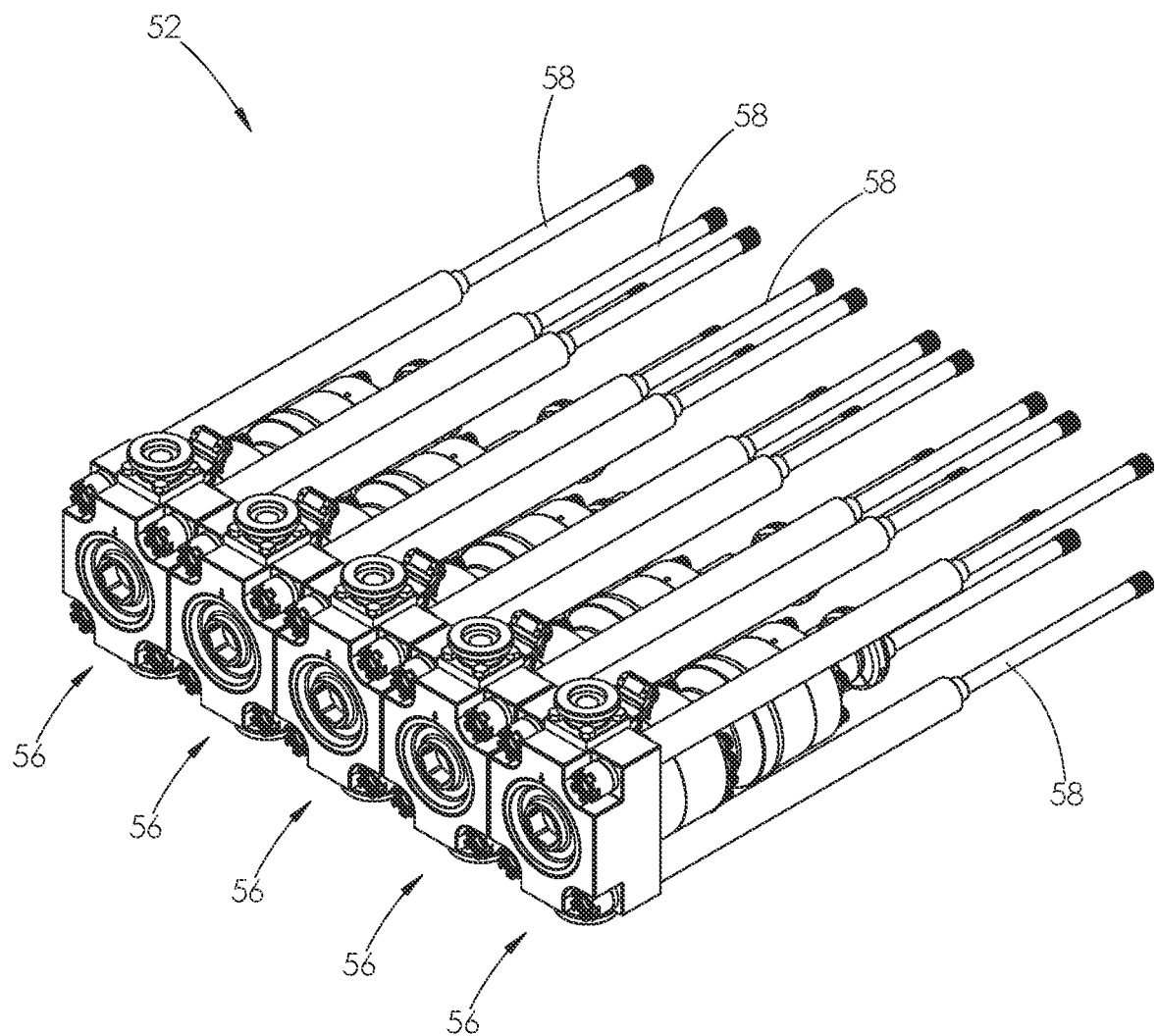
FIG. 4 is a front perspective view of the fluid end assembly shown in FIG. 3 attached to a plurality of stay rods.
Figure 5:
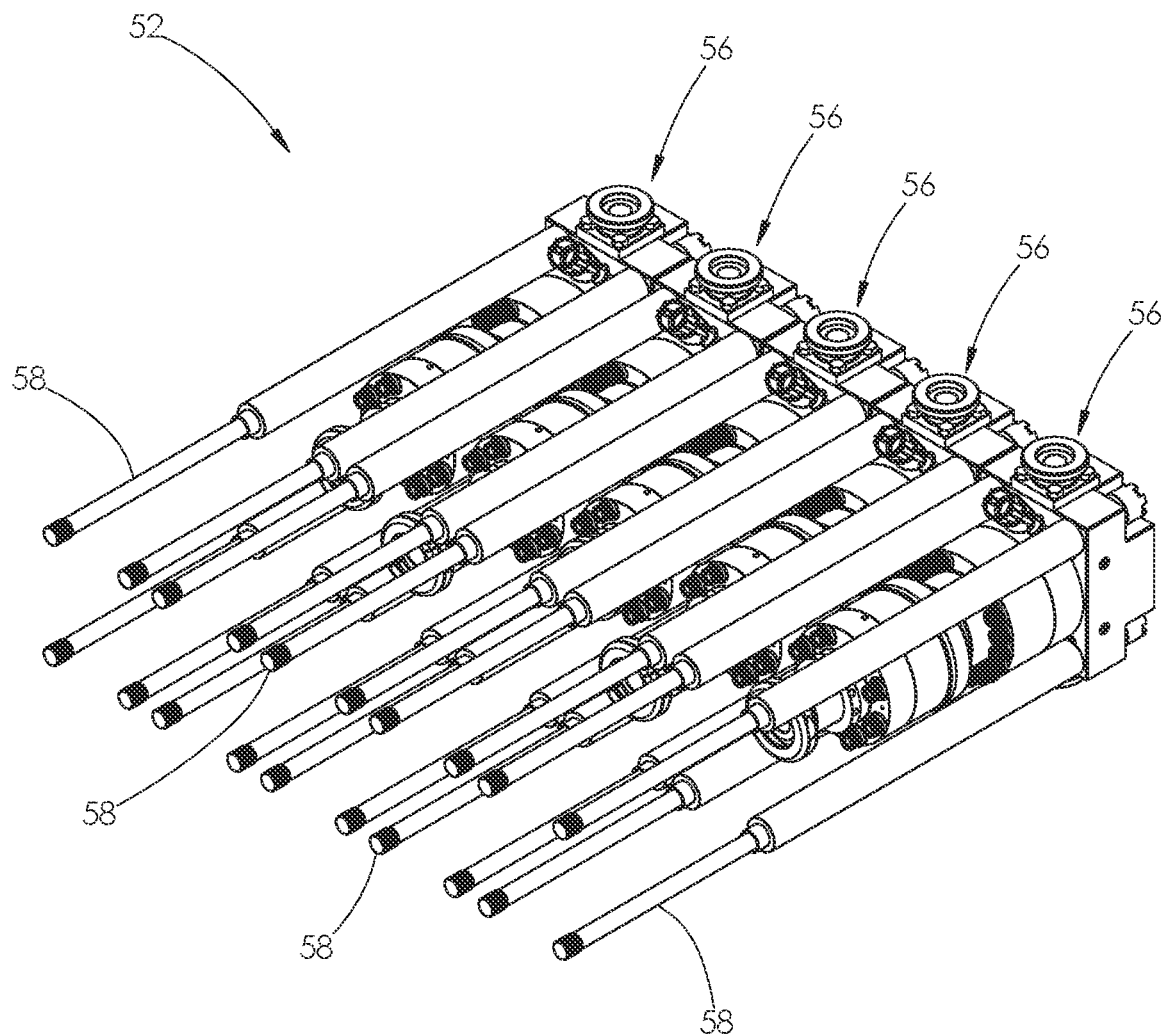
FIG. 5 is a rear perspective view of the fluid end assembly and stay rods shown in FIG. 4.
Figure 6:
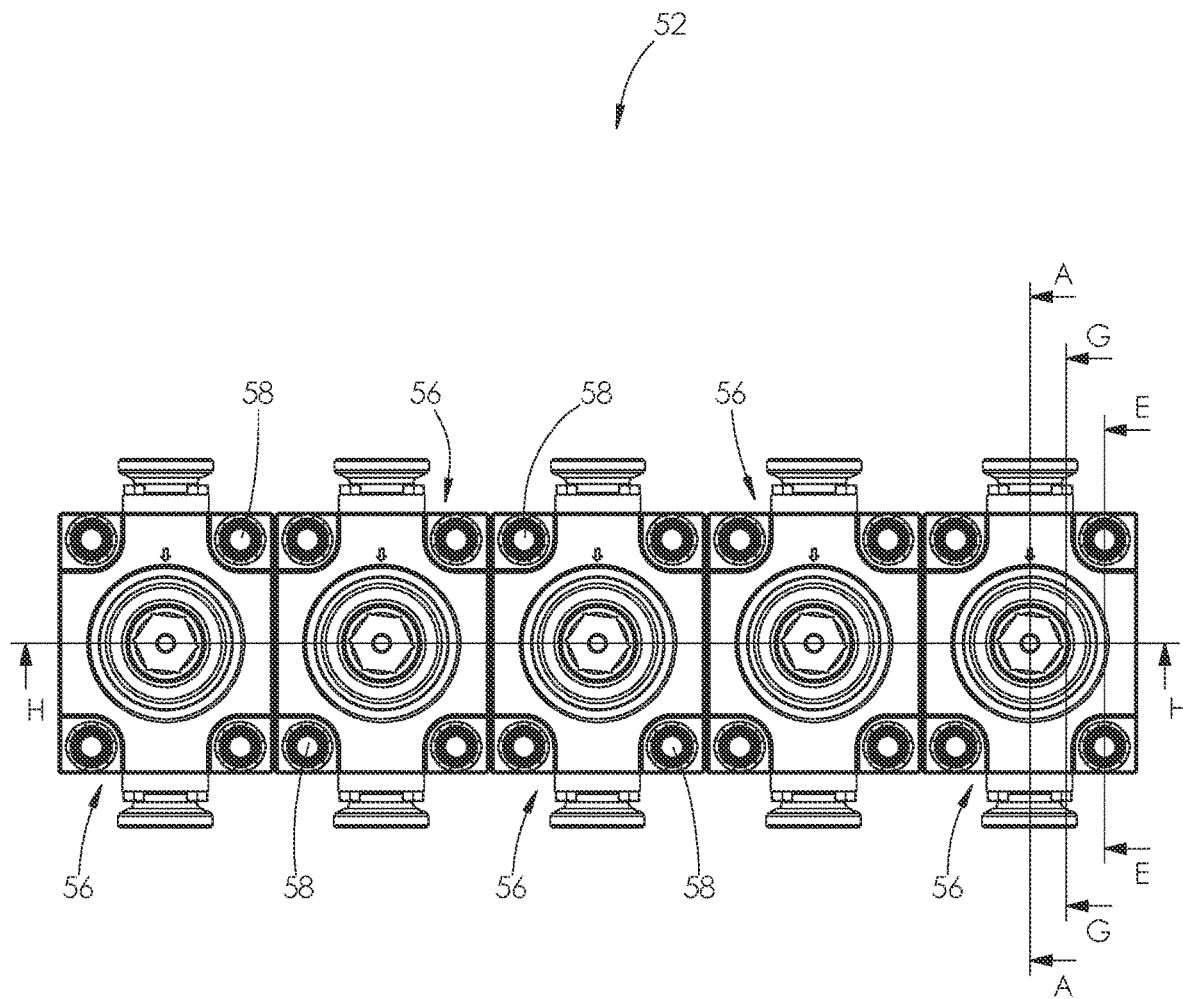
FIG. 6 is a front elevational view of the fluid end assembly and stay rods shown in FIG. 4.
Figure 7:
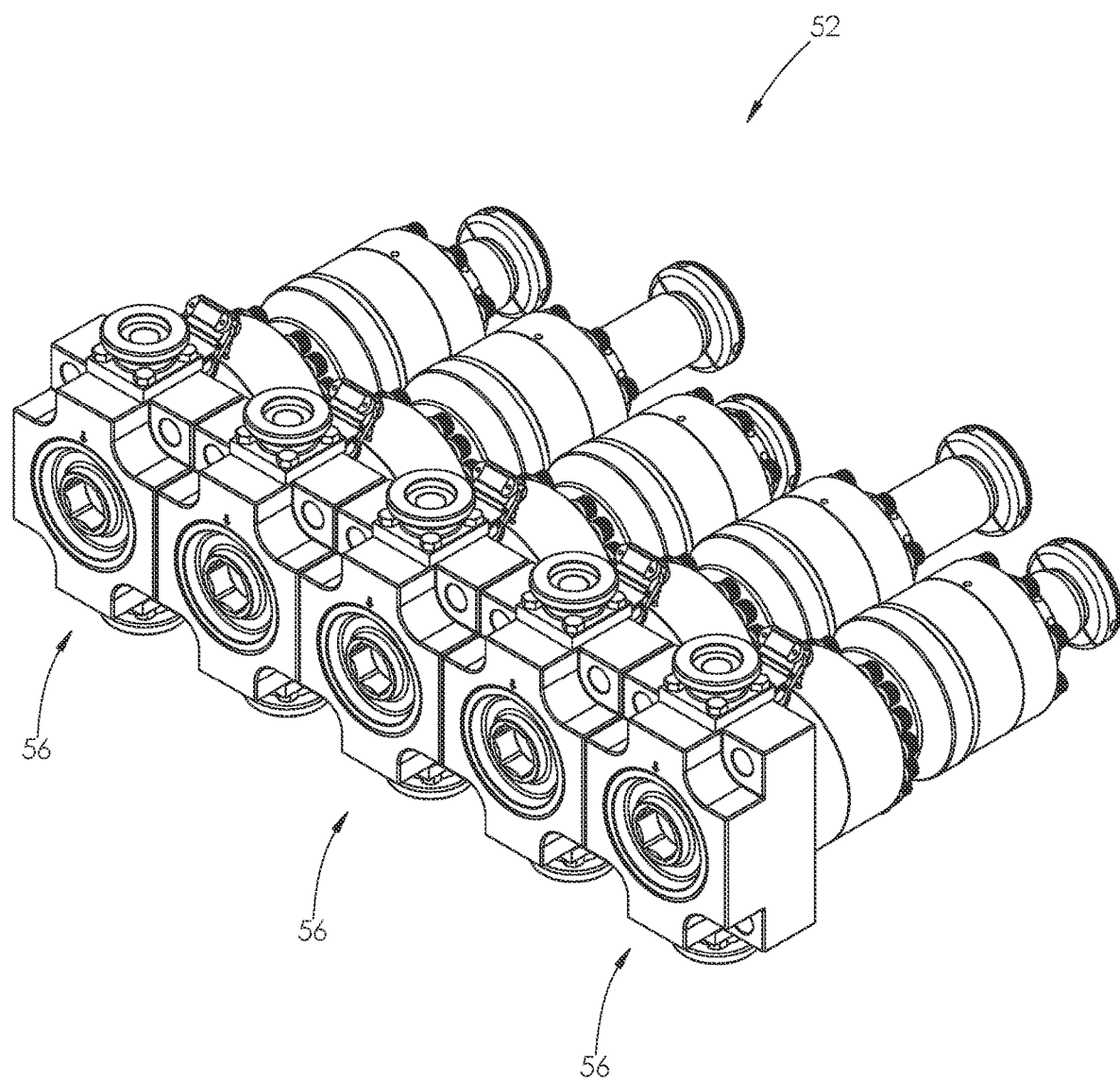
FIG. 7 is a front perspective view of the fluid end assembly shown in FIGS. 3 and 4.
Figure 8:
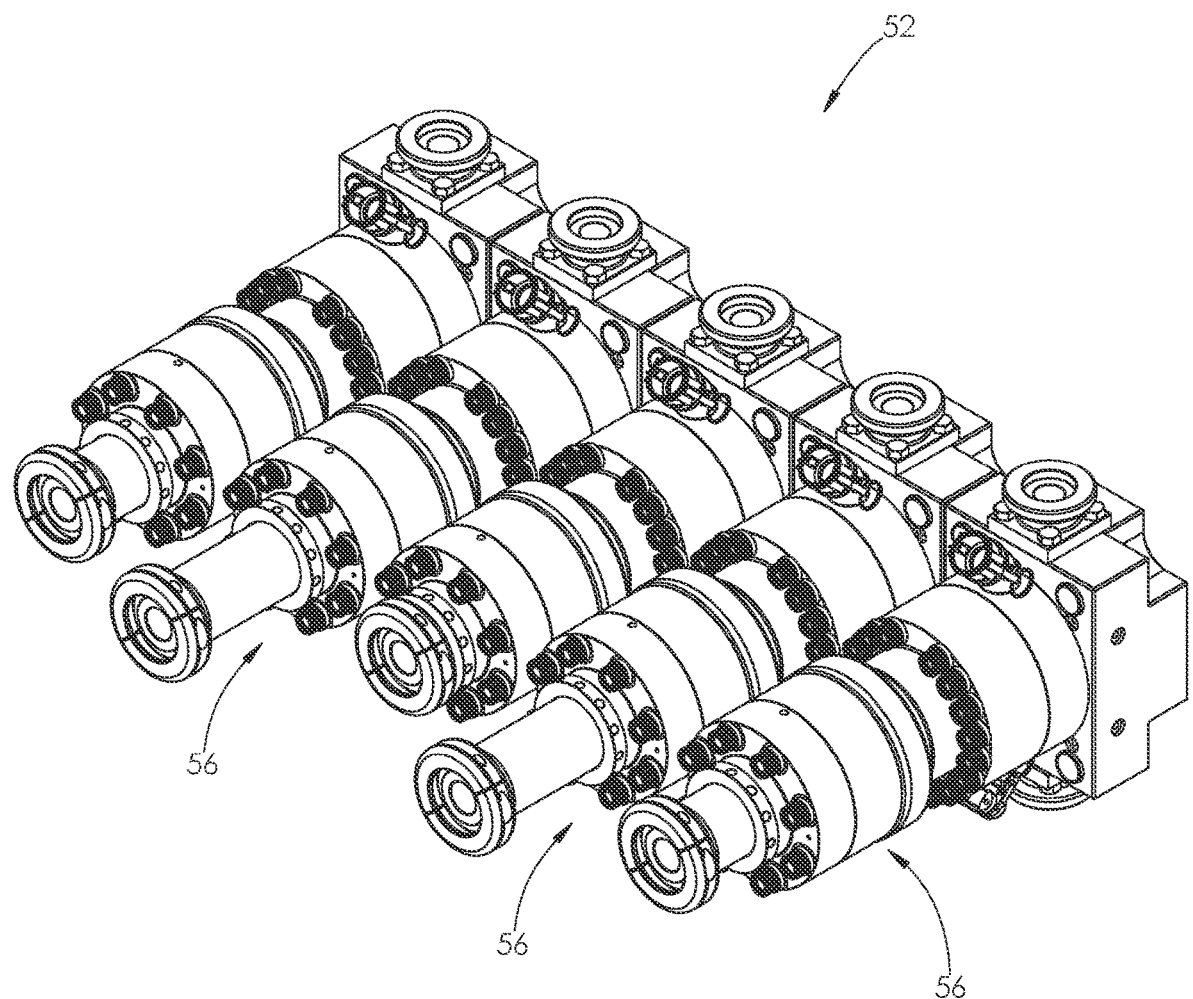
FIG. 8 is a rear perspective view of the fluid end assembly shown in FIG. 7.

Turning to FIGS. 4-8, the fluid end assembly 52 comprises a plurality of fluid end sections 56 positioned in a side-by-side relationship, as shown in FIGS. 6-8. Each fluid end section 56 is attached to the power end assembly 54 using a plurality of stay rods 58, as shown in FIGS. 4 and 5. Preferably, the fluid end assembly 52 comprises five fluid end sections 56 positioned adjacent one another. In alternative embodiments, the fluid end assembly 52 may comprise more or less than five fluid end sections 56. In operation, a single fluid end section 56 may be removed and replaced without removing the other fluid end sections 56 from the fluid end assembly 52.

Housing of Fluid End Section

Figure 9:
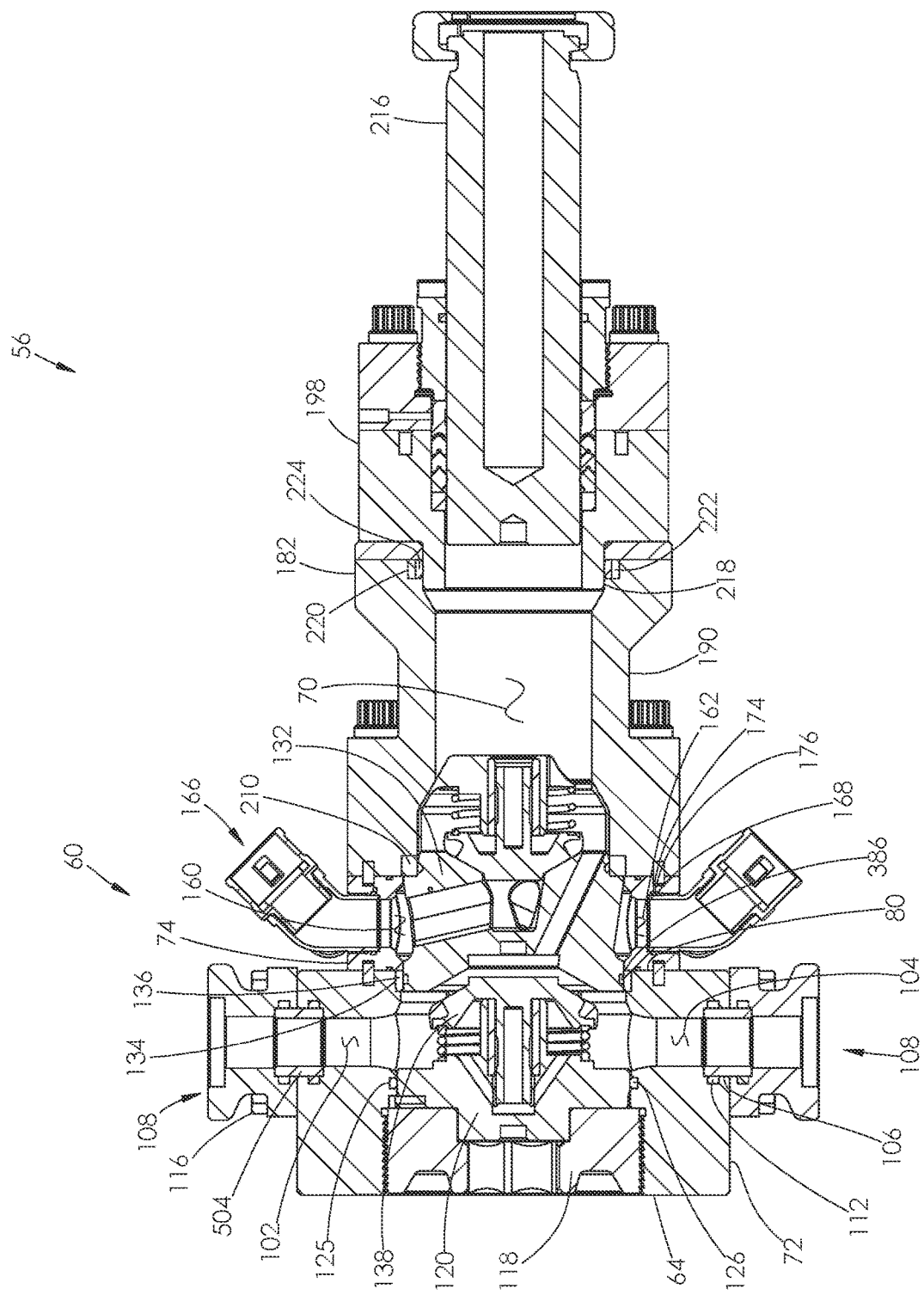
FIG. 9 is a cross-sectional view of one of the fluid end sections making up the fluid end assembly shown in FIG. 6, taken along lines A-A.
Figure 10:
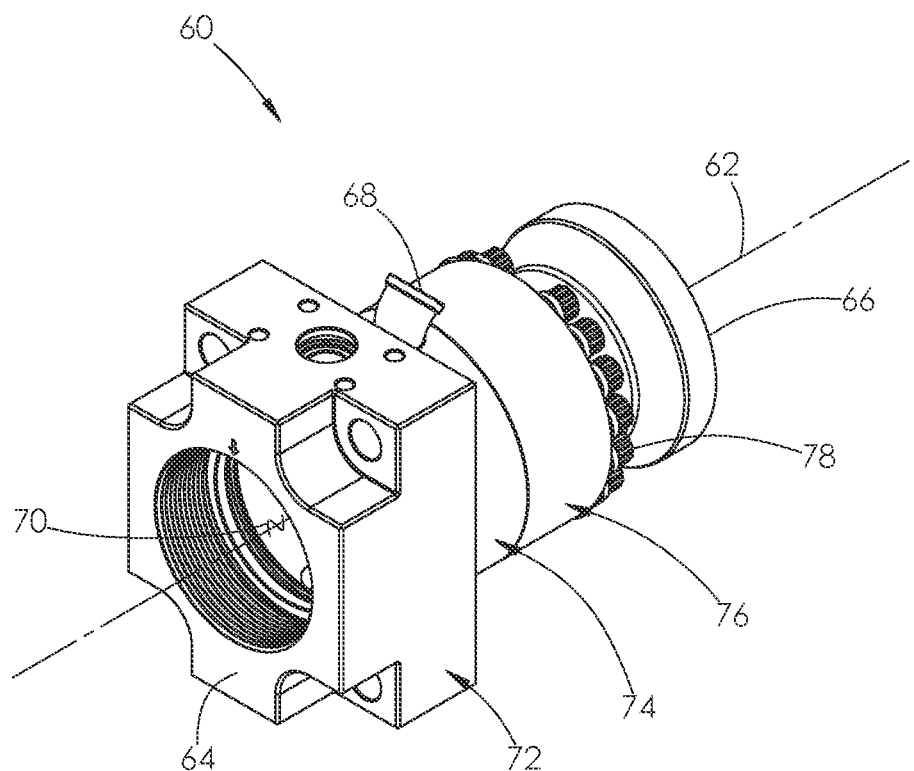
FIG. 10 is a front perspective view of one of the housings used with one of the fluid end sections shown in FIG. 7.
Figure 11:
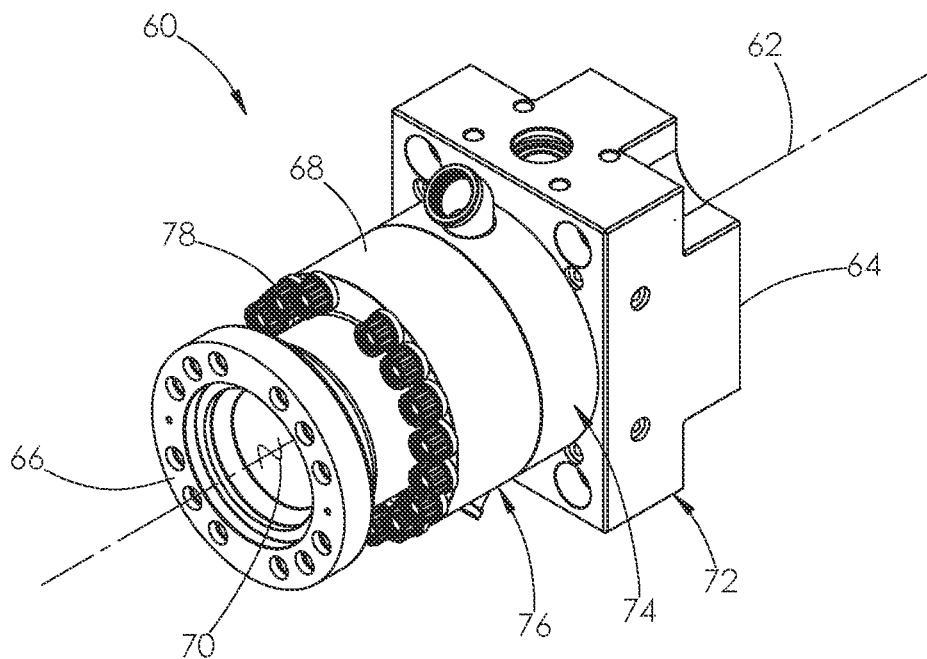
FIG. 11 is a rear perspective view of the housing shown in FIG. 10.
Figure 12:
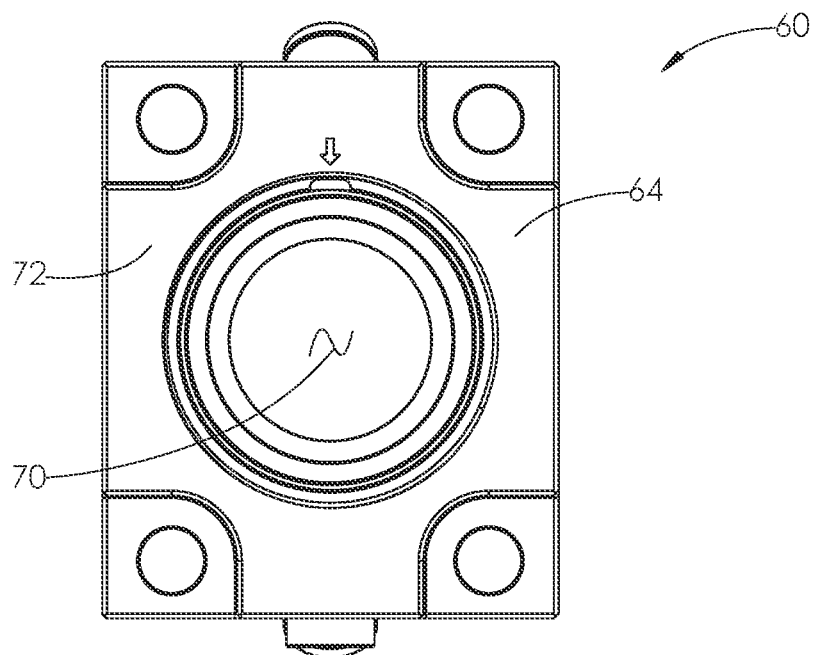
FIG. 12 is a front elevational view of the housing shown in FIG. 10.
Figure 13:
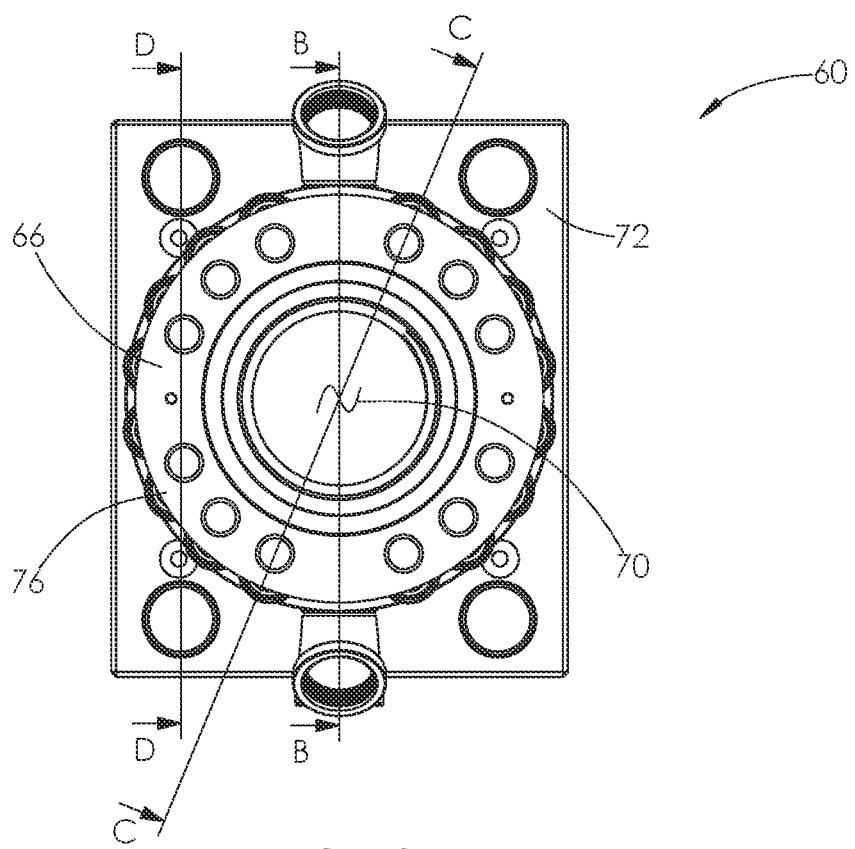
FIG. 13 is a rear elevational view of the housing shown in FIG. 10.
Figure 14:
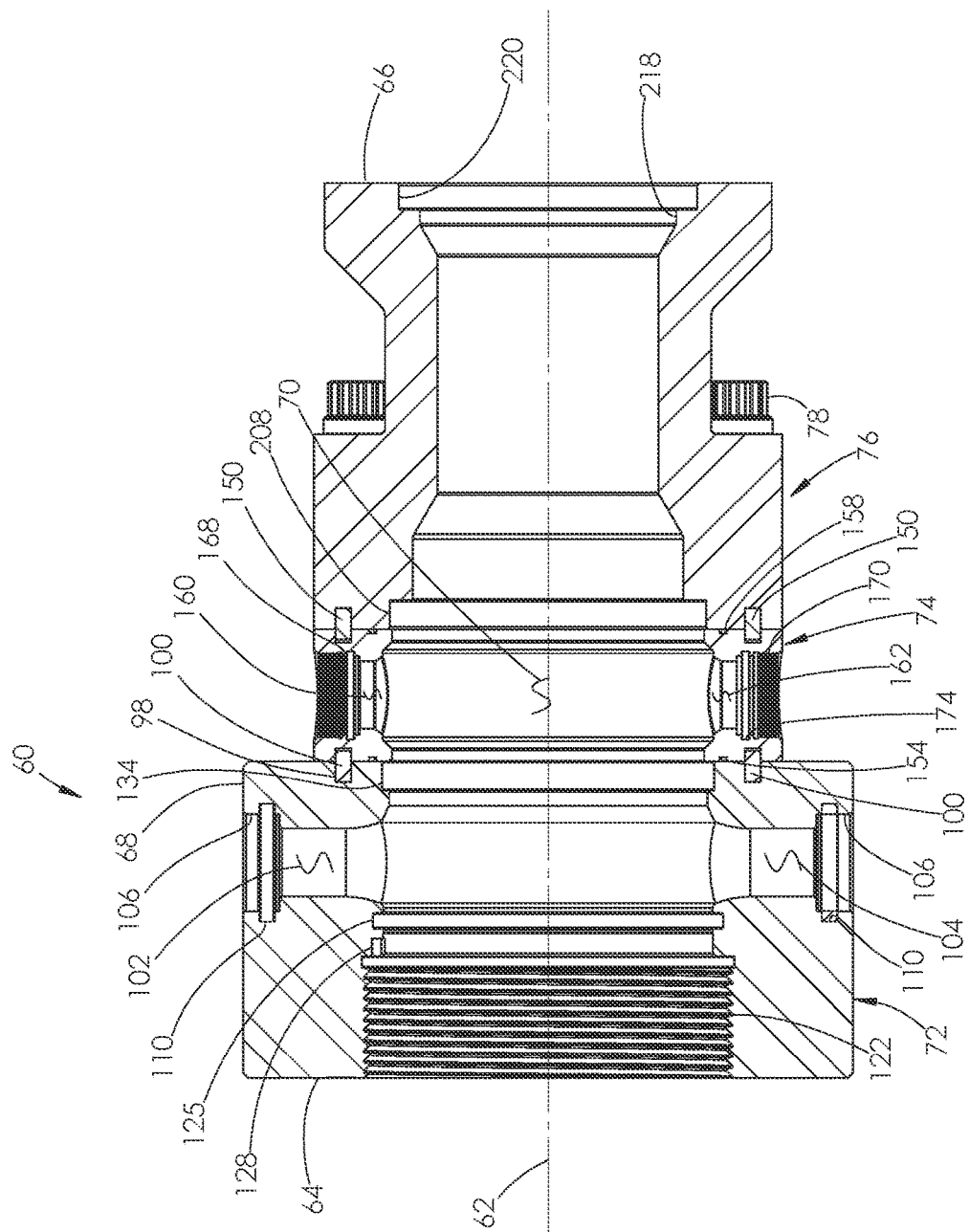
FIG. 14 is a cross-sectional view of the housing shown in FIG. 13, taken along line B-B.
Figure 15:
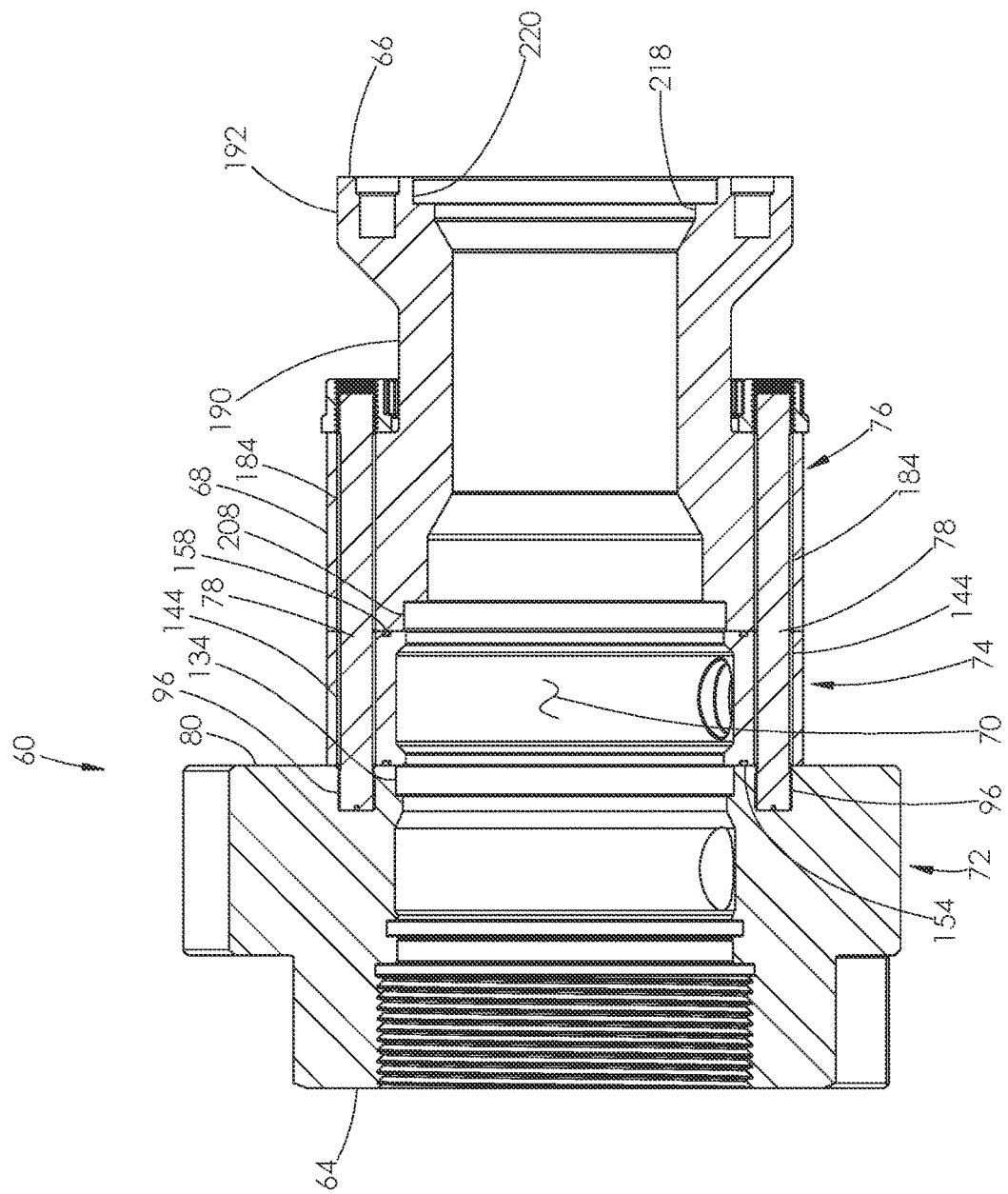
FIG. 15 is a cross-sectional view of the housing shown in FIG. 13, taken along line C-C.

Turning to FIGS. 10-16, each fluid end section 56 comprises a horizontally positioned housing 60 having a longitudinal axis 62 extending therethrough, as shown in FIGS. 10 and 11. The housing 60 has opposed front and rear surfaces 64 and 66 joined by an outer intermediate surface 68. A horizontal bore 70 is formed within the housing 60 and interconnects the front and rear surfaces 64 and 66, as shown in FIGS. 14 and 15. The horizontal bore 70 is sized to receive various components configured to route fluid throughout the housing 60, as shown in FIG. 9. The various components will be described in more detail later herein.

Figure 16:
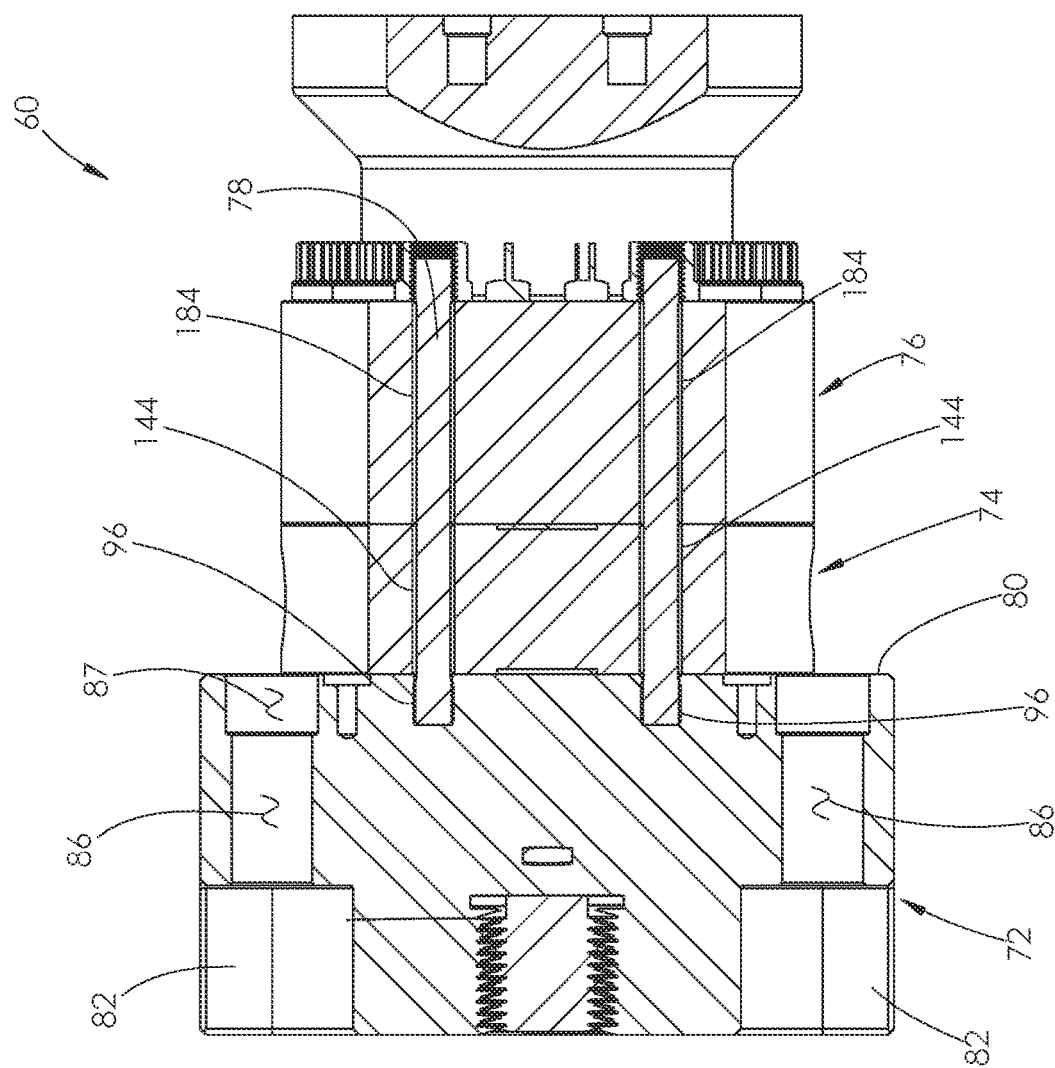
FIG. 16 is a cross-sectional view of the housing shown in FIG. 13, taken along line D-D.

Continuing with FIGS. 10-16, the housing 60 is of multi-piece construction. The housing 60 comprises a first section 72 joined to a second section 74 and a third section 76 by a plurality of first fasteners 78, as shown in FIGS. 15 and 16. By making the housing 60 out of multiple pieces rather than a single, integral piece, any one of the sections 72, 74, and 76 may be removed and replaced with a new section 72, 74, and 76, without replacing the other sections. For example, if a portion of the second section 74 begins to erode or crack, the second section 74 can be replaced without having to replace the first or third sections 72 and 76. In contrast, if the housing 60 were one single piece, the entire housing would need to be replaced, resulting in much more costly repair to the fluid end assembly 52.

First Section of Housing

Figure 17:
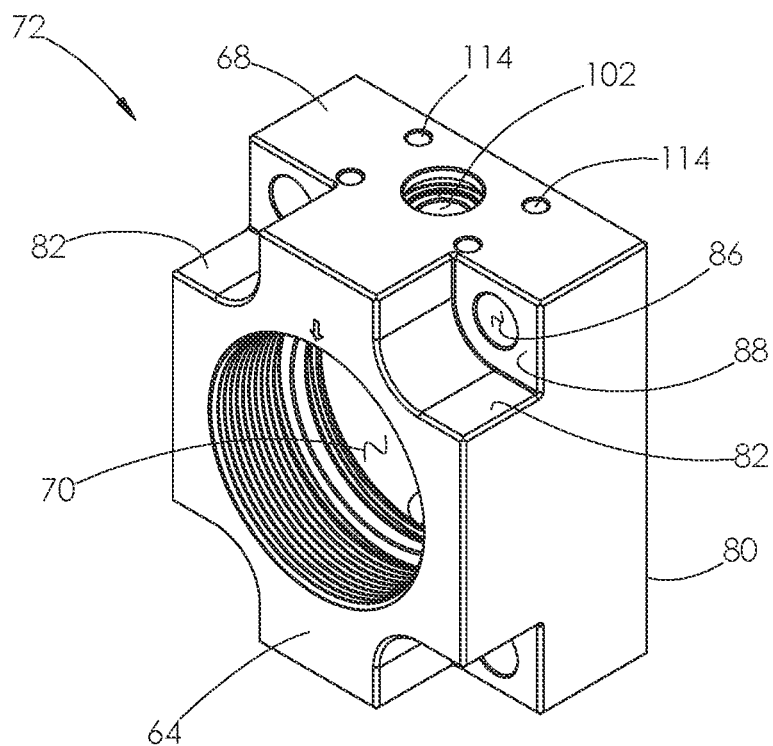
FIG. 17 is a front perspective view of the first section of the housing shown in FIG. 10.
Figure 18:
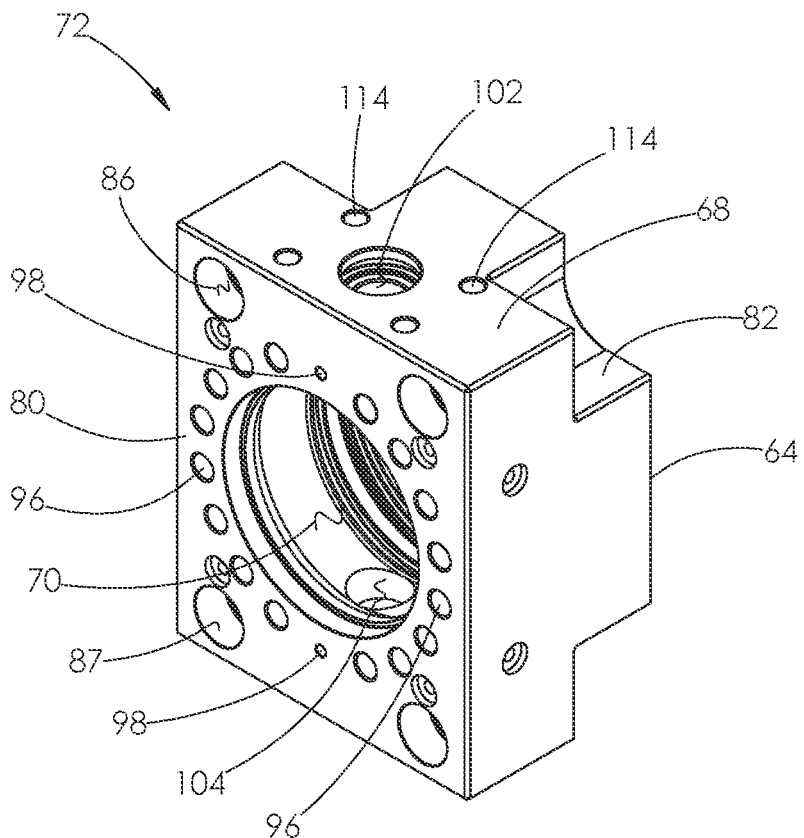
FIG. 18 is a rear perspective view of the first section shown in FIG. 17.
Figure 19:
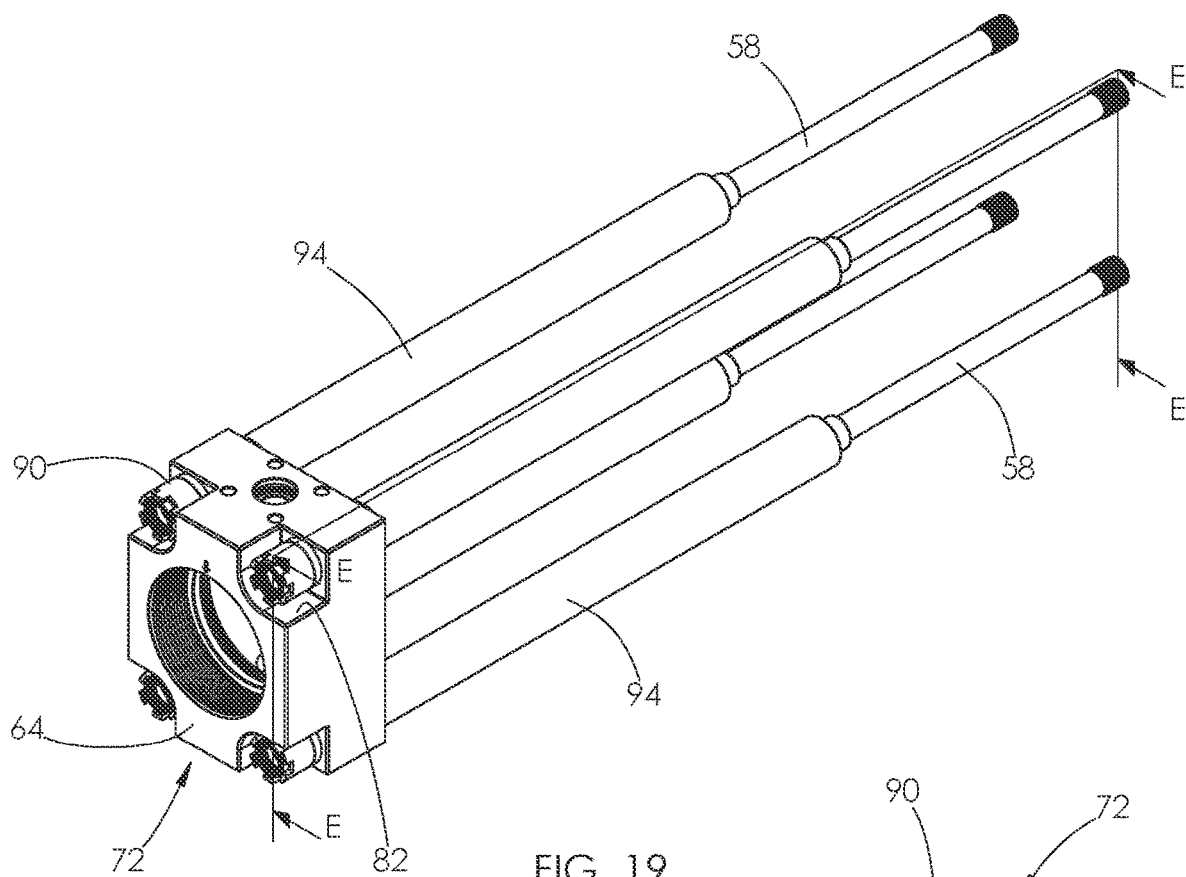
FIG. 19 is a front perspective view of the first section shown in FIG. 17, but the first section has a plurality of stay rods attached thereto.
Figure 20:
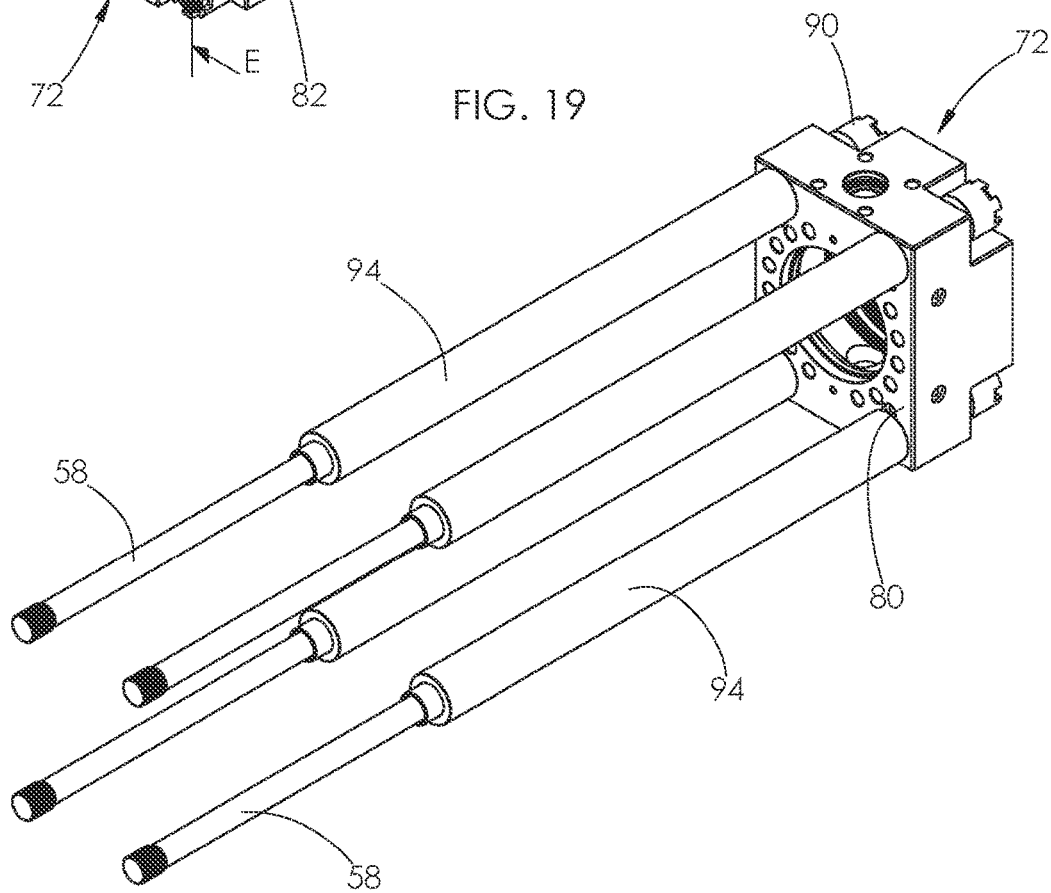
FIG. 20 is a rear perspective view of the first section and stay rods shown in FIG. 19.
Figure 21:
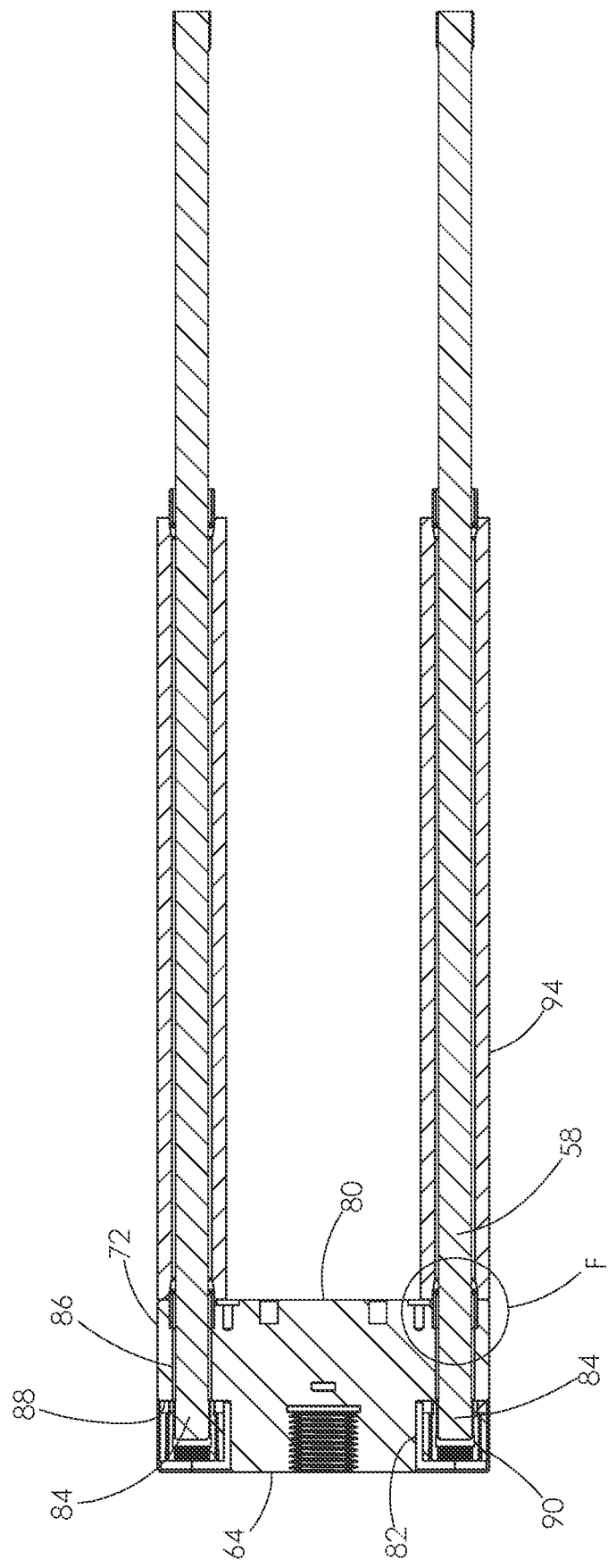
FIG. 21 is a cross-sectional view of the first section and stay rods shown in FIG. 19, taken along line E-E.

Turning to FIGS. 17-21, the first section 72 is positioned at the front end of the housing 60 and includes the front surface 64. During operation, fluid within the first section 72 remains at relatively the same high pressure. Thus, the first section 72 is considered the static or constant high pressure section of the housing 60. The first section 72 is configured to be attached to a plurality of the stay rods 58, as shown in FIGS. 19-21. Thus, each fluid end section 56 is attached to the power end assembly 54 via the first section 72 of the housing 60.

Continuing with FIGS. 17 and 18, each first section 72 comprises the front surface 64 joined to a rear surface 80. The surfaces 64 and 80 are interconnected by a portion of the outer intermediate surface 68 and a portion of the horizontal bore 70. The outer intermediate surface 68 of the first section has the shape of a rectangular prism with a plurality of notches 82 formed within the front surface 64. A notch 82 is formed within each corner of the first section 72 such that the front surface 64 has a cross-sectional shape of a cross sign having radiused corners. The notches 82 are configured to receive a first end 84 of each stay rod 58, as shown in FIG. 21.

With reference to FIGS. 17-21, a plurality of passages 86 are formed in the first section 72. Each passage 86 interconnects the rear surface 80 and a medial surface 88 of the first section 72. The medial surface 88 is defined by the plurality of notches 82. Each passage 86 comprises a counterbore 87 that opens on the rear surface 80, as shown in FIG. 16, and is configured to receive a corresponding one of the stay rods 58. When installed within the first section 72, the first end 84 of each stay rod 58 projects from the medial surface 88 and into the corresponding notch 82, as shown in FIG. 21.

Continuing with FIGS. 19-21, a threaded nut 90 is installed on the first end 84 of each stay rod 58 within each notch 82. The nut 90 is a three-piece nut, also known as a torque nut, that facilitates the application of high torque required to properly fasten the fluid end section 56 to the power end assembly 54. The nut 90 is described in more detail in the '691 application. In alternative embodiments, a traditional 12-point flange nut similar to the flange nut 230, shown in FIGS. 27 and 28, may be installed on the first end 84 of each stay rod 58 instead of the nut 90.

Figure 22:
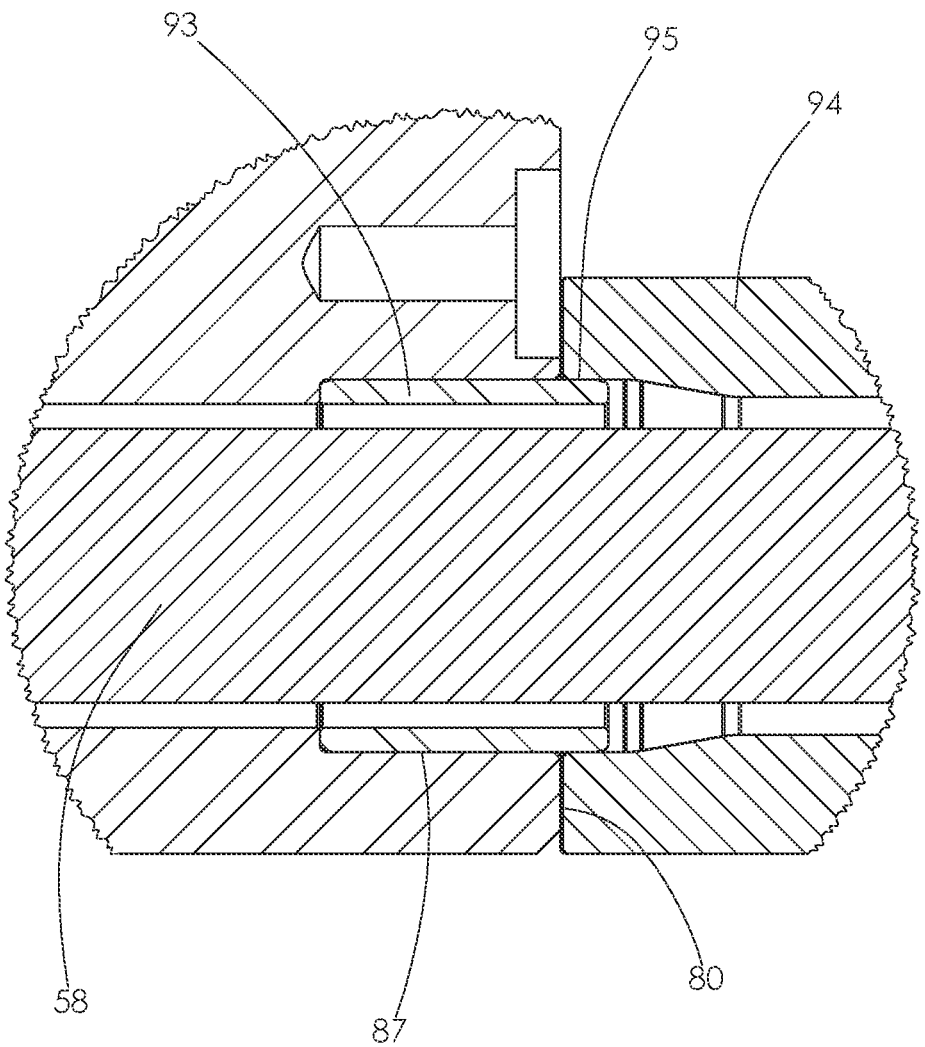
FIG. 22 is an enlarged view of area F shown in FIG. 21.

Continuing with FIGS. 19-22, a sleeve 94 is disposed around a portion of each stay rod 58 and extends between the rear surface 80 of the first section 72 and the power end assembly 54, as shown in FIG. 3. A dowel sleeve 93 is inserted into each counterbore 87 formed in each passage 86, as shown in FIG. 22. When installed therein, a portion of the dowel sleeve 93 projects from the rear surface 80 of the first section 72. A counterbore 95 is formed within the hollow interior of the sleeve 94 for receiving the projecting end of the dowel sleeve 93, as shown in FIG. 22. The dowel sleeve 93 aligns the sleeve 94 and the passage 86 concentrically. Such alignment maintains a planar engagement between the rear surface 80 of the first section 72 and the sleeve 94. When the nut 90 is torqued against the medial surface 88 of the first section 72, the sleeve 94 abuts the rear surface 80 of the first section 72, rigidly securing the first section 72 to the stay rod 58.

Turning back to FIGS. 14-16, and 18, a plurality of threaded openings 96 are formed in the rear surface 80 of the first section 72. The openings 96 surround an opening of the horizontal bore 70, as shown in FIG. 18. Each opening 96 is configured to receive a corresponding one of the first fasteners 78 used to secure the sections 72, 74, and 76 together, as shown in FIGS. 15 and 16. A plurality of dowel openings 98 are also formed in the rear surface 80 adjacent the openings 96, as shown in FIGS. 14 and 18. The dowel openings 98 are configured to receive first alignment dowels 100, as shown in FIG. 14. The first alignment dowels 100 assist in properly aligning the first section 72 and the second section 74 during assembly of the housing 60.

Continuing with FIG. 14, a pair of upper and lower discharge bores 102 and 104 are formed within the first section 72 and interconnect the intermediate surface 68 and the horizontal bore 70. The upper and lower discharge bores 102 and 104 shown in FIG. 14 are collinear. In alternative embodiments, the bores 102 and 104 may be offset from one another and not collinear. Each bore 102 and 104 may include a counterbore 106 that opens on the intermediate surface 68. Each counterbore 106 is sized to receive a portion of a discharge fitting adapter 504, as shown in FIG. 9. The fitting adapter 504 spans between the discharge bore 102 or 104 and a discharge fitting 108 attached to the outer intermediate surface 68 of the first section 72.

Continuing with FIG. 14, a groove 110 may be formed in the side walls of the counterbore 106 for receiving a seal 112. The seal 112 engages an outer surface of the fitting adapter 504 to prevent fluid from leaking between the first section 72 and the discharge fitting 108, as shown in FIG. 9.

With reference to FIGS. 17 and 18, a plurality of threaded openings 114 are formed in the intermediate surface 68 and surrounding the opening of the upper and lower discharges bores 102 and 104. The threaded openings 114 are configured to receive a plurality of threaded fasteners 116 configured to secure a discharge fitting 108 to the first section 72, as shown in FIG. 9.

Continuing with FIGS. 14 and 15, the walls surrounding the horizontal bore 70 within the first section 72 and positioned between the front surface 64 and the upper and lower discharge bores 102 and 104 are sized to receive a front retainer 118 and a discharge plug 120, as shown in FIG. 9. The discharge plug 120 seals fluid from leaking from the front surface 64 of the housing 60, and the front retainer 118 secures the discharge plug 120 within the first section 72 of the housing 60.

Figure 76:
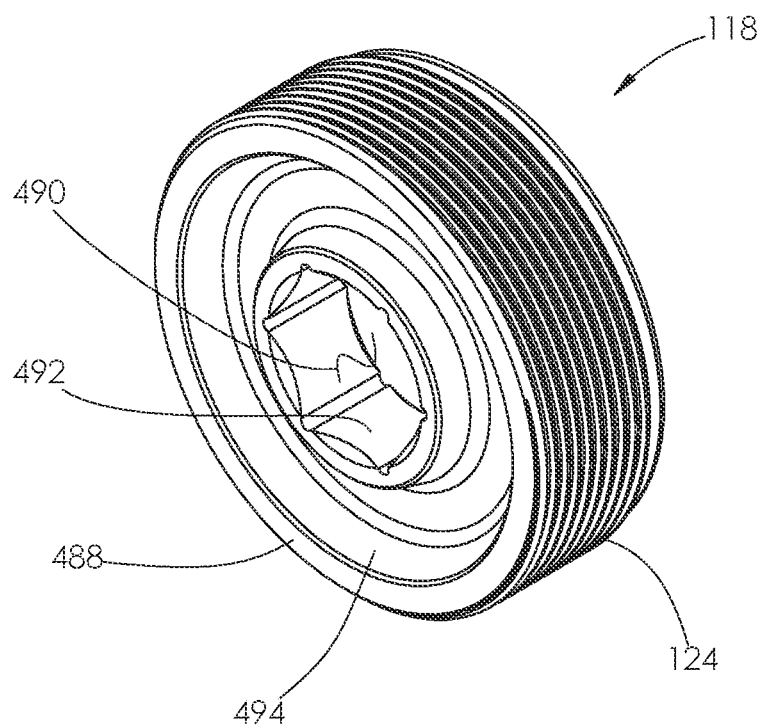
FIG. 76 is a front perspective view of the front retainer shown in FIGS. 40 and 41.
Figure 77:
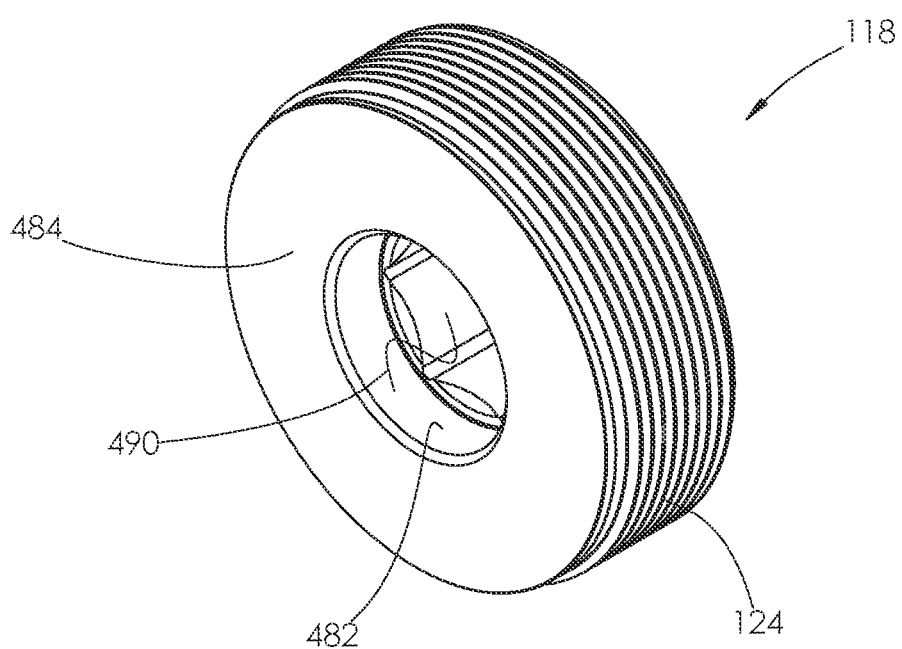
FIG. 77 is a rear perspective view of the front retainer shown in FIG. 76.

Continuing with FIGS. 14 and 15, internal threads 122 are formed in the walls of the first section 72 for mating with external threads 124, shown in FIGS. 76 and 77, formed on an outer surface of the front retainer 118. In contrast, an outer surface of the discharge plug 120 faces flat walls of the first section 72. A small amount of clearance may exist between the plug 120 and the walls of the first section 72.

Continuing with FIGS. 14 and 15, a groove 125 may be formed in such walls for receiving a seal 126 configured to engage an outer surface of the discharge plug 120, as shown in FIG. 9. The seal 126 prevents fluid from leaking around the discharge plug 120 during operation. A locating cutout 128 may further be formed in the walls that is configured to receive a locating dowel pin 130. As will be described later herein, the locating dowel pin 130 is used to properly align the discharge plug 120 within the housing 60.

Continuing with FIGS. 14 and 15, the walls surrounding the horizontal bore 70 and positioned between the upper and lower discharge bores 102 and 104 and the rear surface 80 of the first section 72 are sized to receive a portion of a fluid routing plug 132, as shown in FIG. 9. This area of the walls surrounding the horizontal bore 70 includes a counterbore 134 that opens on the rear surface 80. The counterbore 134 is sized to receive a wear ring 136, as shown in FIG. 9. The wear ring 136 has an annular shape and is configured to engage a first seal 386 installed within an outer surface of the fluid routing plug 132, as shown in FIG. 9. In alternative embodiments, the first section 72 may not include the counterbore 134 or the wear ring 136 and instead may be sized to directly engage the first seal 386 installed within the fluid routing plug 132.

Continuing with FIG. 9, in addition to the above mentioned components, the first section 72 is also configured to house a discharge valve 138. The components discussed above and installed within the first section 72 will be described in more detail later herein.

Second Section of Housing

Figure 23:
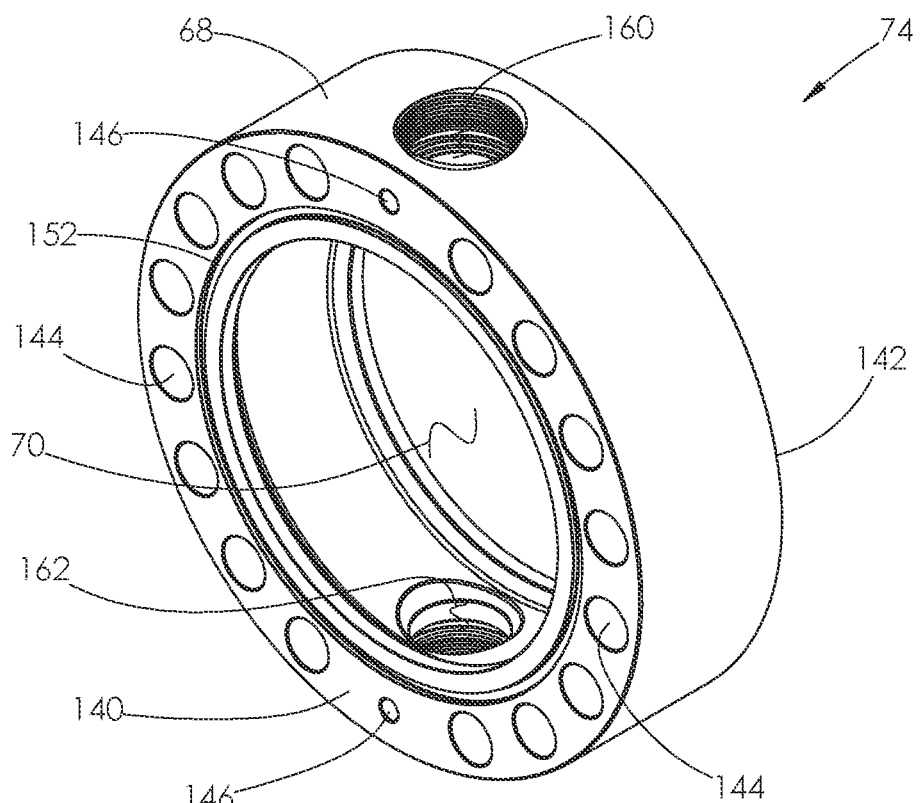
FIG. 23 is a front perspective view of a second section of the housing shown in FIG. 10.
Figure 24:
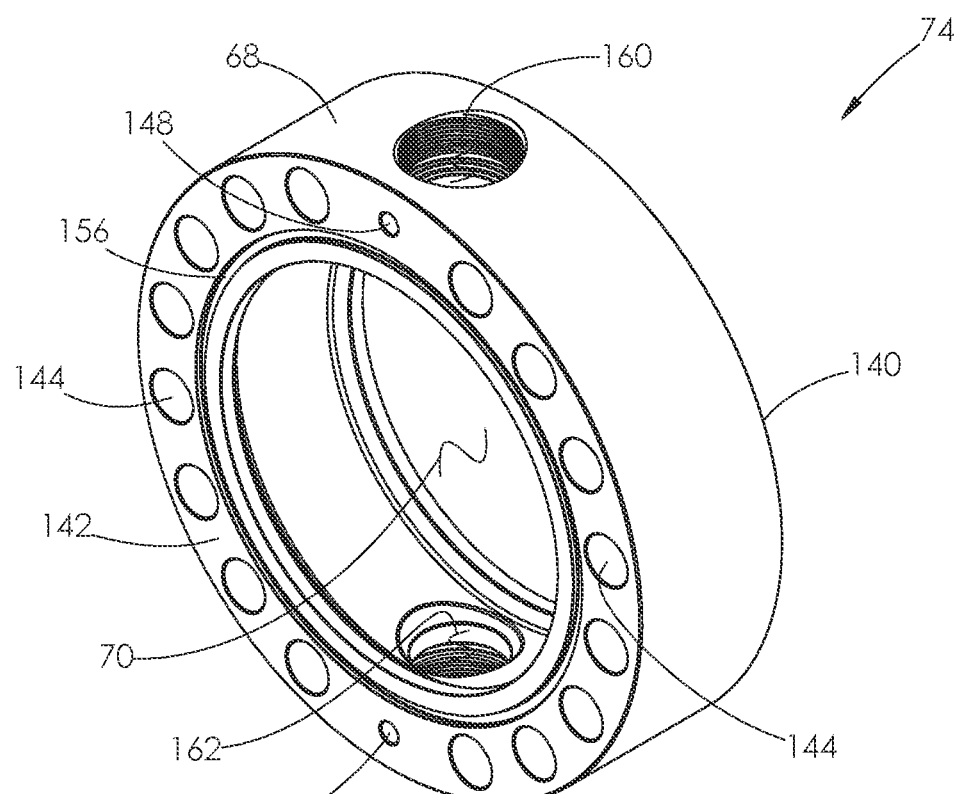
FIG. 24 is a rear perspective view of the second section shown in FIG. 23.

Turning to FIGS. 23 and 24, the second section 74 of the housing 60 is configured to be positioned between the first and third sections 72 and 76 and has a cylindrical cross-sectional shape. During operation, fluid pressure within the second section 74 remains at relatively the same pressure. The pressure is lower than that within the first section 72. Thus, the second section 74 may be referred to as the static or constant low pressure section of the housing 60. The second section 74 comprises opposed front and rear surfaces 140 and 142 joined by a portion of the outer intermediate surface 68 and a portion of the horizontal bore 70.

Continuing with FIGS. 15, 16, 23, and 24, a plurality of passages 144 are formed in the second section 74. The passages 144 surround the horizontal bore 70 and interconnect the front and rear surfaces 140 and 142, as shown in FIGS. 15 and 16. Each passage 144 is configured to receive a corresponding one of the first fasteners 78 used to secure the sections 72, 74, and 76 of the housing 60 together.

Continuing with FIGS. 14, 23, and 24, a plurality of dowel openings 146 are formed in the front surface 140 of the second section 74, as shown in FIG. 23. The dowel openings 146 align with the dowel openings 98 formed in the rear surface 80 of the first section 72 and are configured to receive a portion of the first alignment dowels 100, as shown in FIG. 14. Likewise, a plurality of dowel openings 148 are formed in the rear surface 142 of the second section 74, as shown in FIG. 24. The dowel openings 148 are configured to receive a portion of second alignment dowels 150, as shown in FIG. 14. The second alignment dowels 150 are configured to align the second section 74 and the third section 76 during assembly.

Continuing with FIGS. 14, 15, 23 and 24, a first annular groove 152 is formed in the front surface 140 of the second section 74 such that it surrounds an opening of the horizontal bore 70, as shown in FIG. 23. The first groove 152 is positioned between the horizontal bore 70 and the plurality of passages 144 and is configured to receive a first seal 154, as shown in FIGS. 14 and 15. Likewise, a second annular groove 156 is formed in the rear surface 142 of the second section 74 and positioned between the horizontal bore 70 and the plurality of passages 144, as shown in FIG. 24. The second groove 156 is configured to receive a second seal 158, as shown in FIGS. 14 and 15. The seals 154 and 158 shown in FIGS. 14 and 15 are O-rings. The seals 154 and 158 prevent fluid from leaking between the first and second sections 72 and 74 and between the second and third sections 74 and 76 during operation.

Continuing with FIGS. 14, 23, and 24, a pair of upper and lower suction bores 160 and 162 are formed within the second section 74 and interconnect the intermediate surface 68 and the horizontal bore 70. The upper and lower suction bores 160 and 162 shown in FIG. 14 are collinear. In alternative embodiments, the bores 160 and 162 may be offset from one another and not collinear.

Continuing with FIGS. 9 and 14, the suction bores 160 and 162 are each configured to receive a suction conduit 166, as shown in FIG. 9. The suction conduit 166 comprises a first connection member 164 configured to mate with the housing 60. Each suction bore 160 and 162 opens into a counterbore 168 sized to receive a portion of the first connection member 164. Internal threads 170 are formed in a portion of the walls surrounding the counterbore 168 for mating with external threads 172, shown in FIG. 78, formed on the first connection member 164.

Continuing with FIGS. 9 and 14, a groove 174 is formed in the walls surrounding the counterbore 168 and configured to receive a seal 176, as shown in FIG. 9. The seal 176 engages an outer surface of the first connection member 164 to prevent fluid from leaking from the housing 60 during operation. The suction conduits 166 will be described in more detail later herein.

Continuing with FIGS. 9, 14, and 15, the walls surrounding the horizontal bore 70 within the second section 74 are configured to receive a majority of the fluid routing plug 132, as shown in FIG. 9. A small amount of clearance may exist between the walls of the second section 74 and an outer surface of the fluid routing plug 132.

Third Section of Housing

Turning to FIGS. 14-16, 25 and 26, the third section 76 of the housing 60 is positioned at the rear end of the housing 60 and includes the rear surface 66. The third section 76 has a generally cylindrical cross-sectional shape. Fluid pressure within the third section 76 varies during operation. Thus, the third section 76 may be referred to as the dynamic or variable pressure section of the housing 60.

Figure 25:
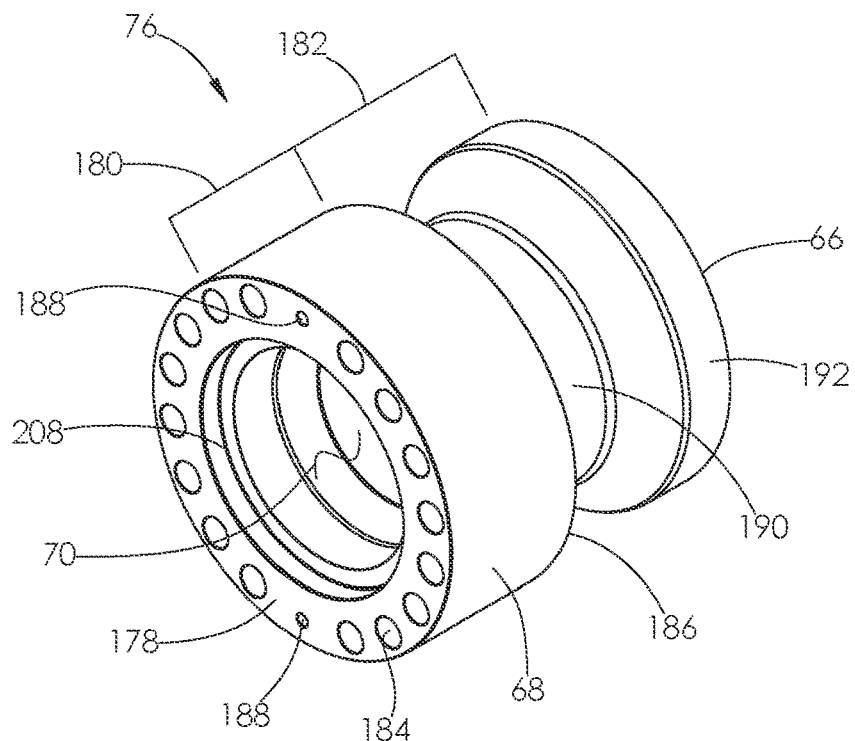
FIG. 25 is a front perspective view of the third section of the housing shown in FIG. 10.
Figure 26:
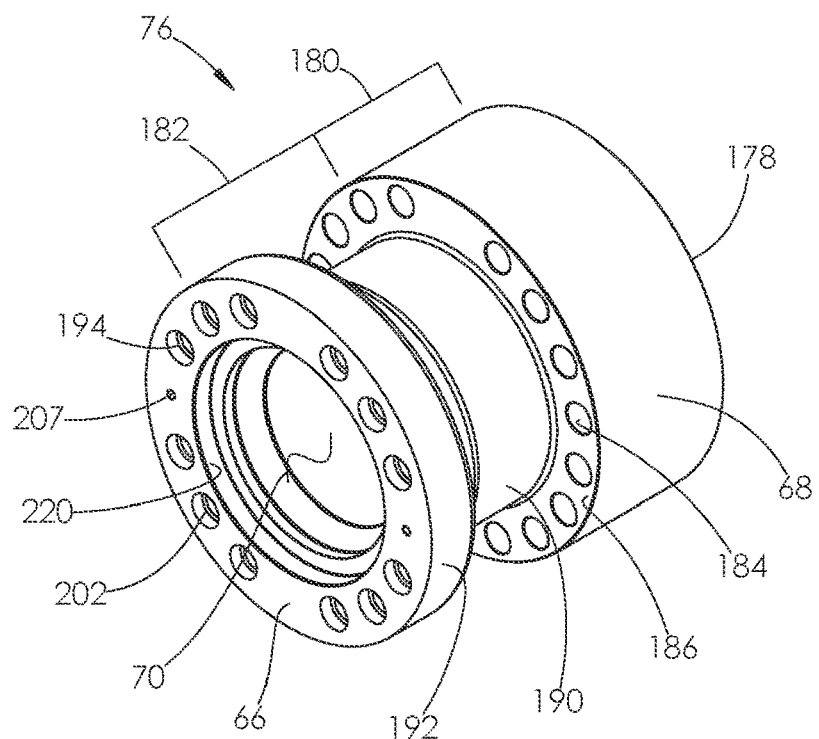
FIG. 26 is a rear perspective view of the third section shown in FIG. 25.

Continuing with FIGS. 25 and 26, the third section 76 comprises a front surface 178 joined to the rear surface 66 of the housing 60 by a portion of the outer intermediate surface 68 and a portion of the horizontal bore 70. The outer intermediate surface 68 of the third section 76 varies in diameter such that the third section 76 comprises a front portion 180 joined to a rear portion 182.

Continuing with FIGS. 15, 16, 25, and 26, the front portion 180 has a constant outer diameter and has a plurality of passages 184 formed therein. The passages 184 interconnect the front surface 178 and a medial surface 186 of the third section 76. The passages 184 align with the plurality of passages 144 formed in the second section 74 and the threaded openings 96 formed in the first section 72 of the housing 60, as shown in FIGS. 14 and 15. The passages 184 are configured to receive the first fasteners 78 used to secure the sections 72, 74, and 76 together.

Continuing with FIGS. 14 and 25, a plurality of dowel openings 188 are formed in the front surface 178 of the third section 76, as shown in FIG. 25. The dowel openings 188 are configured to receive a portion of second alignment dowels 150, as shown in FIG. 14. The second alignment dowels 150 are configured to properly align the third section 76 within the second section 74 during assembly.

Continuing with FIGS. 25 and 26, the rear portion 182 of the third section 76 comprises a neck 190 joined to a shoulder 192. The neck 190 interconnects the front portion 180 and the shoulder 192. The shoulder 192 includes the rear surface 66 of the housing 60. The neck 190 has a smaller outer diameter than that of the front portion 180 and the shoulder 192 to provide clearance for the plurality of passages 184 formed in the front portion 180.

Figure 29:
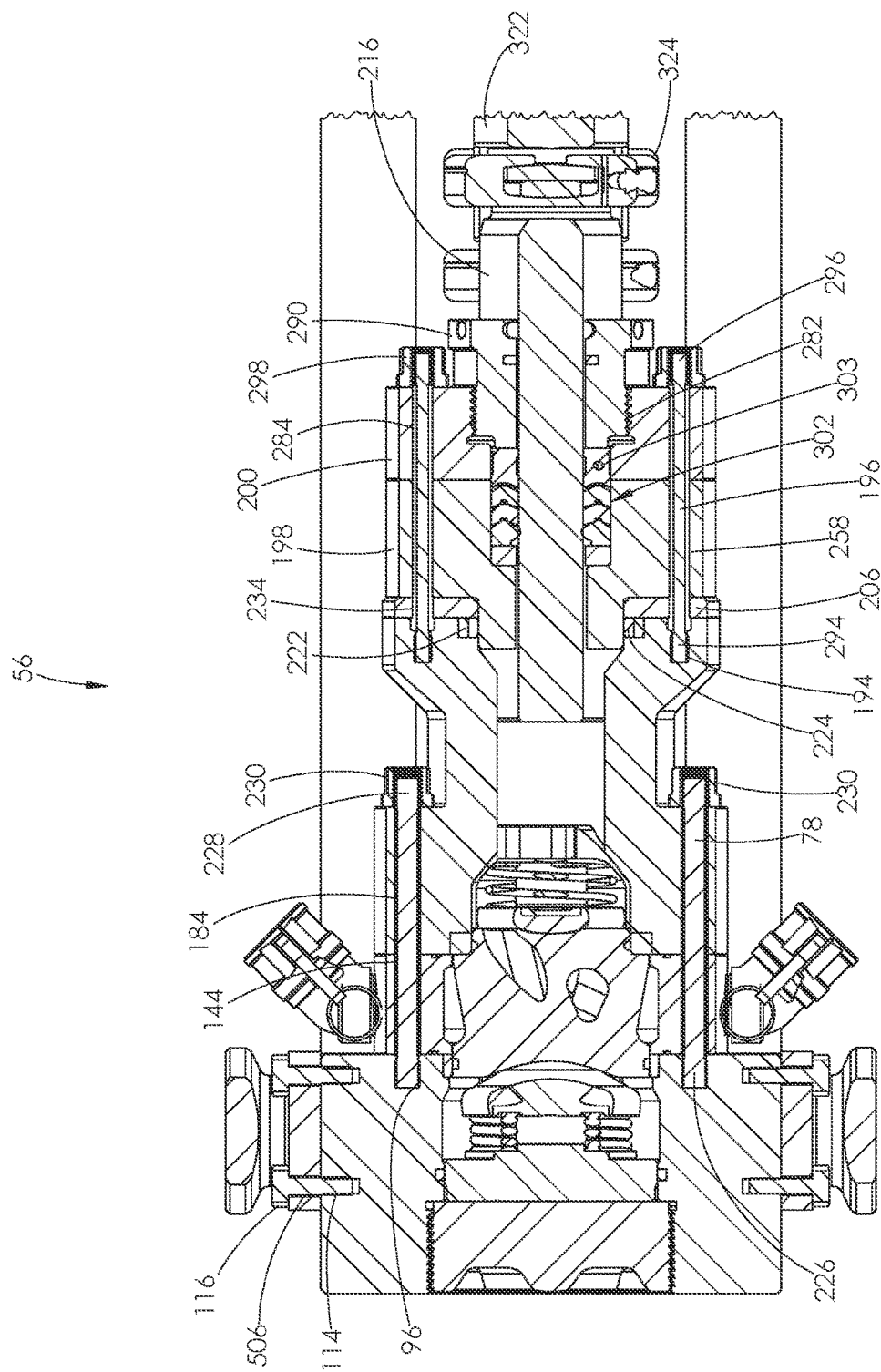
FIG. 29 is a cross-sectional view of the fluid end assembly shown in FIG. 6, taken along line G-G.

With reference to FIGS. 25 and 26, a plurality of first threaded openings 194 are formed in the rear surface 66 of the third section 76. The first threaded openings 194 are configured to receive a plurality of second fasteners 196, as shown in FIG. 29. The second fasteners 196 are configured to secure a stuffing box 198 and a rear retainer 200 to the third section 76 of the housing 60, as shown in FIG. 29. The stuffing box 198 and the rear retainer 200 will be described in more detail later herein.

Figure 32:
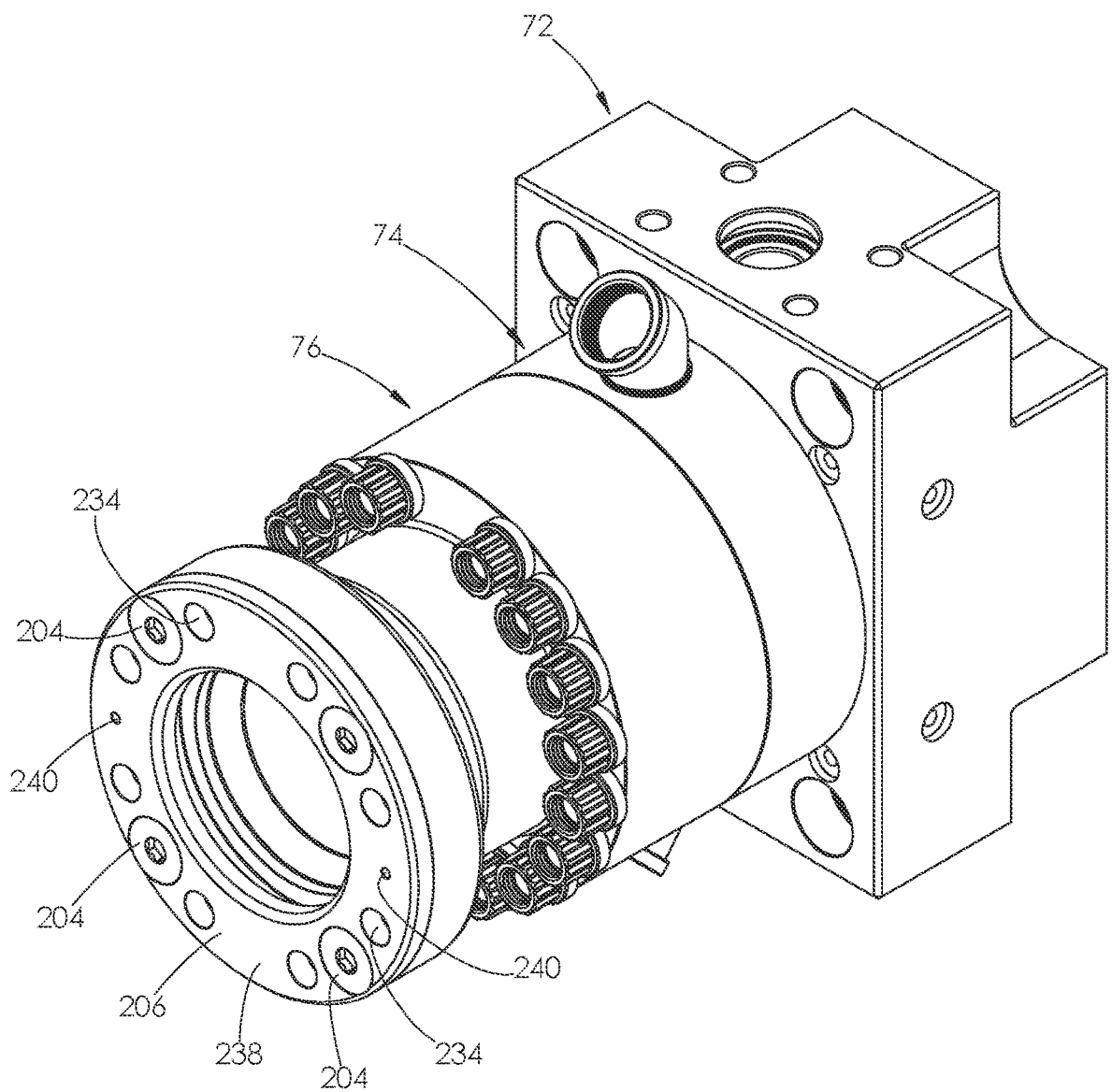
FIG. 32 is a rear perspective view of the retention plate shown in FIG. 30 attached to the housing shown in FIG. 10.
Figure 39:
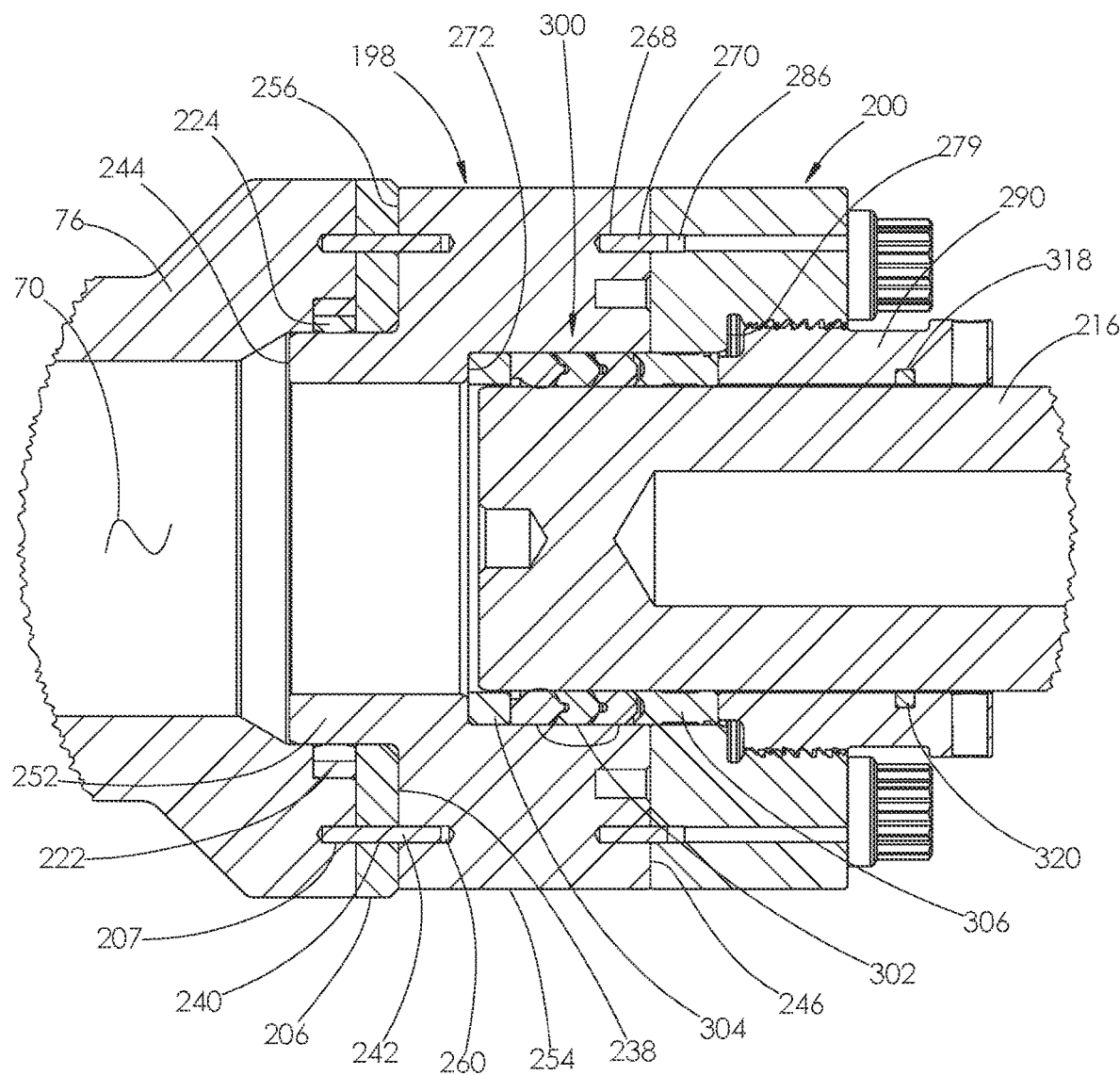
FIG. 39 is an enlarged cross-sectional view of the components attached to a rear surface of the housing in FIG. 9.

With reference to FIGS. 26 and 32, a plurality of second threaded openings 202 are also formed in the rear surface 66 of the third section 76, as shown in FIG. 26. The second threaded openings 202 are configured to receive a plurality of third fasteners 204. The third fasteners 204 are configured to secure a retention plate 206 to the rear surface of the housing 60, as shown in FIG. 32. The retention plate 206 will be described in more detail later herein. A plurality of dowel openings 207 are also formed in the rear surface of the third section 76. The dowel openings 207 are configured to receive third alignment dowels 242, as shown in FIG. 39.

Turning back to FIGS. 9, 14, 15, and 25, a counterbore 208 is formed in the walls surrounding the horizontal bore 70 within the third section 76 and opens on the front surface 178. The counterbore 208 is configured to receive a hardened insert 210, as shown in FIG. 9. The insert 210 will be described in more detail later herein. The insert 210 engages portions of the fluid routing plug 132 when the fluid routing plug 132 is installed within the housing 60, as shown in FIG. 9. The walls surrounding the horizontal bore 70 between the counterbore 208 and the medial surface 186 of the third section 76 are further configured to receive a suction valve guide 212. A suction valve 214 is also installed within the third section 76 of the housing 60. The suction valve 214 and suction valve guide 212 will be described in more detail later herein.

Continuing with FIGS. 9, 14, 15, 25, and 26, the walls surrounding the horizontal bore 70 within the neck 190 of the rear portion 182 are sized to receive at least a portion of a reciprocating plunger 216, as shown in FIG. 9. The portion of the horizontal bore 70 extending through the neck 190 has a uniform diameter and opens into a first counterbore 218 formed in the shoulder 192, as shown in FIGS. 14 and 15. The first counterbore 218 is sized to receive a portion of the stuffing box 198, as shown in FIG. 9. The first counterbore 218 opens into a second counterbore 220, of which opens on the rear surface 66 of the housing 60, as shown in FIGS. 14, 15, and 26. The second counterbore 220 is sized to receive a wear ring 222 and a seal 224, as shown in FIG. 9. The wear ring 222 and the seal 224 each have an annular shape. When such components are installed within the housing 60, the wear ring 222 surrounds the seal 224, and the seal 224 engages an outer surface of the stuffing box 198.

Assembly of Housing

Figure 27:
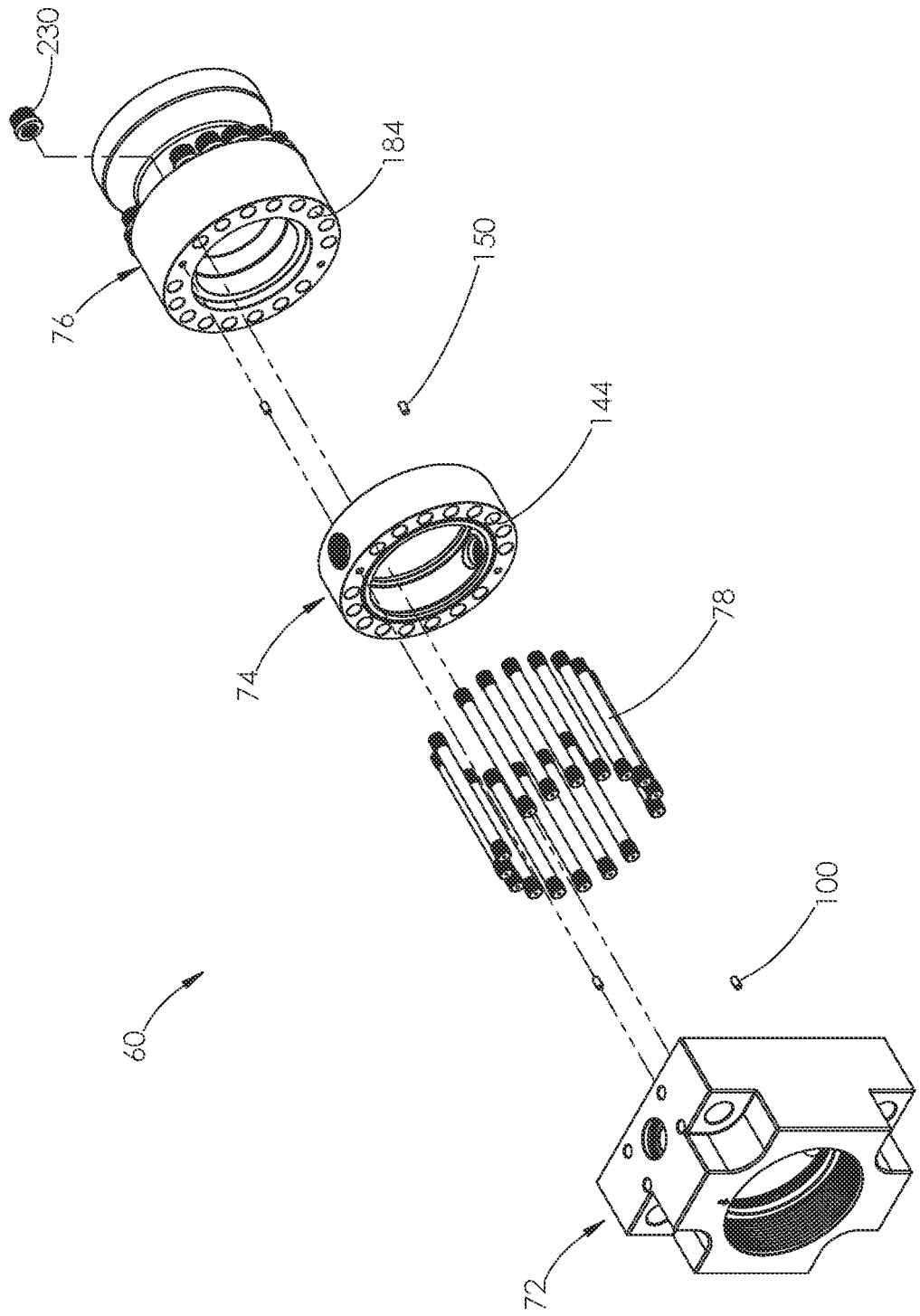
FIG. 27 is a front perspective and exploded view of the housing shown in FIG. 10.
Figure 28:
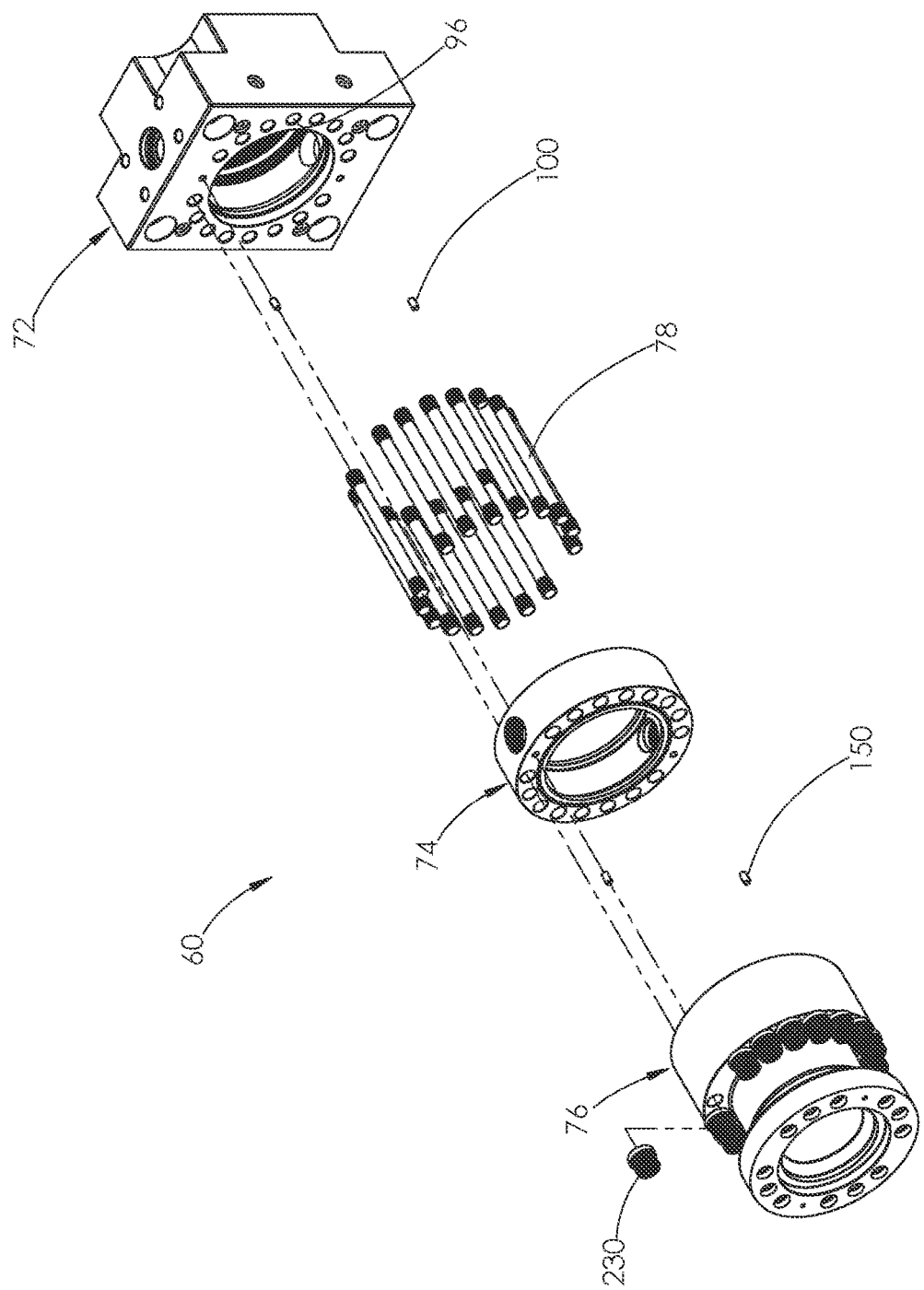
FIG. 28 is a rear perspective and exploded view of the housing shown in FIG. 10.

Turning to FIGS. 27-29, the housing 60 is assembled by threading a first end 226 of each of the first fasteners 78 into a corresponding one of the threaded openings 96 formed in the first section 72. Once installed therein, the first fasteners 78 project from the rear surface 80 of the first section 72. The second and third sections 74 and 76 may then be slid onto the fasteners 78 projecting from the first section 72 using the corresponding passages 144 and 184. The first and second alignment dowels 100 and 150 help to further align the sections 72, 74, and 76 together during assembly.

Continuing with FIGS. 27-29, when the second and third sections 74 and 76 are installed on the fasteners 78, a second end 228 projects from the medial surface 186 of the third section 76, as shown in FIG. 29. A flange nut 230 is installed on the second end 228 and torqued against the medial surface 186, tightly securing the sections 72, 74, and 76 together. When the housing 60 is assembled, a footprint of the rear surface 142 of the second section 74 is entirely within a footprint of the rear surface 80 of the first section 72, as shown in FIG. 29.

Continuing with FIGS. 27-29, the first fastener 78 shown in the figures is a threaded stud. In alternative embodiments, other types of fasteners known in the art may be used instead of a threaded stud. For example, screws or bolts may be used to secure the sections together. In further alternative embodiments, the nut may comprise the three-piece nut 90, shown in FIGS. 19-21.

Continuing with FIGS. 27-29, to remove a section 72, 74, or 76, the nut 230 is unthreaded from the second end 228 of each first fastener 78. The sections 72, 74, and 76 may then be pulled apart, as needed. If the first section 72 is being replaced, the first fasteners 78 are also unthreaded from the threaded openings 96. The components installed within the housing 60 may also be removed, as needed, prior to disassembling the housing 60.

Components Attached to Rear Surface of Housing

Turning to FIGS. 29-32, in addition to the housing 60, the fluid end section 56 comprises a plurality of components attached to the rear surface 66 of the housing 60. Such components are configured to receive the plunger 216. The various components include the retention plate 206, the stuffing box 198, and the rear retainer 200, previously mentioned. The components further comprise a plunger packing 300, and a packing nut 290.

Retention Plate

Continuing with FIGS. 29-32, the retention plate 206 has a cylindrical cross-sectional shape and is sized to cover the rear surface 66 of the housing 60 and the wear ring 222 and the seal 224, as shown in FIG. 29. The retention plate 206 holds the wear ring 222 and the seal 224 within the housing 60 in the event the stuffing box 198 needs to be removed.

Continuing with FIGS. 29-32, the retention plate 206 comprises opposed front and rear surface 237 and 238 joined by a central opening 239 formed therein. A plurality of first passages 234 are formed in the retention plate 206 and surround the central opening 239 of the plate 206. The first passages 234 align with the first threaded openings 194 formed in the rear surface 66 of the housing 60 and are configured to receive the plurality of second fasteners 196.

Figure 30:
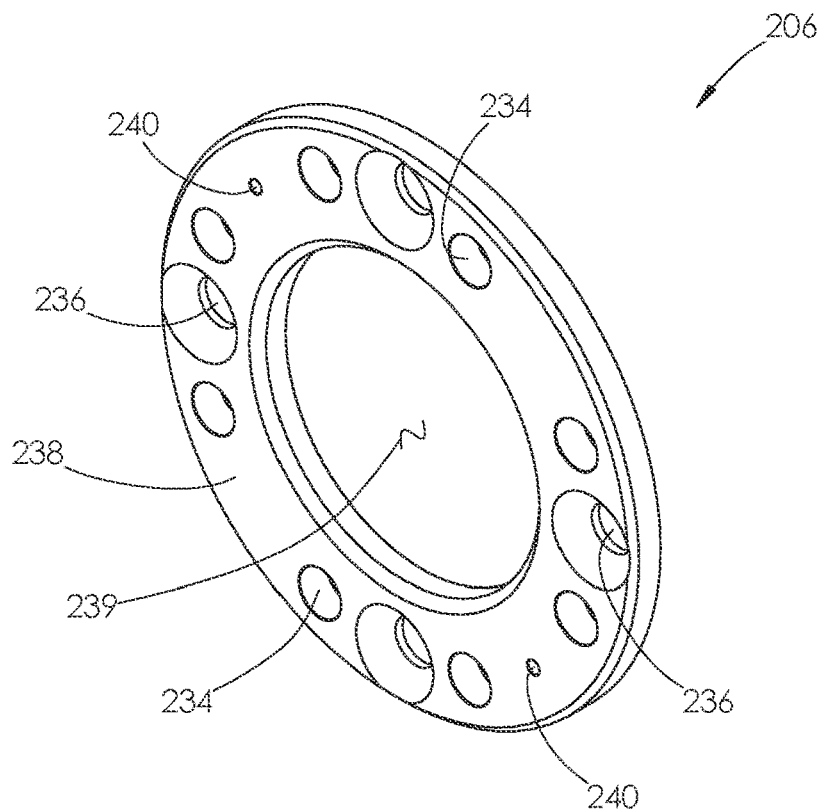
FIG. 30 is a rear perspective view of the retention plate shown in FIGS. 9 and 29.
Figure 31:
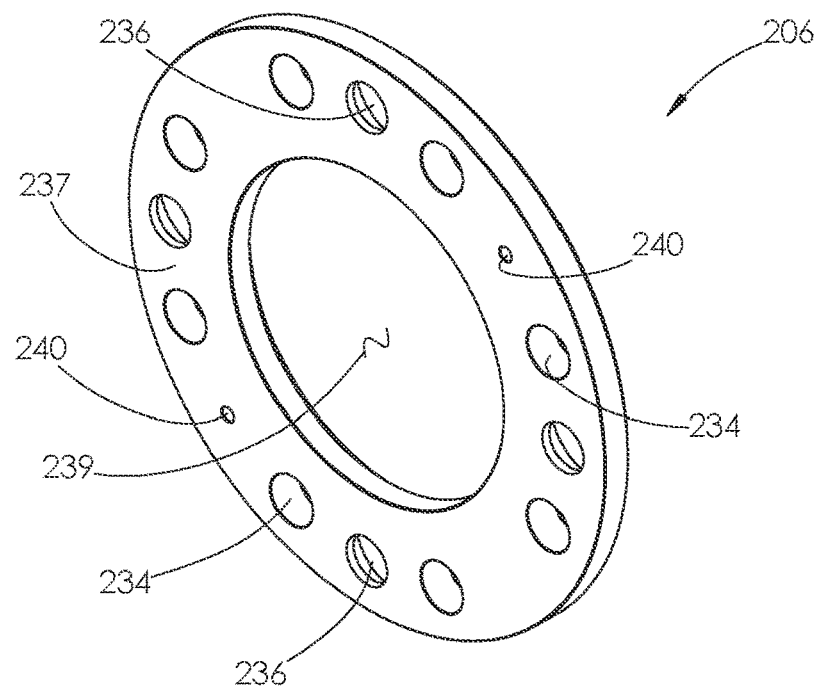
FIG. 31 is a front perspective view of the retention plate shown in FIG. 30.

Continuing with FIGS. 30-32, a plurality of second passages 236 are also formed in the retention plate 206. The second passages 236 align with the second threaded openings 202 formed in the rear surface 66 of the housing 60 and are configured to receive the third fasteners 204, as shown in FIG. 32. A third fastener 204 is threaded into one of the second threaded openings 202 and turned until it sits flush with the rear surface 238 of the retention plate 206, as shown in FIG. 32.

Continuing with FIGS. 30-32, a plurality of dowel openings 240 are formed in the retention plate 206 for receiving third alignment dowels 242, as shown in FIG. 39. The third alignment dowels 242 assist in properly aligning the retention plate 206 and the stuffing box 198 on the housing 60 during assembly.

Turning back to FIG. 29, since fluid does not contact the retention plate 206 during operation, the retention plate 206 may be made of a different and less costly material than that of the housing 60 or the stuffing box 198. For example, the retention plate 206 may be made of alloy steel, while the housing 60 and stuffing box 198 are made of stainless steel.

Stuffing Box

Turning to FIGS. 29, 33, 34, and 39, the stuffing box 198 comprises opposed front and rear surfaces 244 and 246 joined by an outer intermediate surface 248 and a central passage 250 formed therein. The stuffing box 198 further comprises a front portion 252 joined to a rear portion 254. The front portion 252 has a smaller outer diameter than the rear portion 254 such that a medial surface 256 is formed between the front and rear surfaces 244 and 246. The front portion 252 includes the front surface 244 of stuffing box 198, and the rear portion 254 includes the rear surface 246 of the stuffing box 198. An internal shoulder 272 is formed within the walls surrounding the central passage 250 within the rear portion 254 of the stuffing box 198.

Figure 33:
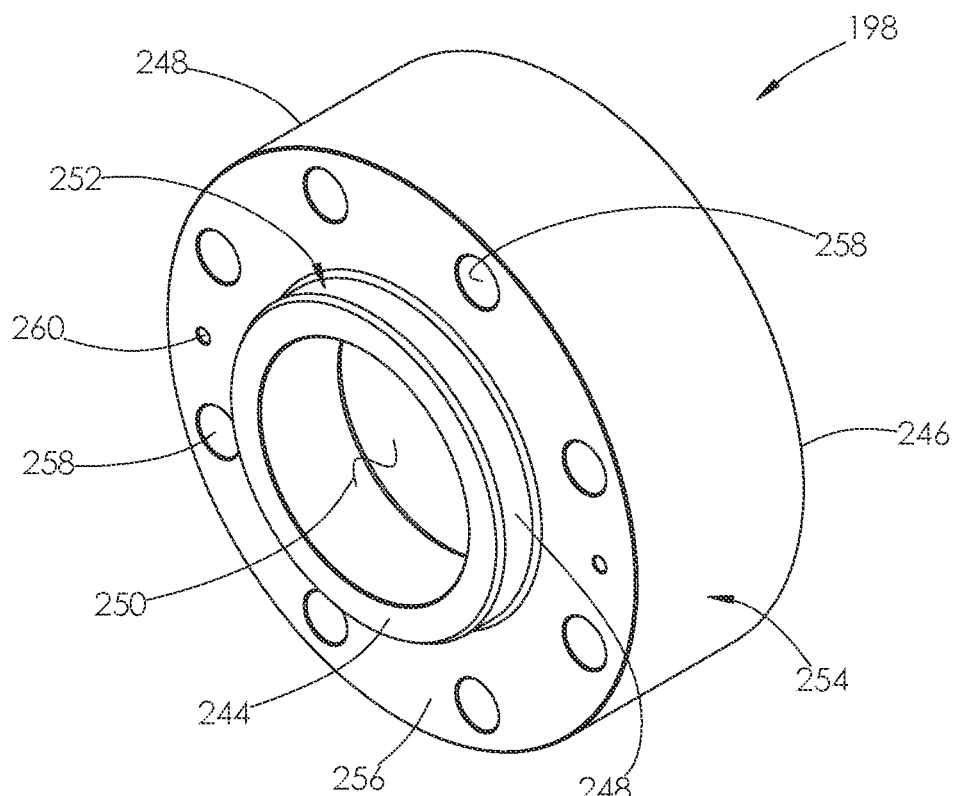
FIG. 33 is a front perspective view of the stuffing box shown in FIGS. 9 and 29.
Figure 34:
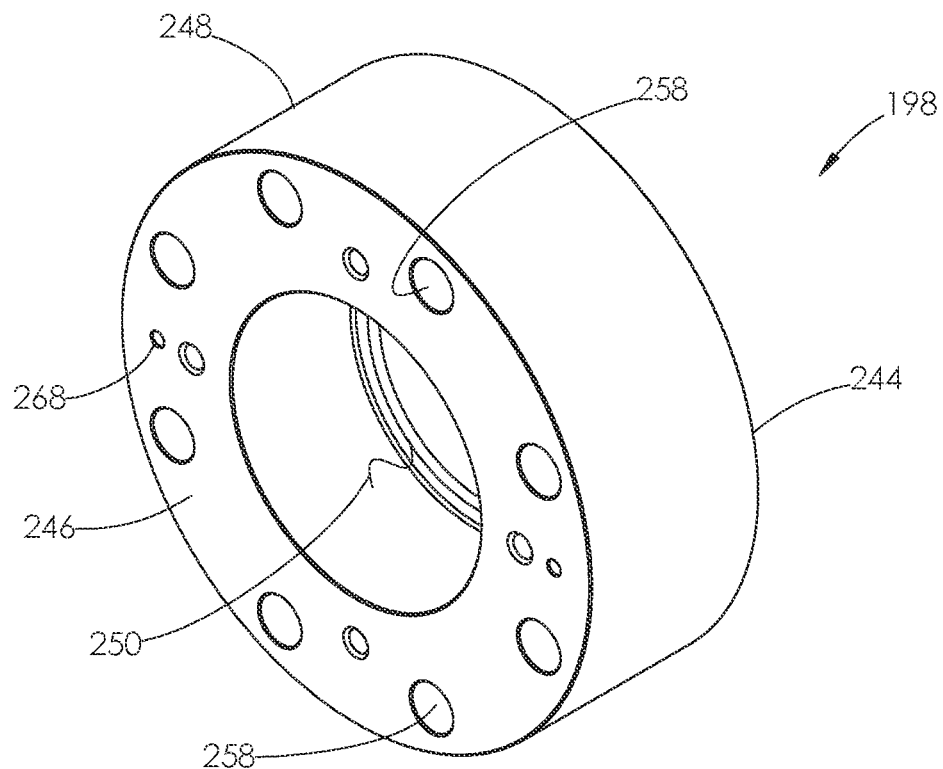
FIG. 34 is a rear perspective view of the stuffing box shown in FIG. 33.
Figure 35:
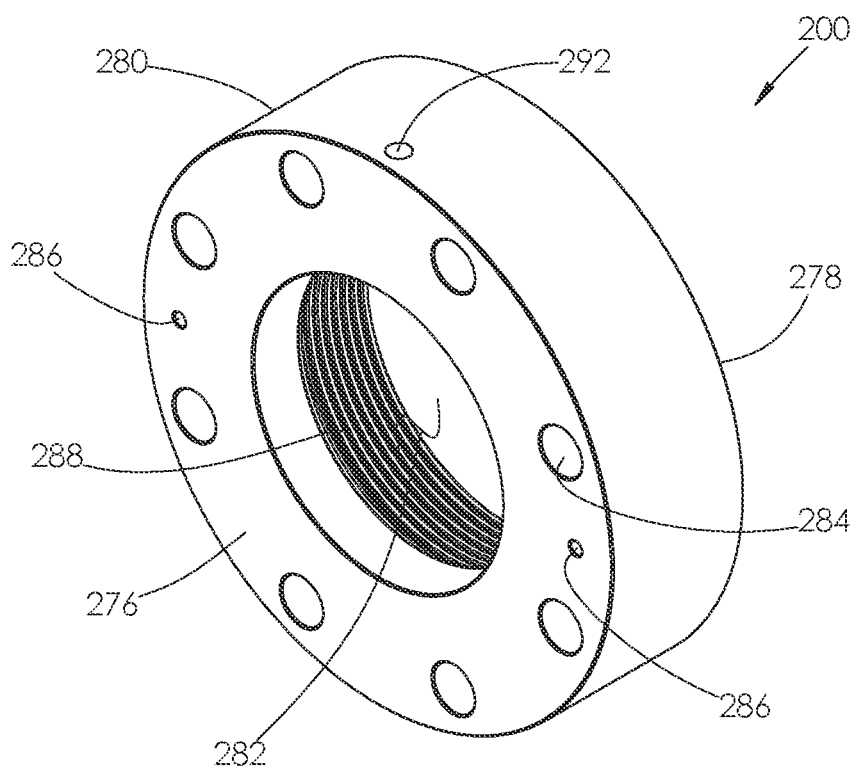
FIG. 35 is a front perspective view of the rear retainer shown in FIGS. 9 and 29.
Figure 36:
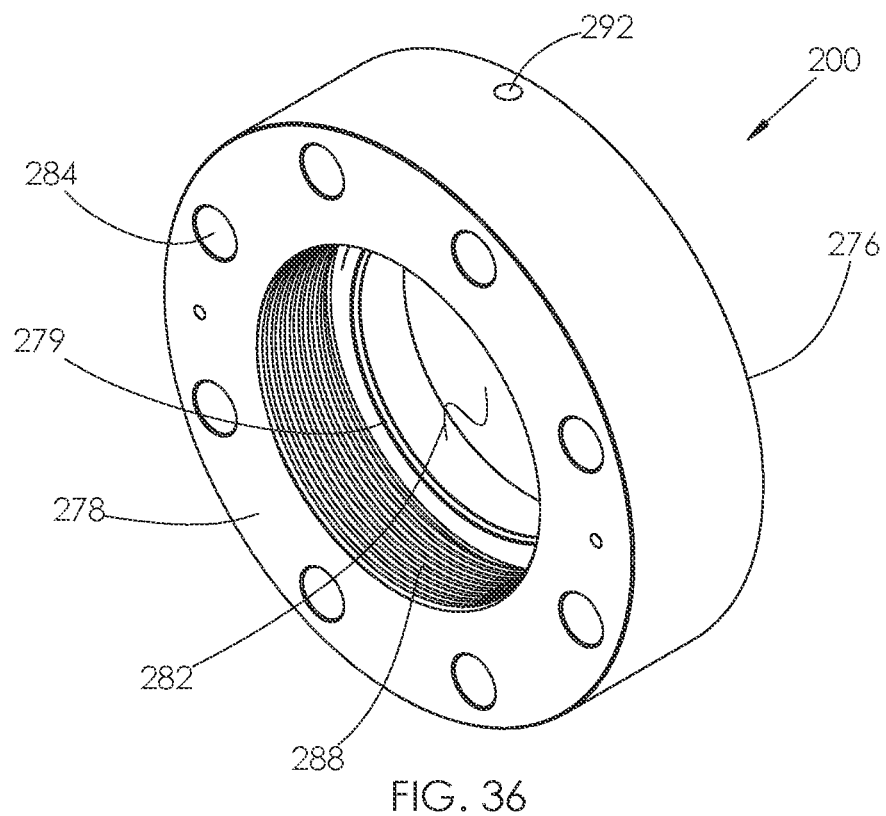
FIG. 36 is a rear perspective view of the rear retainer shown in FIG. 35.

Continuing with FIGS. 33, 34, and 39, a plurality of passages 258 are formed within the rear portion 254 of the stuffing box 198 and interconnect the medial surface 256 and the rear surface 246. The passages 258 are configured to align with the plurality of first passages 234 formed in the retention plate 206 and the plurality of first threaded openings 194 formed in the rear surface 66 of the housing 60, as shown in FIG. 29.

Continuing with FIGS. 33, 34, and 39, a plurality of dowel openings 260 may be formed in the medial surface 256 of the stuffing box 198. The dowel openings 260 are configured to receive at least a portion of the third alignment dowels 242 to properly align the stuffing box 198 on the retention plate 206 and the housing 60 during assembly, as shown in FIG. 39. Likewise, a plurality of dowel openings 268 may be formed in the rear surface 246 of the stuffing box 198 for receiving fourth alignment dowels 270, as shown in FIG. 39. The fourth alignment dowels 270 assist in properly aligning the rear retainer 200 on the stuffing box 198 during assembly.

Continuing with FIG. 39, the stuffing box 198 is installed within the third section 76 of the housing 60 such that the front portion 252 is disposed within the horizontal bore 70 and the medial surface 256 abuts the rear surface 238 of the retention plate 206. The outer intermediate surface 248 of the front portion 252 of the stuffing box 198 engages the seal 224. The seal 224 prevents fluid from leaking between the housing 60 and the stuffing box 198.

Continuing with FIG. 39, during operation, the seal 224 wears against the outer intermediate surface 248 of the front portion 252. Should the front portion 252 begin to erode, the stuffing box 198 may be removed and replaced with a new stuffing box 198. Likewise, the seal 224 wears against the wear ring 222 during operation. The wear ring 222 is preferably made of a harder and more wear resistant material than the housing 60, such as tungsten carbide. Should the wear ring 222 begin to erode, the wear ring 222 can be removed and replaced with a new wear ring 222. Trapping the seal 224 between replaceable parts protects the housing 60 over time.

Rear Retainer

Turning to FIGS. 29, 35, 36, and 39, the rear retainer 200 comprises opposed front and rear surfaces 276 and 278 joined by an outer intermediate surface 280 and a central passage 282 formed therein. A plurality of passages 284 are formed in the rear retainer 200 and surround the central passage 282. The passages 284 interconnect the front and rear surfaces 276 and 278 of the rear retainer 200 and are configured to align with the passages 258 formed in the rear portion 254 of the stuffing box 198, as shown in FIG. 29. A plurality of dowel openings 286 are formed in the front surface 276 of the rear retainer 200 for receiving a portion of the fourth alignment dowels 270, as shown in FIG. 39.

Figure 40:
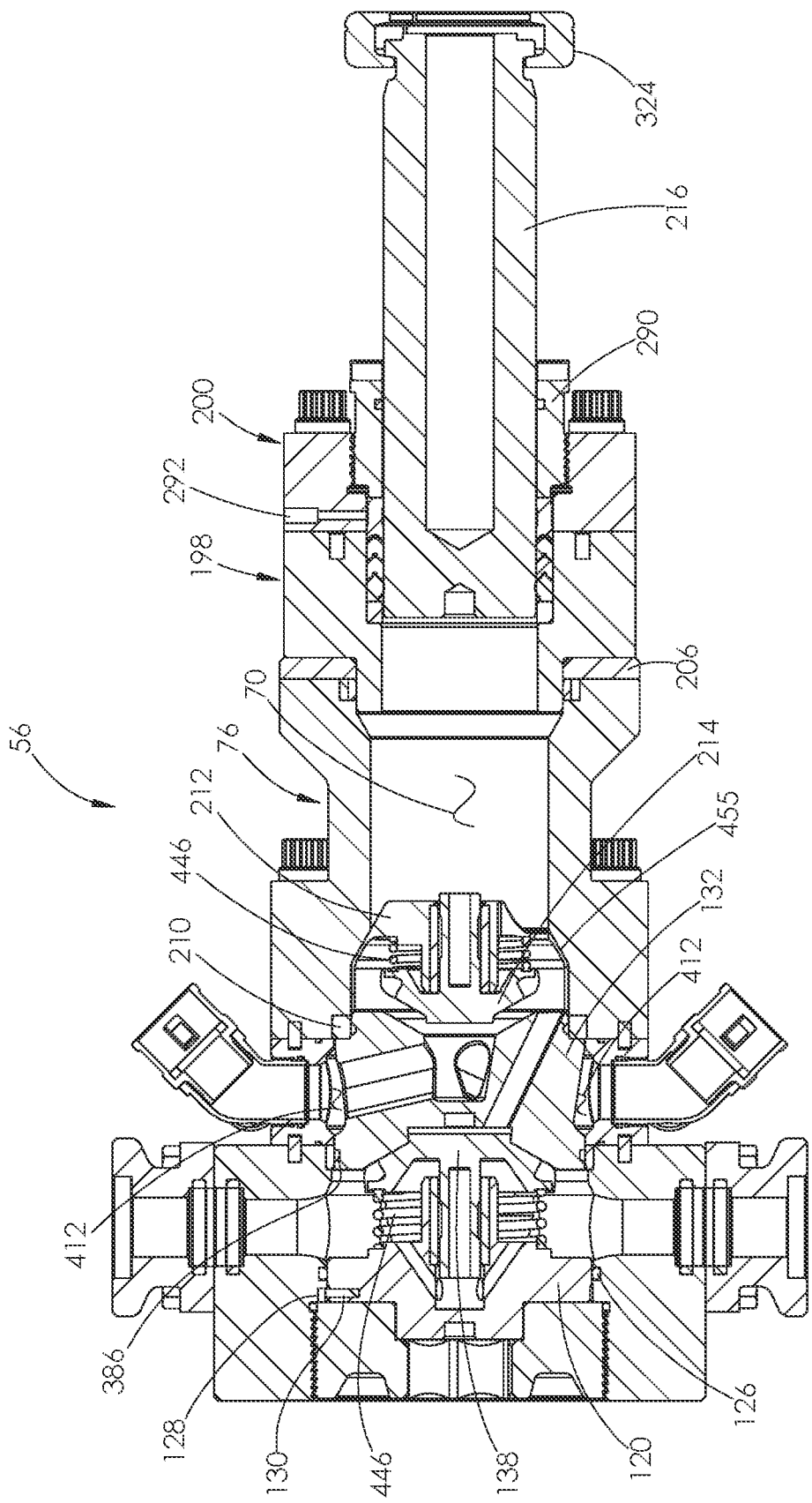
FIG. 40 is the cross-sectional view of the fluid end assembly shown in FIG. 9. The plunger is retracted, and the discharge valve is shown in a closed position.

Continuing with FIGS. 35, 36, 39, and 40, an internal shoulder 279 is formed within the walls surrounding the central passage 282 of the rear retainer 200. Internal threads 288 are formed in the walls surrounding the central passage 282 and positioned between the internal shoulder 279 and the rear surface 278. The internal threads 288 are configured to receive a packing nut 290, as shown in FIG. 39. The walls positioned between the internal shoulder 279 and the front surface 276 are flat and include one or more lube ports 292. The lube port 292 interconnects the central passage 282 and the outer intermediate surface 280 of the rear retainer 200, as shown in FIG. 40.

Plunger Packing and Packing Nut

Continuing with FIG. 39, fluid is prevented from leaking around the plunger 216 during operation by a plunger packing 300. The plunger packing 300 is installed within the stuffing box 198 and comprises a plurality of packing seals 302 sandwiched between first and second metal rings 304 and 306. The first metal ring 304 abuts the internal shoulder 272 formed within the stuffing box 198 and the second metal ring 306 extends into the central passage 282 formed in the rear retainer 200. The second metal ring 306 is known in the art as a "lantern ring". One or more passages 303, shown in FIG. 29, may be formed in the second metal ring 306 and fluidly connect with the one or more lube ports 292 formed in the rear retainer 200. During operation, oil used to lubricate the plunger 216 and plunger packing 300 is supplied through the lube port 292 and second metal ring 306.

Figure 37:
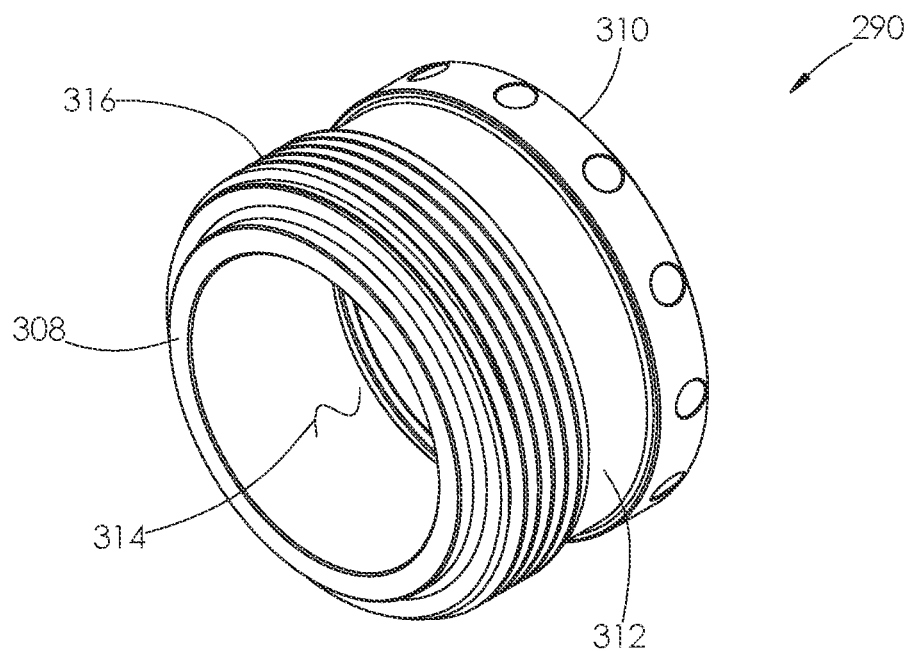
FIG. 37 is a front perspective view of the packing nut shown in FIGS. 9 and 29.
Figure 38:
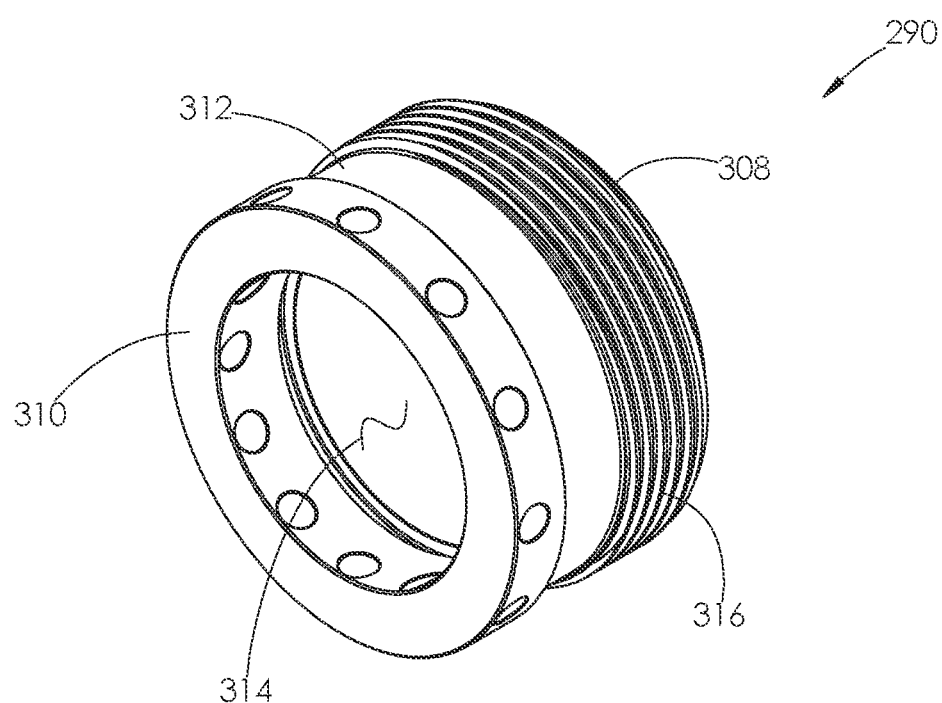
FIG. 38 is a rear perspective view of the packing nut shown in FIG. 37.

With reference to FIGS. 37-39, the plunger packing 300 is retained within the stuffing box 198 and the rear retainer 200 using the packing nut 290. The packing nut 290 comprises opposed front and rear surfaces 308 and 310 joined by an outer intermediate surface 312 and a central passage 314 formed therein. External threads 316 are formed in a portion of the outer intermediate surface 312 for engaging the internal threads 288 formed in the rear retainer 200, as shown in FIG. 39. When the packing nut 290 is installed within the rear retainer 200, the front surface 308 of the packing nut 290 engages and compresses the plunger packing 300, as shown in FIG. 39. When compressed, the packing seals 302 of the plunger packing 300 tightly seal against an outer surface of the plunger 216.

Continuing with FIG. 39, during operation, the packing nut 290 may be tightened, as needed, to ensure adequate compression of the packing seals 302 against the plunger 216. At least a portion of the packing nut 290 projects from the rear surface 278 of the rear retainer 200 to provide clearance to turn the packing nut 290, as needed. The central passage 314 formed in the packing nut 290 is sized to closely receive the plunger 216. A groove 318 may be formed in the walls surrounding the central passage 314 for receiving a seal 320. The seal 320 shown in FIG. 39 is an O-ring. The seal 320 prevents fluid from leaking around the plunger 216 during operation.

Assembly of Components on Rear Surface of Housing

Turning back to FIG. 29, the front surface 276 of the rear retainer 200 abuts the rear surface 246 of the stuffing box 198 such that the plurality of passages 284 align with the plurality of passages 258 formed in the stuffing box 198. A second fastener 196 is installed within a corresponding one of the aligned first threaded openings 194 and passages 234, 258, and 284. A first end 294 of the second fastener 196 threads into the first threaded opening 194 and a second end 296 projects from the rear surface 278 of the rear retainer 200. A nut 298 is threaded onto the second end 296 and torqued against the rear surface 278, tightly securing the stuffing box 198 and the rear retainer 200 to the third section 76 of the housing 60.

Continuing with FIG. 29, the nut 298 shown in the figures is 12-point flange nut. In alternative embodiments, the nut may comprise the three-piece nut 90, shown in FIGS. 19-21. The second fastener 196 shown in the figures is a threaded stud. In alternative embodiments, the second fastener 196 may comprise other fasteners known in the art, such as a bolt or screw.

Continuing with FIG. 29, the stuffing box 198 and rear retainer 200 are attached to the housing 60 after the retention plate 206 has first been attached to the rear surface 66 of the housing 60. The plunger packing 300 may be installed within stuffing box 198 either before or after the stuffing box 198 is attached to the housing 60. After all the components are assembled, the packing nut 290 is threaded into the rear retainer 200 until it engages the plunger packing 300.

With reference to FIGS. 29 and 39, when the retention plate 206, the stuffing box 198, and rear retainer 200 are attached to the housing 60, the central opening 239 of the retention plate 206 and the central passages 250 and 282 of the stuffing box 198 and the rear retainer 200 form an extension of the horizontal bore 70. Likewise, the interior of the plunger packing 300 and the central passage 314 of the packing nut 290 also form extensions of the horizontal bore 70. The plunger 216 is installed within the fluid end section 56 through the rear surface 310 of the packing nut 290. During operation, the plunger 216 reciprocates within the horizontal bore 70, creating the variance in fluid pressure within the fluid end section 56 during operation.

With reference to FIGS. 3, 39, and 40, during operation, reciprocal movement of the plunger 216 is driven by a pony rod 322 installed within the power end assembly 54. A clamp 324 secures the plunger 216 to the pony rod 322 such that the plunger 216 and pony rod 322 move in unison.

Components Installed within the Housing

Turning to FIGS. 40-79, the various internal components of the housing 60 will now be described in more detail. Fluid is routed throughout the housing 60 by the fluid routing plug 132. The timing of movement throughout the fluid routing plug 132 is controlled by the suction valve 214 and the discharge valve 138. Movement of the valves 214 and 138 is guided by the suction valve guide 212 and the discharge plug 120.

Fluid Routing Plug

Figure 41:
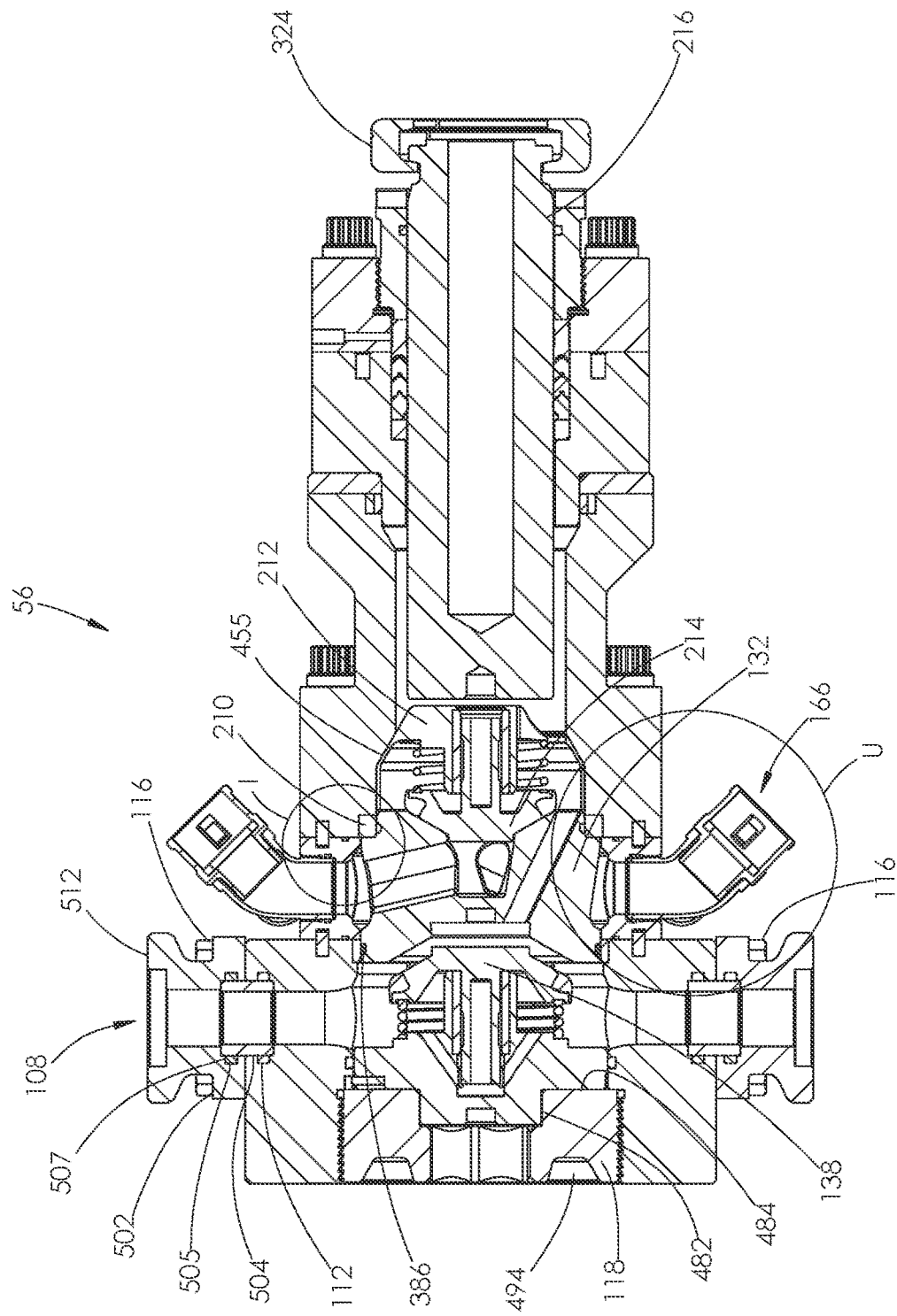
FIG. 41 is the cross-sectional view of the fluid end assembly shown in FIG. 40, but the plunger is extended within the fluid end section and the suction valve is in a closed position.

Turning to FIGS. 40-59, the fluid routing plug 132 comprises a body 330 having a suction surface 332 and an opposed discharge surface 334 joined by an outer intermediate surface 336. A central longitudinal axis 338 extends through the body 330 and the suction and discharge surfaces 332 and 334. When the fluid routing plug 132 is installed within the housing 60, at least a portion of the discharge surface 334 is positioned within the first section 72 of the housing 60, and at least a portion of the suction surface 332 is positioned within the third section 76 of the housing 60, as shown in FIGS. 40 and 41.

Continuing with FIGS. 43-59, the body 330 further comprises a plurality of suction fluid passages 340. The suction passages 340 interconnect the intermediate surface 336 and the suction surface 332 of the body 330, as shown in FIG. 48. The connection is formed within a blind bore 342 formed within the suction surface 332 of the body 330. The blind bore 342 may be referred to as an axially-blind bore 342 because it is blind along the longitudinal axis 338 of the body 330. During operation, fluid entering the housing 60 through the suction bores 160 and 162 flows into the suction passages 340 of the fluid routing plug 132 and into the axially-blind bore 342. From there, fluid flows towards the suction surface 332 of the body 330 and out of the fluid routing plug 132. Three suction fluid passages 340 are shown in FIGS. 43-59. In alternative embodiments, more or less than three suction fluid passages 340 may be formed within the body 330.

Figure 49:
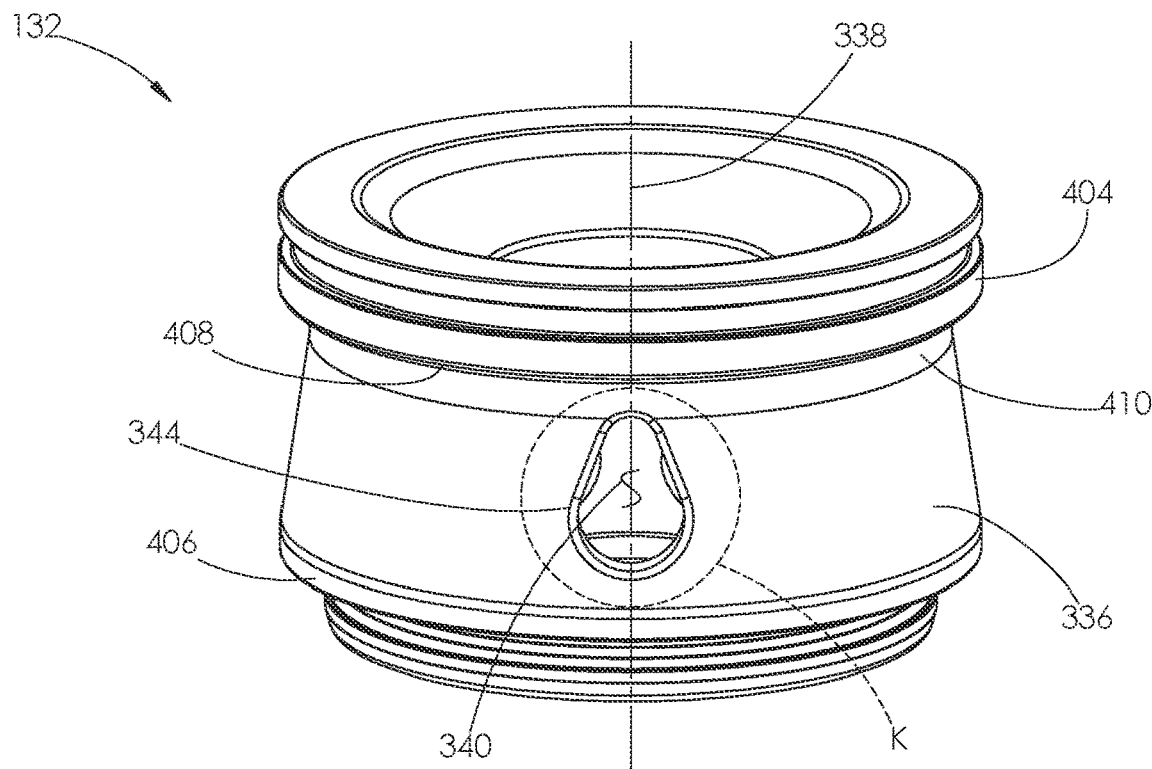
FIG. 49 is a top perspective view of the fluid routing plug shown in FIG. 43.
Figure 50:
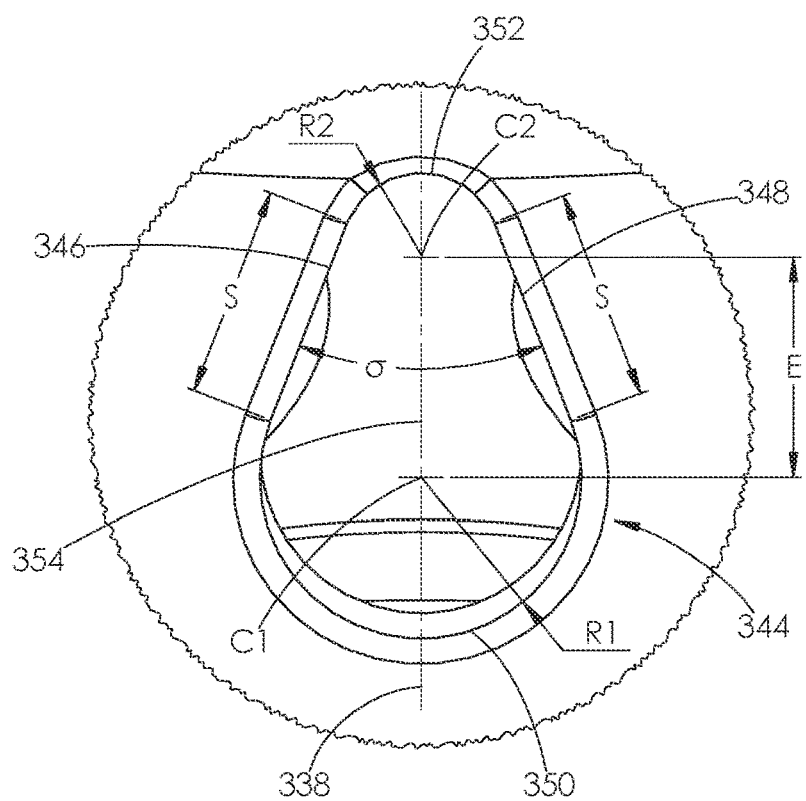
FIG. 50 is an enlarged view of area K shown in FIG. 49.

Continuing with FIGS. 49 and 50, each suction passage 340 has a generally oval or tear drop cross-sectional shape. An opening 344 of each suction passage 340 on the intermediate surface 336 comprises a first side wall 346 joined to a second side wall 348 by first and second ends 350 and 352. The first and second side walls 346 and 348 are straight lines of equal length S, and the first and second ends 350 and 352 are circular arcs, as shown in FIG. 50.

Continuing with FIG. 50, the first end 350 of the opening 344 has a radius of R1 with a center at C1, and the second end 352 has a radius of R2 with a center at C2. The first end 350 is larger than the second end 352 such that R1>R2. The first and second side walls 346 and 348 are tangent to the first and second ends 350 and 352 and have an included angle, σ.

Figure 55:
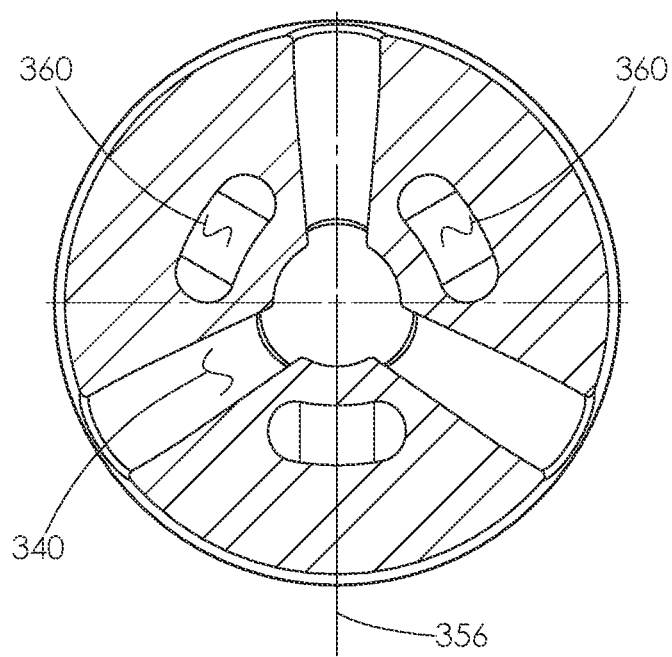
FIG. 55 is a cross-sectional view of the fluid routing plug shown in FIG. 44, taken along line M-M.

Continuing with FIG. 50, the opening 344 has a centerline 354 that connects the centers C1 and C2 of the first and second ends 350 and 352. The centerline 354 has a length E and is parallel with the central longitudinal axis 338. A cross-sectional shape of each suction passage 340 throughout the length of the body 330 corresponds with the shape of each opening 344, as shown in FIG. 55. Each suction passage 340 is sized and shaped to maximize fluid flow through the passage 340 and minimize fluid turbulence and stress to the body 330 of the fluid routing plug 132.

Figure 56:
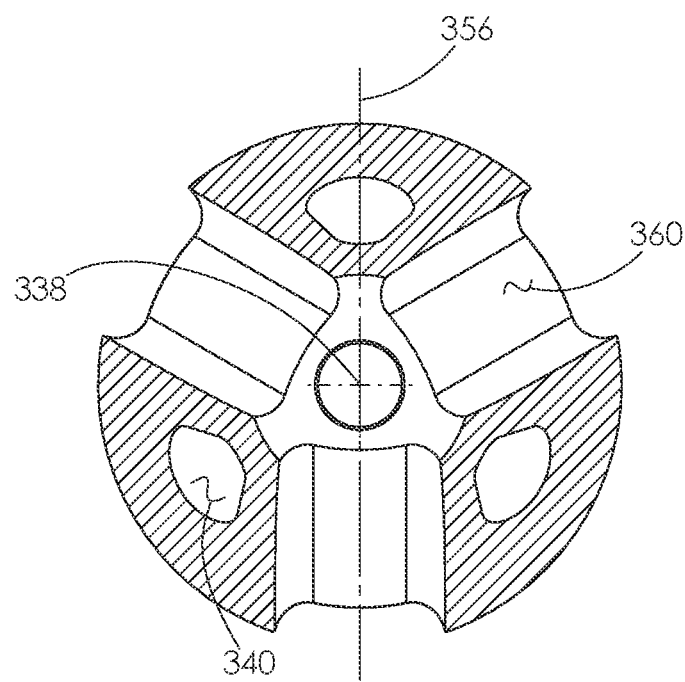
FIG. 56 is a front elevational and conical-sectional view of the fluid routing plug shown in FIG. 43. The conical-section is taken from line O in FIGS. 43 and 45 to line P in FIGS. 46 and 47.
Figure 57:
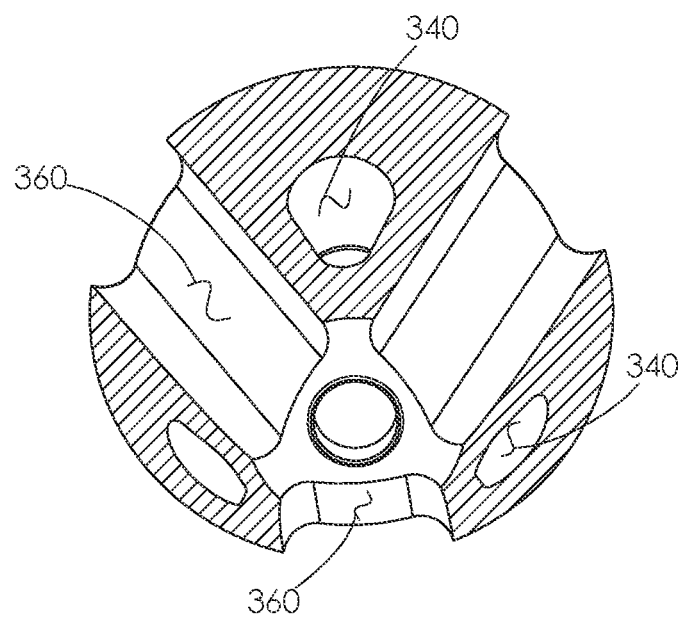
FIG. 57 is a front perspective and conical-sectional view of the fluid routing plug shown in FIG. 56.
Figure 58:
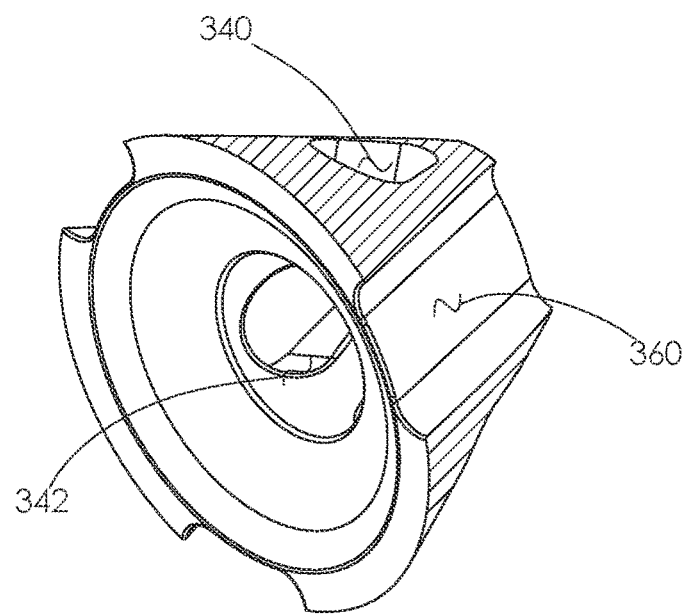
FIG. 58 is a rear perspective and conical-sectional view of the fluid routing plug shown in FIG. 56.
Figure 59:
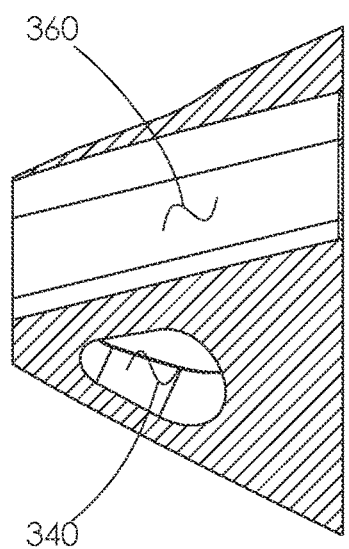
FIG. 59 is a side elevational and conical-sectional view of the fluid routing plug shown in FIG. 56.
Figure 64:
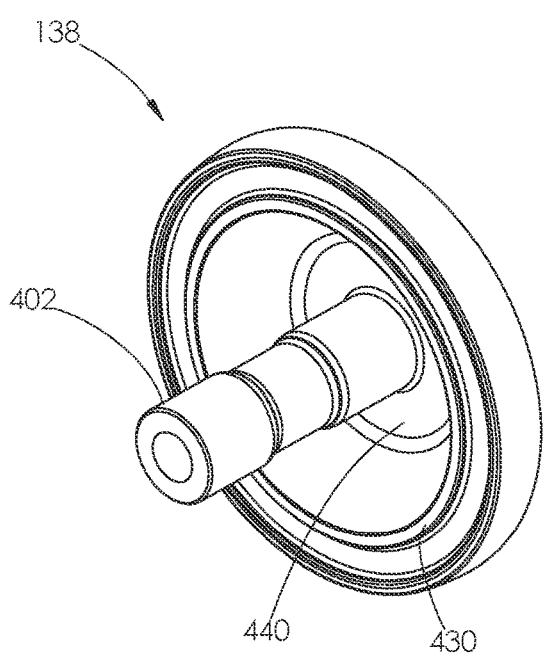
FIG. 64 is a front perspective view of the discharge valve shown in FIGS. 40 and 41.
Figure 65:
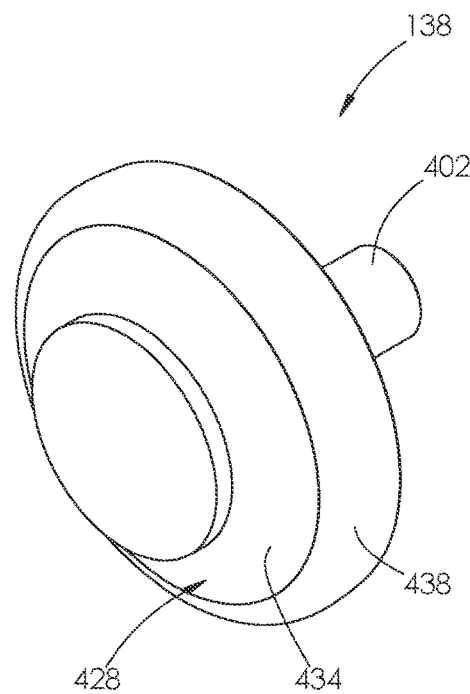
FIG. 65 is a rear perspective view of the discharge valve shown in FIG. 64.

With reference to FIGS. 55 and 56, each suction fluid passage 340 extends between the axially-blind bore 342 and the intermediate surface 336 such that each suction passage 340 comprises a longitudinal axis 356. The longitudinal axis 356 extends through the center C1 of the first end 350 of the opening 344 and intersects the central longitudinal axis 338, as shown in FIG. 56.

Continuing with FIGS. 43-59, the body 330 further comprises a plurality of discharge fluid passages 360. The discharge passages 360 interconnect the suction surface 332 and the discharge surface 334 of the body 330 and do not intersect any of the suction passages 340. Rather, the discharge and suction passages 360 and 340 are in a spaced-relationship. In operation, fluid exiting the body 330 at the suction surface 332 is subsequently forced into the discharge passages 360, towards the discharge surface 334 of the body 330, and out of the fluid routing plug 132. Three discharge fluid passages 360 are shown in FIGS. 43-59. In alternative embodiments, more or less than three discharge fluid passages 360 may be formed within the body 330.

Continuing with FIGS. 43, 46, and 48, the suction surface 332 of the body 330 comprises an outer rim 362 joined to the axially-blind bore 342 by a tapered seating surface 366, as shown in FIGS. 46 and 48. Likewise, the discharge surface 334 comprises an outer rim 368 joined to a central base 370 by a tapered seating surface 372, as shown in FIGS. 43 and 48.

Continuing with FIGS. 43, 46, and 48, each discharge passage 360 opens at a first opening 374 on the outer rim 362 of the suction surface 332 and opens at a second opening 376 on the central base 370 of the discharge surface 334. The second openings 376 surround a blind bore 378 formed in the central base 370 of the discharge surface 334. The blind bore 378 is configured to engage a tool used to grip the fluid routing plug 132, as needed. For example, the walls of the blind bore 378 may be threaded. The central base 370 may also be slightly recessed from the tapered seating surface 372 such that a small counterbore 380 is created. The counterbore 380 helps further reduce any turbulence of fluid exiting the second openings 376.

Figure 54:
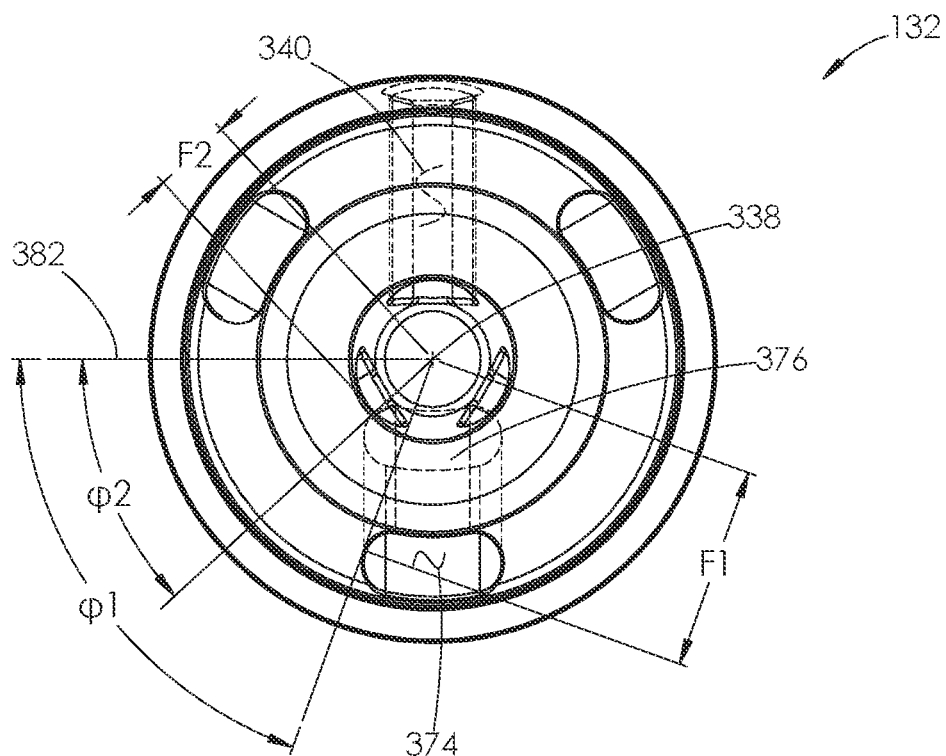
FIG. 54 is a rear elevational view of the fluid routing plug shown in FIG. 43, but one of the suction passages and one of the discharge passages are shown in phantom.

Continuing with FIG. 54, a position of the first and second openings 374 and 376 of each discharge passage 360 may be determined relative to a plane containing a line 382 that is perpendicular to the central longitudinal axis 338. The first opening 374, when projected onto the plane, is positioned at a first distance F1 from the central longitudinal axis 338 and at a first angle $\varphi 1$ relative to the line 382. The second opening 376, when projected onto the plane, is positioned at a second distance F2 from the central longitudinal axis 338 and at a second angle $\varphi 2$ relative to the line 382.

The first and second distances F1 and F2 shown in FIG. 54 are different. Likewise, the first and second angles $\varphi 1$ and $\varphi 2$ shown in FIG. 54 are different. In alternative embodiments, the first and second angles $\varphi 1$ and $\varphi 2$ may be different, but the first and second distances F1 and F2 may be the same. In further alternative embodiments, the first and second angles $\varphi 1$ and $\varphi 2$ may be the same, but the first and second distances F1 and F2 may be different. In even further alternative embodiments, the first and second distances F1 and F2 may be the same, and the first and second angles $\varphi 1$ and $\varphi 2$ may be the same.

Figure 51:
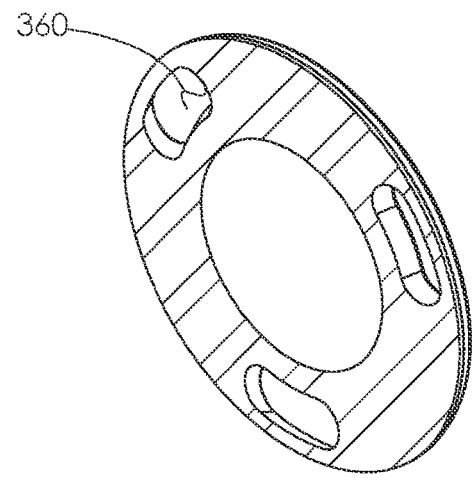
FIG. 51 is a perspective cross-sectional view of the fluid routing plug shown in FIG. 44, taken along line L-L.
Figure 52:
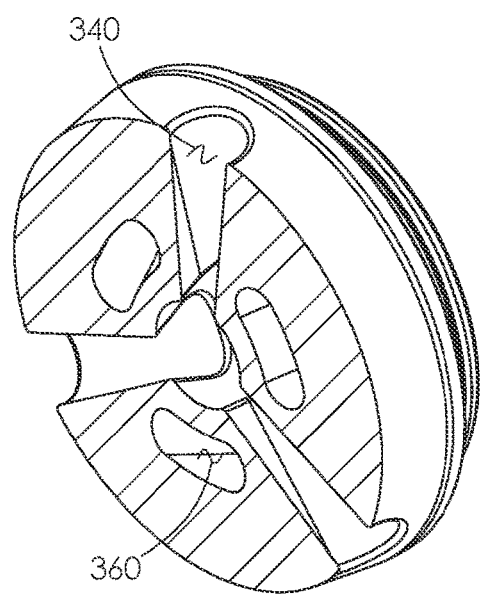
FIG. 52 is a perspective cross-sectional view of the fluid routing plug shown in FIG. 44, taken along line M-M.
Figure 53:
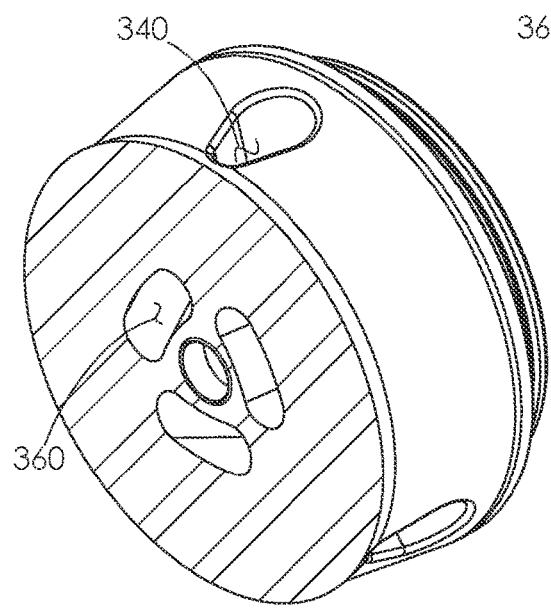
FIG. 53 is a perspective cross-sectional view of the fluid routing plug shown in FIG. 44, taken along line N-N.

With reference to FIGS. 51-53 and 56-59, each discharge passage 360 has an arced cross-sectional shape. The length of the arc may gradually increase between the suction and discharge surfaces 332 and 334, as shown in FIGS. 51-53. In alternative embodiments, the discharge passages 360 may have different shapes and sizes.

Turning back to FIGS. 44 and 48, a first annular groove 384 is formed in the outer intermediate surface 336 of the body 330 for housing the first seal 386. The first groove 384 is positioned adjacent the discharge surface 334 and is characterized by two sides walls 388 joined by a base 390. When the fluid routing plug 132 is installed within the housing 60, the first seal 386 engages an outer surface of the wear ring 136 installed within the first section 72 of the housing 60, as shown in FIGS. 40 and 41. During operation, the first seal 386 wears against the wear ring 136. If the wear ring 136 begins to erode, the wear ring 136 may be removed and replaced with a new wear ring 136. The wear ring 136 has an annular shape and may be made of a harder and more wear resistant material than the housing 60. For example, the housing 60 may be made of stainless steel and the wear ring 136 is made of tungsten carbide.

Figure 42:
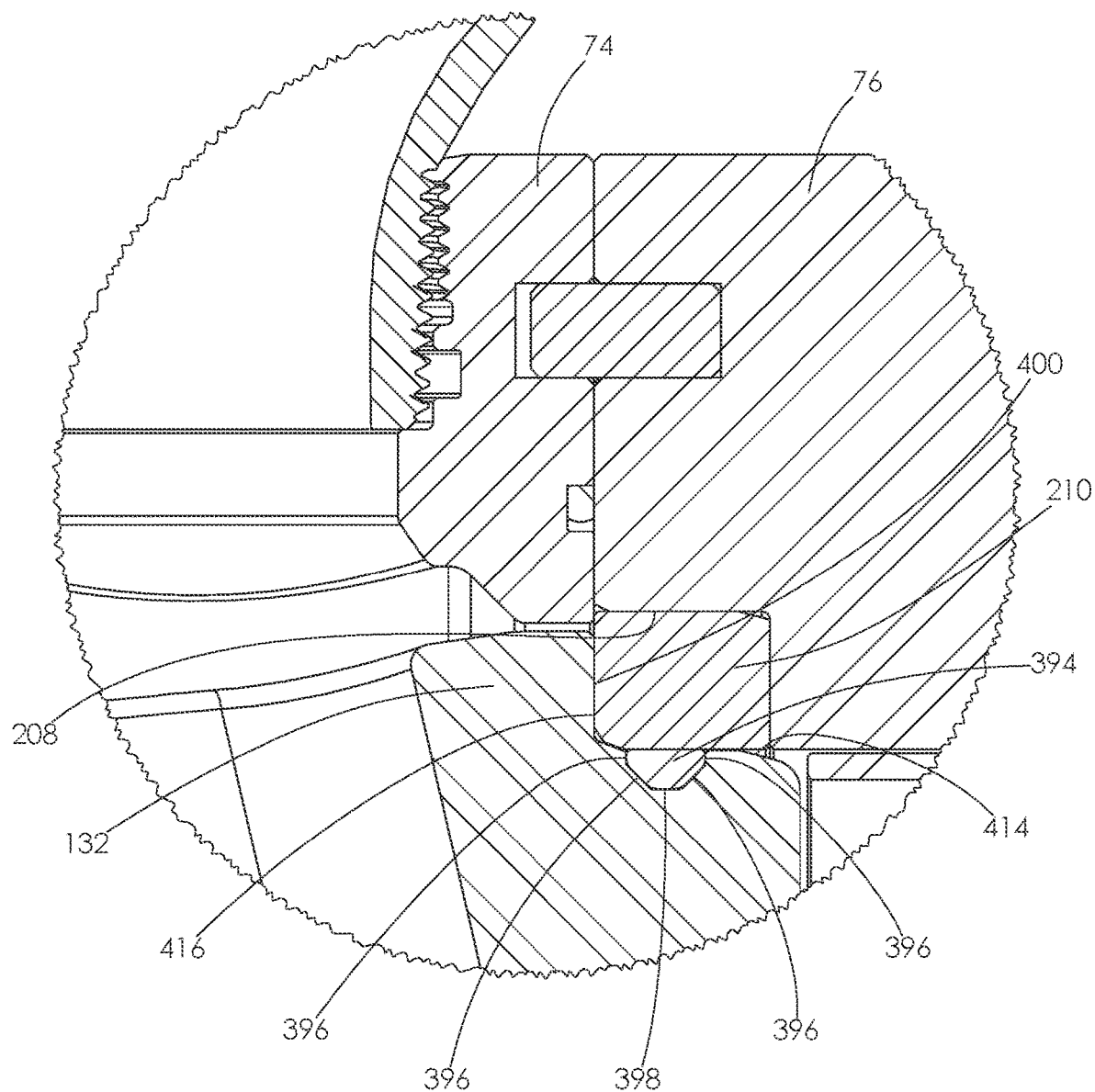
FIG. 42 is an enlarged view of area I shown in FIG. 41.

With reference to FIGS. 42, 44, and 48, a second annular groove 392 is formed in the outer intermediate surface 336 of the body 330 for housing a second seal 394.

The second groove 392 is positioned adjacent the suction surface 332 and is characterized by a plurality of side walls 396 joined by a base 398, as shown in FIG. 42. Four side walls 396 are shown in FIG. 42 such that the groove 392 has a rounded shape. When the fluid routing plug 132 is installed within the housing 60, the second seal 394 engages an outer surface of the hardened insert 210, as shown in FIG. 42. During operation, the second seal 394 wears against the insert 210. If the insert 210 begins to erode, the insert 210 may be removed and replaced with a new insert 210.

Continuing with FIGS. 42, 44, and 48, the outer intermediate surface 336 of the body 330 further comprises an annular shoulder 400 formed in the body 330. The shoulder 400 is positioned between the opening 344 of the suction passages 340 and the second groove 392. When the fluid routing plug 132 is installed within the housing 60, the shoulder 400 abuts a front surface 416 of the insert 210, as shown in FIG. 42. Axial movement of the fluid routing plug 132 towards the rear surface 66 of the housing 60 is prevented by the engagement between the shoulder 400 and the insert 210. During operation, the shoulder 400 may wear against the insert 210. If either feature begins to wear, the fluid routing plug 132 and/or the insert 210 may be removed and replaced with a new fluid routing plug 132 and/or insert 210.

Continuing with FIGS. 40, 41, 44, and 48, the outer intermediate surface 336 of the body 330 adjacent the first groove 384 is characterized as a first cylindrical surface 404. Likewise, the outer intermediate surface 336 adjacent the annular shoulder 400 is characterized as a second cylindrical surface 406. The first cylindrical surface 404 has a maximum outer diameter that is equal or almost equal to a maximum outer diameter of the second cylindrical surface 406. The surfaces 404 and 406 are configured to closely face the walls surrounding the horizontal bore 70 within the second section 74 of the housing 60, as shown in FIGS. 40 and 41.

Continuing with FIGS. 40, 41, 44, 48, and 49, the outer intermediate surface 336 of the body 330 further comprises a first bevel 408 joined to a transition surface 410 formed in the body 330. The first bevel 408 and the transition surface 410 are positioned between the first cylindrical surface 404 and the openings 344 of the suction passages 340. The outer intermediate surface 336 of the body 330 slowly tapers outward from the transition surface 410 to the second cylindrical surface 406.

Continuing with FIGS. 40 and 41, when the fluid routing plug 132 is installed within the housing 60, the first bevel 408 provides clearance between the outer intermediate surface 336 of the fluid routing plug 132 and an opening of the suction bores 160 and 162. Such clearance gives way to an annular fluid channel 412 formed between the housing 60 and the fluid routing plug 132. The shape of the outer intermediate surface 336 of the fluid routing plug 132 between the first and second cylindrical surfaces 404 and 406 helps direct fluid flowing from the suction bores 160 and 162 into the openings 344 of the suction passages 340 while minimizing fluid turbulence.

Turning back to FIG. 42, the outer intermediate surface 336 of the body 330 further comprises a second bevel 414 formed in the body 330. The second bevel 414 is positioned between the suction surface 332 and the second groove 392. The second bevel 414 provides clearance to help install the fluid routing plug 132 within the housing 60 and the insert 210.

Hardened Insert

With reference to FIGS. 42 and 60-63, the insert 210 has an annular shape and comprises opposed front and rear surfaces 416 and 418 joined by inner and outer intermediate surfaces 420 and 422. The insert 210 further comprises a first bevel 426 formed in the inner intermediate surface 420 adjacent the front surface 416, as shown in FIG. 63. The first bevel 426 provides clearance to assist in installing the fluid routing plug 132 within the insert 210 within the housing 60, as shown in FIG. 42. The insert 210 also comprises a second bevel 424 formed in the outer intermediate surface 422 adjacent the rear surface 418. The second bevel 424 provides clearance to assist in installing the insert 210 within the counterbore 208 formed in the third section 76 of the housing 60, as shown in FIG. 42. The insert 210 is made of a harder and more wear resistant material than the housing 60. For example, if the housing 60 is made of stainless steel, the insert 210 may be made of tungsten carbide.

Suction and Discharge Valves

With reference to FIGS. 40, 41, and 64-67, the flow of fluid throughout the housing 60 and the fluid routing plug 132 is regulated by the suction and discharge valves 214 and 138. The suction valve 214 is configured to engage the suction surface 332, and the discharge valve 138 is configured to engage the discharge surface 334 of the fluid routing plug 132 such that the surfaces 332 and 334 function as valve seats. The valves 214 and 138 are similar in shape but may vary in size. As shown in FIGS. 40 and 41, the discharge valve 138 is slightly large than suction valve 214.

Figure 66:
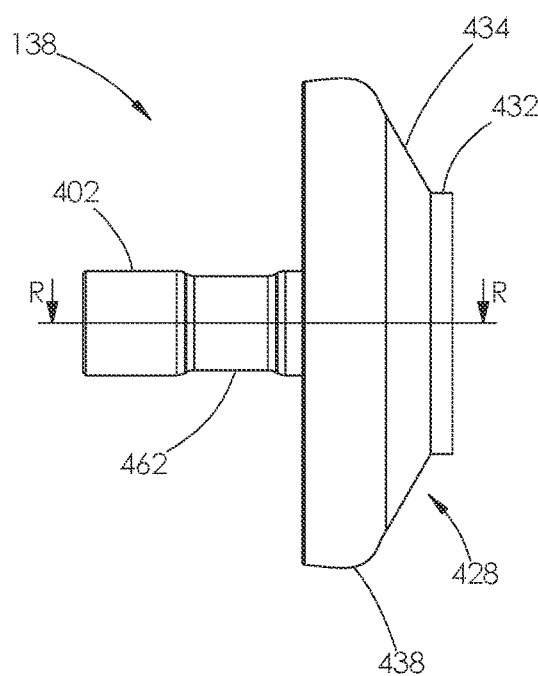
FIG. 66 is a side elevational view of the discharge valve shown in FIG. 64.
Figure 67:
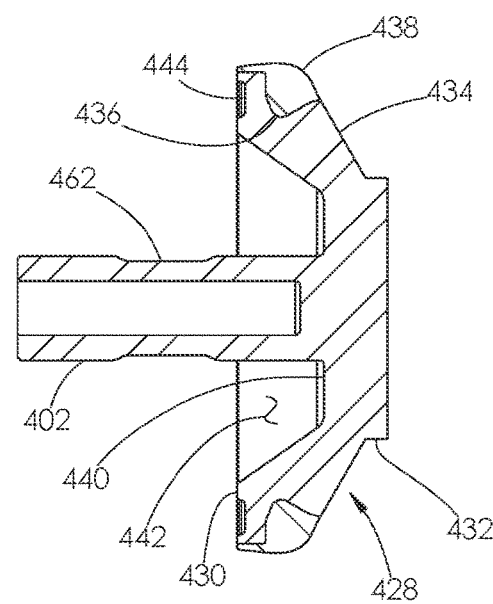
FIG. 67 is a cross-sectional view of the discharge valve shown in FIG. 66, taken along line R-R.
Figure 72:
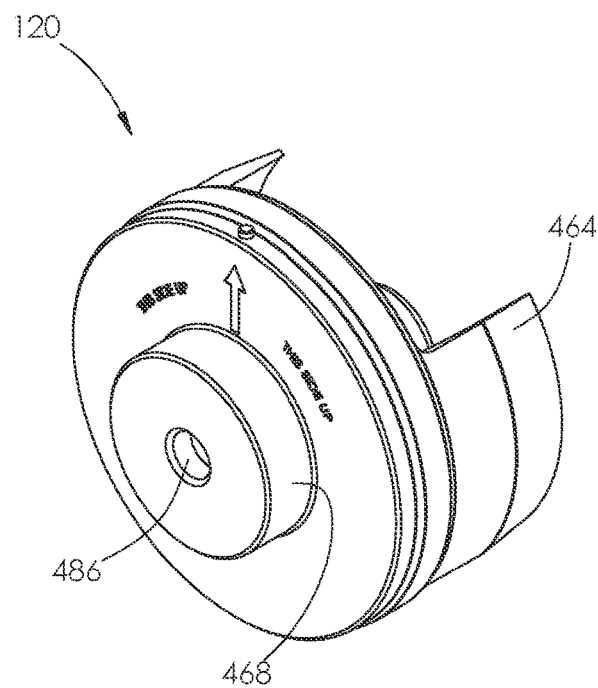
FIG. 72 is a front perspective view of the discharge plug shown in FIGS. 40 and 41.
Figure 73:
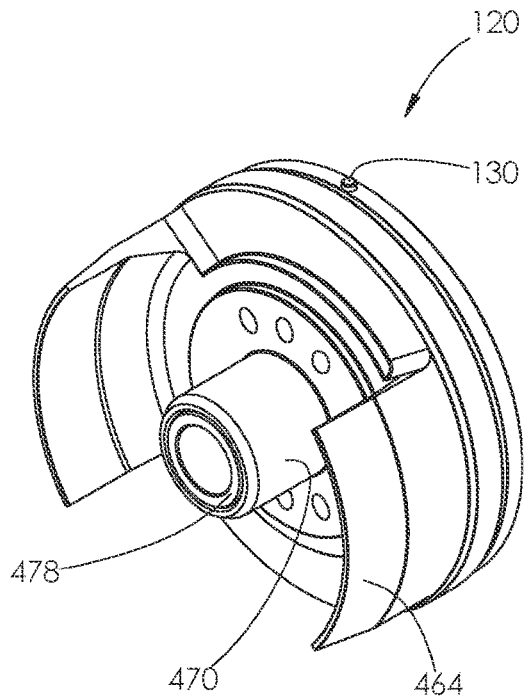
FIG. 73 is a rear perspective view of the discharge plug shown in FIG. 72.
Figure 74:
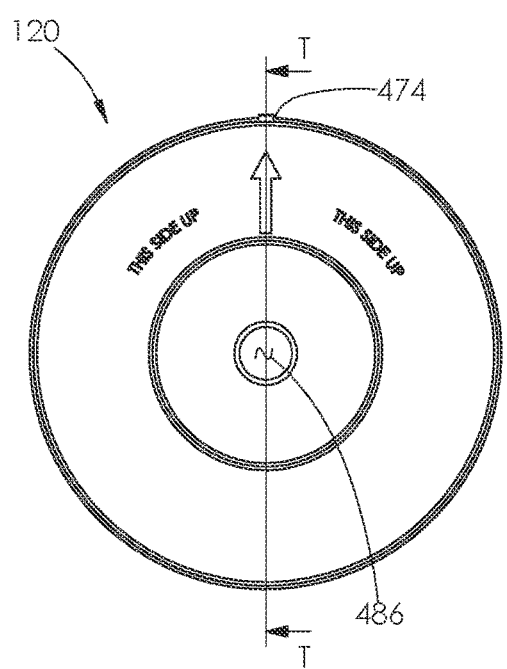
FIG. 74 is a front elevational view of the discharge plug shown in FIG. 72.

Continuing with FIGS. 64-67, the discharge valve 138 is shown in more detail. The suction valve 214 has the same features as the discharge valve 138 so only the discharge valve 138 is shown in more detail in the figures. The discharge valve 138 comprises a stem 402 joined to a body 428. The body 428 comprises an outer rim 430 joined to a valve insert 432 by a tapered seating surface 434. An annular cutout 436 formed within the seating surface 434 is configured to house a seal 438, as shown in FIG. 67.

Continuing with FIGS. 40 and 41, during operation, the seating surface 434 and the seal 438 engage the seating surface 372 of the discharge surface 334 and block fluid from entering or exiting the discharge passages 360, as shown in FIG. 40. Likewise, the seating surface 434 and the seal 438 on the suction valve 214 engage the seating surface 366 of the suction surface 332 and block fluid from entering or exiting the suction passages 340, as shown in FIG. 41.

Continuing with FIGS. 40 and 41, when the seating surfaces 434 and 372 are engaged, the valve insert 432 extends partially into the counterbore 380 formed in the discharge surface 334. Fluid exiting the second openings 376 of the discharge passages 360 contacts the insert 432, pushing the discharge valve 138 away from the discharge surface 334 before flowing around the seating surface 434 of the discharge valve 138. Such motion enlarges the area for fluid to flow between the seating surfaces 372 and 434 before fluid reaches the surfaces 372 and 434, thereby reducing the velocity of fluid flow within such area. The lowered fluid velocity between the surfaces 372 and 434 causes any wear to the valve 138 or 214 to be concentrated at the insert 432 instead of the crucial sealing elements, thereby extending the life of the valve 138 or 214.

Likewise, the insert 432 on the suction valve 214 extends partially into the opening of the axially-blind bore 342. Fluid within the axially-blind bore 342 contacts the insert 432 before flowing around the seating surface 434 and seal 438 of the suction valve 214. Such motion enlarges the area for fluid to flow between the seating surfaces 366 and 434 before fluid reaches the surfaces 366 and 434, thereby reducing the velocity of fluid flow within such area.

Continuing with FIGS. 64-67, the stem 402 projects from a top surface 440 of the body 428 of the valve 138 or 214. The outer rim 430 surrounds the stem 402 and is spaced from the stem 402 by an annular void 442. A groove 444 is formed in the outer rim 430 for receiving a portion of a spring 446, as shown in FIGS. 40 and 41.

Continuing with FIGS. 40 and 41, during operation, the valves 138 and 214 move axially along the longitudinal axis 62 of the housing 60 between open and closed positions. In the closed position, the seating surface 434 and the seal 438 of each of the valves 138 and 214 tightly engage the corresponding seating surface 372 or 366 of the fluid routing plug 132 and the valve insert 432 is disposed within the corresponding bore 380 or 342. In the open position, the seating surface 434 and the seal 438 are spaced from the corresponding seating surface 372 or 366 of the fluid routing plug 132 and the valve insert 432 is spaced from the corresponding bore 380 or 342.

Suction Valve Guide

With reference to FIGS. 40, 41, and 68-71, axial movement of the suction valve 214 is guided by the suction valve guide 212. The suction valve guide 212 comprises a thin-walled skirt 448 joined to a body 450 by a plurality of support arms 452. The skirt 448 comprises a tapered upper section 454 joined to a cylindrical lower section 456. The plurality of arms 452 join the tapered upper section 454 to the body 450. A plurality of flow ports 458 are formed between adjacent arms 452 such that fluid may pass through the suction valve guide 212 during operation.

Continuing with FIGS. 40 and 41, the suction valve guide 212 is installed within the housing 60 such that the tapered upper section 454 engages a tapered surface 455 of the walls surrounding the horizontal bore 70. Such engagement prevents further axial movement of the suction valve guide 212 within the housing 60. When the suction valve guide 212 is installed within the housing 60, the skirt 448 covers the walls of the housing 60 positioned between the flow ports 458 and the fluid routing plug 132. During operation, fluid wears against the skirt 448, thereby protecting the housing 60 from wear and erosion. If the skirt 448 begins to erode, the suction valve guide 212 can be removed and replaced with a new guide 212.

Continuing with FIGS. 40, 41, and 68-71, the body 450 of the suction valve guide 212 is tubular and is centered within the skirt 448. A tubular insert 460 is installed within the body 450, as shown in FIG. 71. The insert 460 is configured to receive the stem 402 of the suction valve 214, as shown in FIGS. 40 and 41. During operation, the stem 402 moves axially within the insert 460 and wears against the insert 460. An annular cutout 462 formed in the stem 402, shown in FIGS. 66 and 67, provides space for any fluid or other material trapped between the stem 402 and the insert 460. The insert 460 is made of a harder and more wear resistant material than the body 450 thereby extending the life of the suction valve guide 212. For example, if the body 450 is made of stainless steel, the insert 460 may be made of tungsten carbide.

Continuing with FIGS. 40 and 41, a spring 446 is positioned between the outer rim 430 of the suction valve 214 and the plurality of arms 452 such that the spring 446 surrounds at least a portion of the body 450 of the suction valve guide 212. During operation, the spring 446 biases the suction valve 212 in a closed position, as shown in FIG. 41. Fluid pushing against the valve insert 432 moves the suction valve 214 axially to compress the spring 446 and move the suction valve 214 to an open position, as shown in FIG. 40.

Discharge Plug

With reference to FIGS. 40, 41, and 72-75, axial movement of the discharge valve 138 is guided by the discharge plug 120. The discharge plug 120 comprises a pair of legs 464 joined to a body 466. The body 466 comprises a front portion 468 joined to a rear portion 470 by a medial portion 472. The medial portion 472 has a larger outer diameter than both the front and rear portions 468 and 470. An outer surface of the medial portion 472 engages the seal 126 installed within the first section 72 of the housing 60, as shown in FIGS. 40 and 41. The pair of legs 464 are joined to the medial portion 472 and extend between the medial portion 472 and the discharge surface 334 of the fluid routing plug 132.

Continuing with FIGS. 40, 41, and 72-75, a dowel opening 474 is formed in the outer surface of the medial portion 472 for receiving the locating dowel pin 130. The discharge plug 120 is installed within the first section 72 of the housing 60 such that the locating dowel pin 130 is installed within the dowel opening 474 formed in the medial portion 472 and the locating cutout 128 formed in the first section 72 of the housing 60. Such installation aligns the discharge plug 120 within the housing 60 so that the pair of legs 464 do not block the openings of the upper and lower discharge bores 102 and 104.

Continuing with FIGS. 40 and 41, the locating cutout 128 may be large enough to provide sufficient clearance for installation of the locating dowel pin 130 within the locating cutout 128. The locating cutout 128 is sized to allow maximum clearance for assembly, but still maintain an acceptable rotational position of the discharge plug 120. For example, the cutout 128 may be a maximum of 15 degrees wide along the circumference of the horizontal bore 70.

Figure 75:
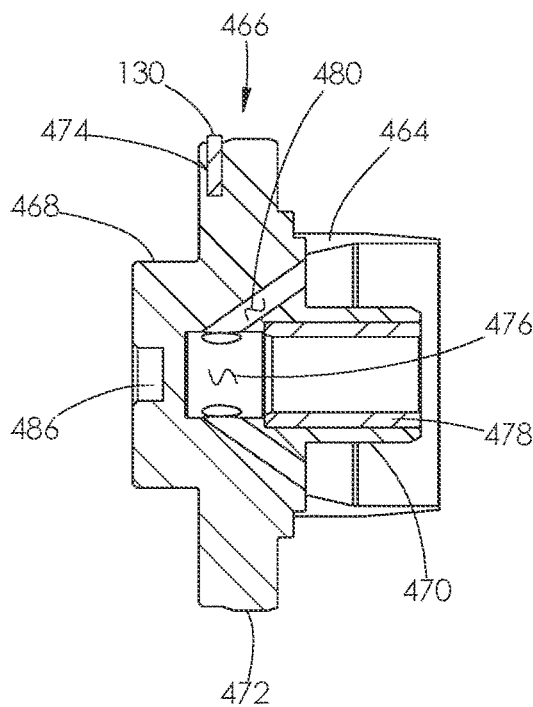
FIG. 75 is a cross-sectional view of the discharge plug shown in FIG. 74, taken along line T-T.

Continuing with FIG. 75, an axially-blind bore 476 extends within the body 466 and opens on the rear portion 470 of the body 466. The bore 476 is sized to receive a tubular insert 478. The tubular insert 478 is similar to the tubular insert 460 installed within the suction valve guide 212. The tubular insert 478 is configured to receive the stem 402 of the discharge valve 138, as shown in FIGS. 40 and 41.

Continuing with FIGS. 40, 41, and 75, during operation, the stem 402 moves axially within the tubular insert 478. A plurality of passages 480 are formed in the body 466 and interconnect the bore 476 and an outer surface of the medial portion 472. During operation, any fluid or other material trapped within the bore 476 exits the discharge plug 120 through the passages 480. A spring 446 is positioned between the medial portion 472 of the plug 120 and the outer rim 430 of the discharge valve 138, as shown in FIGS. 40 and 41. The spring 446 biases the discharge valve 138 in the closed position, as shown in FIG. 40. Fluid pushing against the valve insert 432 moves the discharge valve 138 axially to compress the spring 446 and move the discharge valve 138 to an open position, as shown in FIG. 41.

Continuing with FIGS. 40, 41, 72, and 75, the front portion 468 of the body 466 is sized to be disposed within a counterbore 482 formed within the front retainer 118. When disposed therein, a rear surface 484 of the front retainer 118 abuts an outer surface of the medial portion 472 of the discharge plug 120, as shown in FIGS. 40 and 42. Such engagement holds the discharge plug 120 in place between the front retainer 118 and the fluid routing plug 132. A blind bore 486 is formed in an outer surface of the front portion 468 of the plug 120. The blind bore 486 is configured to engage a tool used to help install or remove the plug 120 from the housing 60. For example, the bore 486 may have threaded walls.

Front Retainer

With reference to FIGS. 40, 41, 76, and 77, the front retainer 118 comprises opposed front and rear surfaces 488 and 484 joined by an outer surface having external threads 124 and a horizontal bore 490 formed therein. The horizontal bore 490 comprises a hex portion 492 that opens in the counterbore 482, as shown in FIGS. 40 and 41. The hex portion 492 is configured to mate with a tool used to thread the front retainer 118 into the housing 60 until it abuts the discharge plug 120, as shown in FIGS. 40 and 41. An annular void 494 is formed within the front surface 488 of the front retainer 118. The annular void 494 decreases the weight of the front retainer 118, making it easier to thread into the housing 60.

Discharge Conduits and Manifold

With reference to FIG. 41, each discharge fitting 108 comprises a support base 502 and a connection end 512. A discharge fitting adapter 504 is installed within the counterbore 106 formed in the upper and lower discharge bores 102 and 104. When installed, the seal 112 engages an outer surface of the fitting adapter 504. A groove 505 is formed with the discharge fitting 108 for receiving a second seal 507. The second seal 507 likewise engages an outer surface of the fitting adapter 504.

Continuing with FIG. 41, the support base 502 is sized to abut the outer intermediate surface 68 of the first section 72 of the housing 60. The support base 502 comprises a plurality of passages 506, shown in FIG. 29, configured to align with the threaded openings 114 formed in the intermediate surface 68 and surrounding the discharges bores 102 and 104. The threaded fasteners 116 are installed within the aligned passages 506 and openings 114 and tightened to secure the discharge fitting 108 to the first section 72.

With reference to FIGS. 3 and 41, the connection end 512 of the discharge fitting 108 is configured to mate within one or more discharge conduits 500 included in an upper or lower discharge manifold 514 or 516, as shown in FIG. 3. The upper and lower discharge manifolds 514 and 516 are supported on rack 518, as shown in FIG. 3. The fluid end assembly 52 is disposed within the interior open area of the rack 518. The rack 518 supports the upper and lower discharge manifolds 514 and 516 in a spaced position from the discharge bores 102 and 104. As a result, each discharge conduit 500 has an angled or bent shape. In operation, fluid discharges from the housing 60 through upper and lower discharge bores 102 and 104 and is carried to the corresponding upper or lower discharge manifolds 514 or 516 by the discharge fittings and conduits 108 and 500.

Suction Conduits and Manifold

Figure 78:
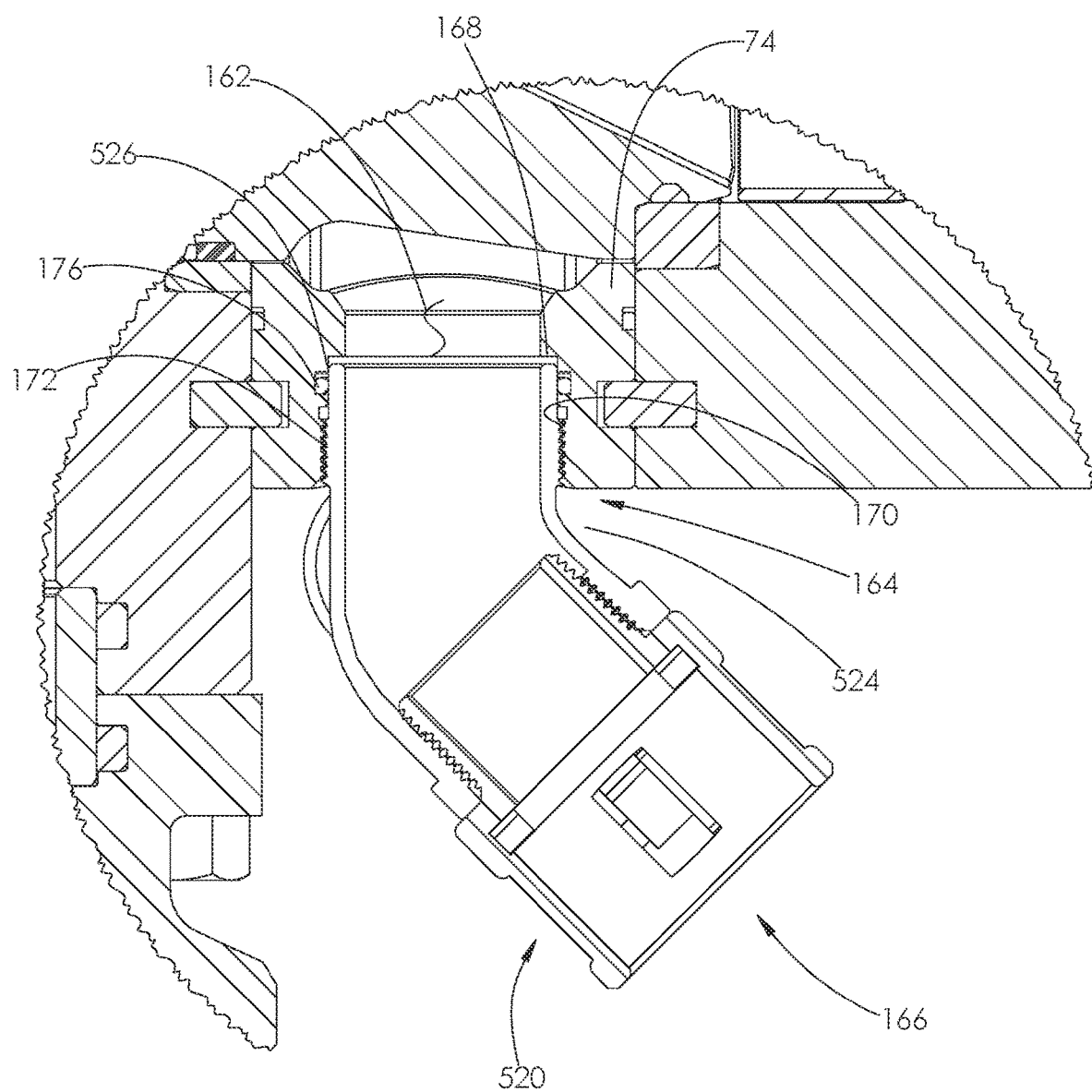
FIG. 78 is an enlarged view of area U shown in FIG. 41.
Figure 79:
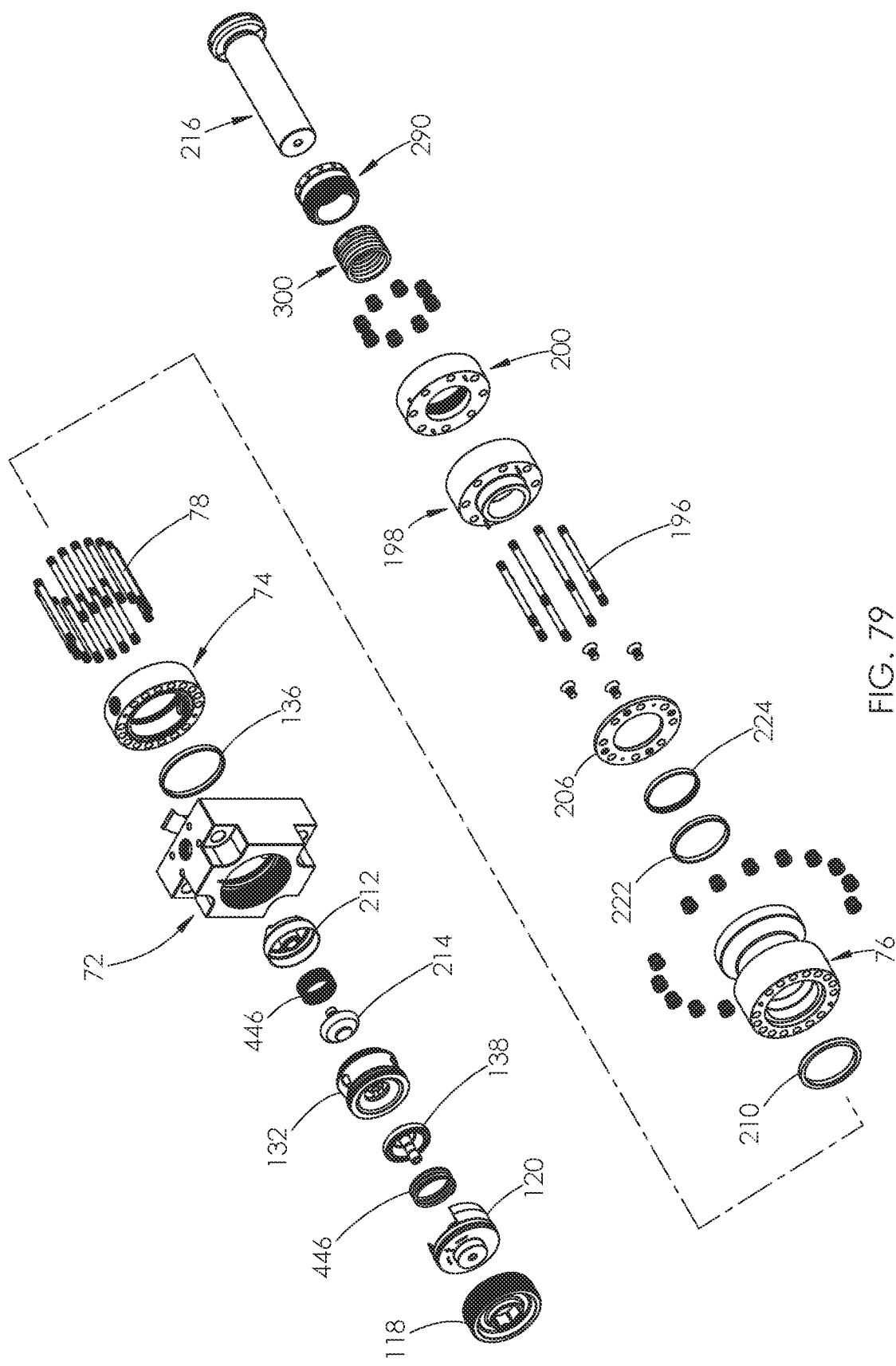
FIG. 79 is a front perspective and exploded view of the fluid end section shown in FIGS. 9, 29, 40, and 41.

With reference to FIGS. 41 and 78, each suction conduit 166 comprises the first connection member 164 joined to a second connection member 520 by threads, as shown in FIG. 78. The first and second connection members 164 and 520 may be made of a metal or hardened material.

Continuing with FIG. 78, the first connection member 164 comprises upper portion 524 joined to a lower portion 526. External threads 172 are formed on a portion of the lower portion 526 for mating with the internal threads 170 formed in the suction bores 160 or 162. The seal 176 installed within the housing 60 engages a cylindrical outer surface of the lower portion 526 below the external threads 172. The upper portion 524 has a larger outer diameter than the lower portion 526 and is positioned outside of the housing 60. The lower portion 526 abuts the counterbore 168 of the suction bores 160 and 162 of the second section 74 of the housing 60.

With reference to FIGS. 3 and 78, the second connection member 520 is configured to mate with one or more connection members or hoses 528 formed on an upper or lower suction manifold 530 or 532. The upper and lower suction manifolds 530 and 532 are supported on the rack 518 adjacent the discharge manifolds 514 and 516. The connection members or hoses 528 may be flexible so that they may bend, as needed, to properly interconnect the suction conduits 166 and the suction manifolds 530 and 532. In operation, fluid is drawn into the housing 60 from the suction manifolds 530 and 532 via the connection members 528, the suction conduits 166, and the upper and lower suction bores 160 and 162.

Assembly of Fluid End Section and Assembly

Turning to FIGS. 9, 29, 79, and 80, prior to assembling the housing 60, the wear ring 136 is preferably first pressed into the counterbore 134 formed in the first section 72 of the housing 60. Likewise, the hardened insert 210 is pressed into the counterbore 208 formed in the third section 76 of the housing 60. The seals 126, 112, and 176 may also be installed within the first and second sections 72 and 74 of the housing 60. The wear ring 222 and seal 224 may also be installed within the third section 76 of the housing 60 prior to assembling the housing 60.

Following installation of the above described components, the housing 60 may be assembled as described above. Thereafter, the retention plates 206, stuffing box 198, rear retainer 200, plunger packing 300, and packing nut 290 may be attached to the rear surface 66 of the housing 60. The inner components of the housing 60 are inserted within the housing 60 through the front surface 64 of the first section 72. The inner component may be installed prior to attaching the components to the rear surface 66 of the housing 60, if desired. Following assembly of each fluid end section 56, each section 56 is attached to the power end assembly 54 using the stay rods 58.

Each fluid end section 56 and its various components are heavy and cumbersome. Various tools or lifting mechanisms may be used to assemble the fluid end assembly 52 and attach it to the power end assembly 54, creating the high pressure pump 50.

Operation of Fluid End Assembly

Turning back to FIGS. 40 and 41, in operation, retraction of the plunger 216 out of the housing 60 pulls fluid from the upper and lower suction bores 160 and 162 into the suction passages 340 within the fluid routing plug 132. Fluid flowing through the suction passages 340 and into the axially-blind bore 342 pushes on the valve insert 432 of the suction valve 214, causing the valve 214 to compress the spring 446 and move to an open position, as shown in FIG. 40. When in the open position, fluid flows around the suction valve 214 and the suction valve guide 212 and into the open horizontal bore 70 within the third section 76 of the housing 60.

Continuing with FIG. 41, extension of the plunger 216 further into the housing 60 pushes against fluid within the open horizontal bore 70 and forces the fluid towards the suction surface 332 of the fluid routing plug 132. Such motion also causes the suction valve 214 to move to a closed position, sealing the opening of the axially-blind bore 342. Because the bore 342 is sealed, fluid is forced into the discharge passages 360.

Fluid flowing through the discharge passages 360 contacts the valve insert 432 on the discharge valve 138, causing the discharge valve 138 to compress the spring 446 and move into an open position, as shown in FIG. 41. When in the open position, fluid flows around the discharge valve 138 and into the upper and lower discharge bores 102 and 104. Because fluid exiting the discharge passages 360 has been compressed by extension of the plunger 216 into the housing 60, such fluid has a higher fluid pressure than that entering the housing 60 through the suction bores 160 and 162.

Figure 1:
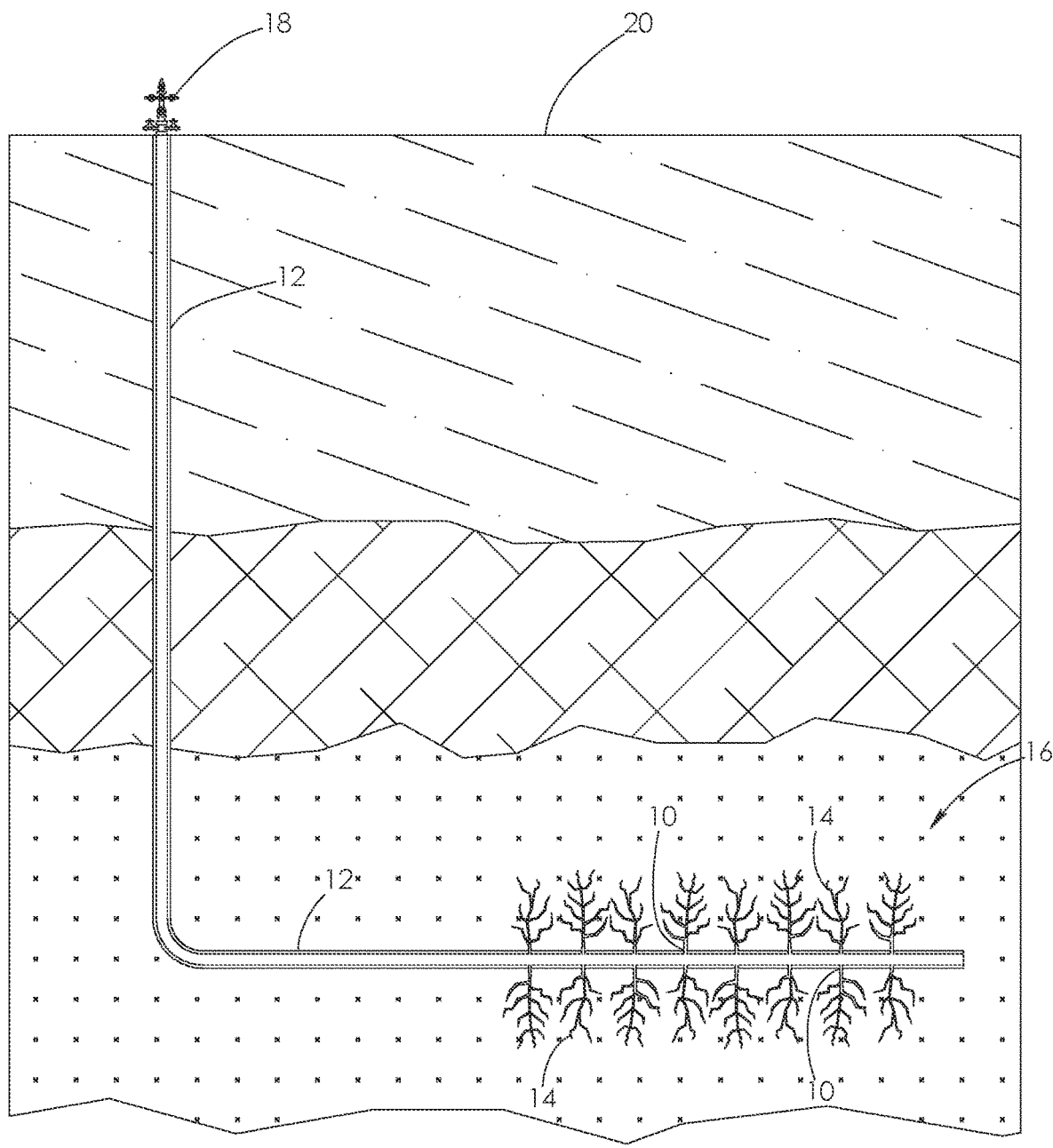
FIG. 1 is an illustration of the underground environment of a hydraulic fracturing operation.
Figure 2:
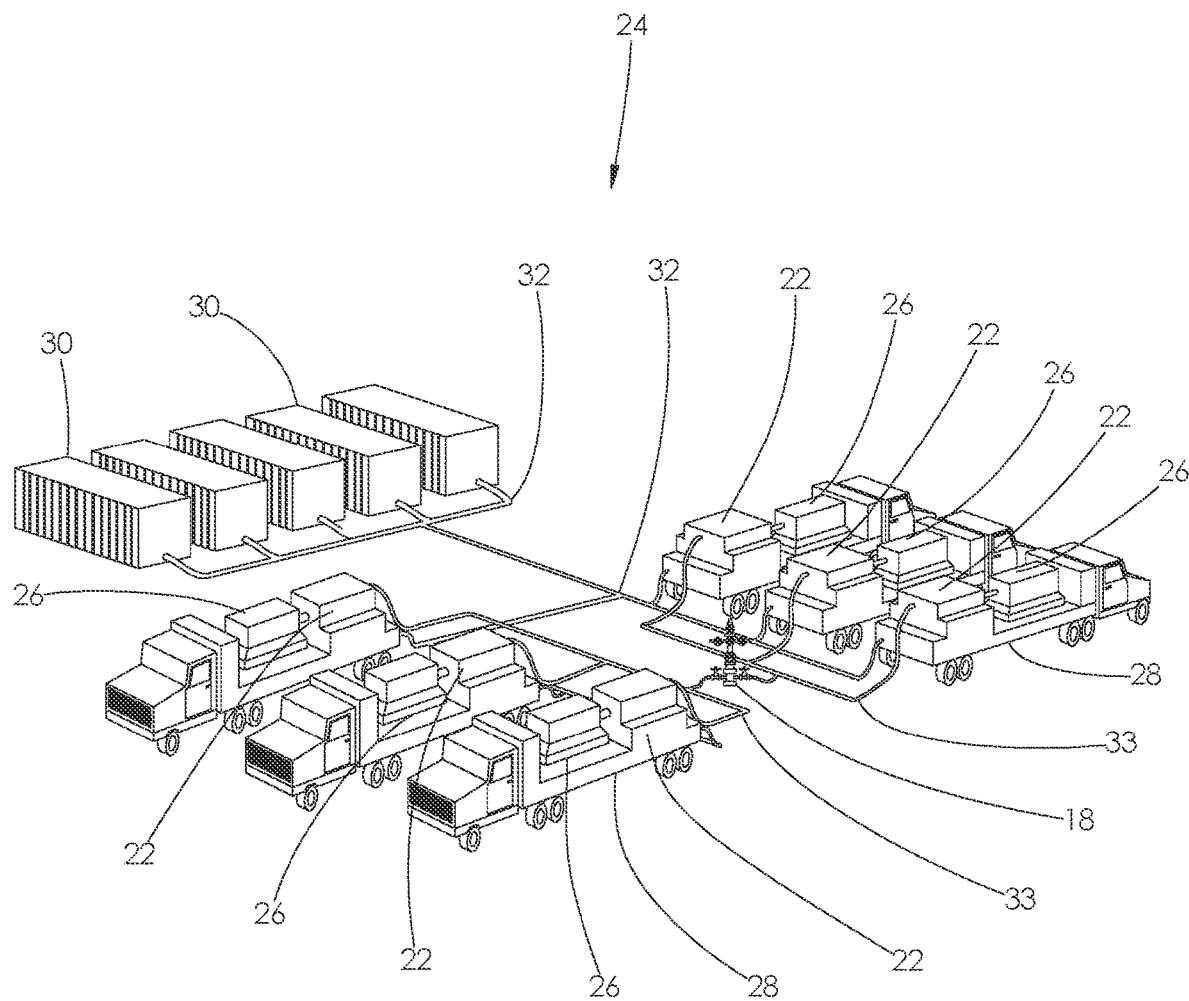
FIG. 2 illustrates above-ground equipment used in a hydraulic fracturing operation.

During operation, the plunger 216 continually reciprocates within the housing 60, pressuring all fluid drawn into the housing 60 through the suction bores 160 and 162. Pressurized fluid exiting the housing 60 through the upper and lower discharge bores 102 and 104 is delivered to the upper and lower discharge manifolds 514 and 516 in communication with each of the fluid end sections 56. Pressurized fluid within the discharge manifolds 514 and 516 is eventually delivered to the wellhead 18, as shown in FIG. 2.

ALTERNATIVE EMBODIMENTS

Turning to FIGS. 81-119, alternative embodiments of fluid routing plugs that may be used with the fluid end assembly 52 are described in more detail. The alternative embodiments of fluid routing plugs are shown installed within alternative embodiments of fluid end sections in FIGS. 81-119. Such fluid end section embodiments are described in more detail in U.S. patent application Ser. No. 17/884,712, authored by Thomas, et al., and filed on Aug. 10, 2022, the entire contents of which are incorporated herein by reference. To the extent any features of the alternative fluid end section embodiments are the same or nearly the same as features of the fluid end section 56, for ease of reference, such features will be given the same reference numbers as those described above. Likewise, to the extent any features of the fluid routing plug 132 and the various fluid routing plug embodiments are the same or nearly the same, such features will be given the same references numbers herein, for ease of reference.

With reference to FIGS. 81-100, another embodiment of a fluid routing plug 600 is shown. The fluid routing plug 600 is installed within another embodiment of a housing 602. The housing 602 comprises an integral first and second section 604 joined to the third section 76, as shown in FIG. 81. The fluid routing plug 600 comprises a body 606 having a suction surface 608 and an opposed discharge surface 610 joined by an outer intermediate surface 612, as shown in FIGS. 84-87. The suction and discharge surfaces 608 and 610 are generally identical to the suction and discharge surfaces 332 and 334 of the fluid routing plug 132.

Continuing with FIGS. 81-100, a central longitudinal axis 613 extends through the body 606 and the suction and discharge surfaces 608 and 610, as shown in FIG. 87. When the fluid routing plug 600 is installed within the housing 602, most of the plug 600 is installed within the integral section 604, but at least a portion of the suction surface 608 is positioned within the third section 76 of the housing 602, as shown in FIG. 81.

Continuing with FIGS. 84-100, the body 606 further comprises a plurality of suction fluid passages 614. The suction passages 614 interconnect the intermediate surface 612 and the suction surface 608 of the body 606, as shown in FIG. 87. The connection is formed within an axially-blind bore 616 formed within the suction surface 608 of the body 606. The suction passages 614 are generally identical to the suction passages 340 formed in the fluid routing plug 132, but the passages 614 are oriented differently within the body 606.

Continuing with FIGS. 88 and 89, an opening 618 of each suction passage 614 on the intermediate surface 612 comprises a first side wall 620 joined to a second side wall 622 by first and second ends 624 and 626. The first and second side walls 620 and 622 are straight lines of equal length S, and the first and second ends 624 and 626 are circular arcs, as shown in FIG. 89.

Continuing with FIG. 89, the first end 624 of the opening 618 has a radius of R1 with a center at C1, and the second end 626 has a radius of R2 with a center at C2. The first end 624 is larger than the second end 626 such that R1>R2. The first and second side walls 620 and 622 are tangent to the first and second ends 624 and 626 and have an included angle, σ. The opening 618 is oriented such that the center C1 of the first end 624 is a perpendicular distance D from the central longitudinal axis 613.

Continuing with FIG. 89, the opening 618 has a centerline 628 that connects the centers C1 and C2 of the first and second ends 624 and 626. The centerline 628 has a length E and forms an angle x with the central longitudinal axis 613, further orienting the opening 618. A cross-sectional shape of each suction passage 614 throughout the length of the body 606 corresponds with the shape of each opening 618, as shown in FIGS. 84 and 87. Each suction passage 614 is sized and shaped to maximize fluid flow through the passage 614 and minimize fluid turbulence and stress to the body 606 of the fluid routing plug 600.

With reference to FIGS. 91 and 97, each suction fluid passage 614 extends between the axially-blind bore 616 and the intermediate surface 612 such that each suction passage 614 comprises a first longitudinal axis 630 and a second longitudinal axis 632. The first longitudinal axis 630 extends through the center C1 of the first end 624 of the opening 618, as shown in FIG. 89. Like the center C1, the first longitudinal axis 630 is offset a perpendicular distance D from the central longitudinal axis 613. The first longitudinal axis 630 does not intersect, is not parallel to, and is not co-planar with the central longitudinal axis 613.

The second longitudinal axis 632 extends through point P, shown on FIG. 91. The second longitudinal axis 632 may intersect and be co-planar with the central longitudinal axis 613, as shown in FIGS. 91 and 97. The configuration of the suction passages 614 encourages a vortex type fluid flow about the central longitudinal axis 613 of the body 606, thereby reducing fluid turbulence and erosion during operation.

Continuing with FIGS. 85-87, the body 606 further comprises a plurality of discharge fluid passages 634. The discharge passages 634 interconnect the suction surface 608 and the discharge surface 610 of the body 606 and do not intersect any of the suction passages 614. The discharge passages 634 are generally identical to the discharge passages 360 formed in the fluid routing plug 132, but the passages 634 are oriented differently within the body 606.

With reference to FIGS. 85, 86, 90, 92, and 93, each discharge passage 634 opens at a first opening 636 on an outer rim 638 of the suction surface 608, as shown in FIGS. 92 and 93, and opens at a second opening 640 on a central base 642 of the discharge surface 610, as shown in FIGS. 85 and 86. A position of the first and second openings 636 and 640 of each discharge passage 634 may be determined relative to a plane containing a line 644 that is perpendicular to the central longitudinal axis 613, as shown in FIG. 90. The first opening 636, when projected onto the plane, is positioned at a first distance F1 from the central longitudinal axis 613 and at a first angle φ1 relative to the line 644. The second opening 640, when projected onto the plane, is positioned at a second distance F2 from the central longitudinal axis 613 and at a second angle φ2 relative to the line 644.

The first and second distances F1 and F2 shown in FIG. 90 are different. Likewise, the first and second angles φ1 and φ2 shown in FIG. 90 are different. In alternative embodiments, the first and second angles φ1 and φ2 may be different. In further alternative embodiments, the first and second angles φ1 and φ2 may be the same, but the first and second distances F1 and F2 may be different. In even further alternative embodiments, the first and second distances F1 and F2 may be the same, and the first and second angles φ1 and φ2 may be the same.

With reference to FIGS. 94-100, each discharge passage 634 has an arced cross-sectional shape. The length of the arc may gradually increase between the suction and discharge surfaces 608 and 610, as shown in FIGS. 94-96. At least a portion of each discharge passage 634 intersects a plane containing the central longitudinal axis 613 of the body 606, as shown in FIG. 97.

Continuing with FIGS. 97-100, the configuration of the discharge passages 634 encourages a vortex type flow of fluid about the central longitudinal axis 613 of the body 606, thereby reducing fluid turbulence during operation. The shape of each discharge passage 634 thus maximizes fluid flow and minimizes stress to the body 606 of the fluid routing plug 600 during operation.

Turning to back FIG. 87, the intermediate surface 612 comprises a first sealing surface 650 positioned adjacent the discharge surface 610 and a second sealing surface 652 positioned adjacent the suction surface 608. The first and second sealing surfaces 650 and 652 each extend around the entire intermediate surface 612 in an endless manner and surround the longitudinal axis 613 of the body 606.

Turning back to FIG. 81, the first sealing surface 650 engages a first seal 654 installed within a groove 656 formed in the integral section 604 of the housing 602. The second sealing surface 652 engages a second seal 660 installed within the counterbore 208 formed in the third section 76 of the housing 602. The second seal 660 is surrounded by a wear ring 662. Engagement of the first and second sealing surfaces 650 and 652 with the first and second seals 654 and 660 prevents fluid from leaking around the fluid routing plug 600 during operation. Because the first and second seals 654 and 660 are installed within the housing 602, no grooves are formed in the fluid routing plug 600 for housing a seal.

Continuing with FIG. 87, the intermediate surface 612 of the fluid routing plug 600 further comprises a first bevel 664 and a second bevel 666. The first bevel 664 is positioned between the first sealing surface 650 and the suction passages 614, and the second bevel 666 is positioned between the suction passages 614 and the second sealing surface 652. The bevels 664 and 666 are configured to engage the first and second beveled surfaces 668 and 670 formed in the walls of the integral section 604 of the housing 602, as shown in FIGS. 82 and 83. Axial movement of the fluid routing plug 600 towards the stuffing box 198 is prevented by engagement of the first and second bevels 664 and 666 with the first and second beveled surfaces 668 and 670, as shown in FIG. 81.

Continuing with FIG. 82, when the fluid routing plug 600 is installed within the housing 602, the first bevel 664 seats against the first beveled surface 668. The bevel 664 and the beveled surface 668 meet at a non-right angle. Such angle reduces stress in the fluid routing plug 600 and the housing 602 during operation. The bevel 664 and the beveled surface 668 remain engaged during the forward and backwards stroke of the plunger 216.

Turning to FIG. 83, in contrast to the first bevel 664, the second bevel 666 is sized to be spaced from the second beveled surface 670 when the fluid routing plug 600 is initially installed within the housing 602, as shown by a gap 672. The gap 672 provides space for the fluid routing plug 600 to expand during operation.

As the plunger 216 retracts backwards away from the housing 602, a significant amount of load is applied to the first bevel 664. The applied load causes the fluid routing plug 600 and the integral section 604 to deform, allowing the second bevel 666 to eventually engage the second beveled surface 670. Upon engaging the second beveled surface 670, the load being applied to the first bevel 664 is shared with the second bevel 666, thereby decreasing the load applied to the first bevel 664. Without the gap 672, the fluid routing plug 600 may not have enough room to deform, potentially causing damage to the fluid routing plug 600 and the housing 602 over time.

As the plunger 216 extends forward into the housing 602, the second bevel 666 will return to its deformed state, re-creating the gap 672. The gap 672 will repeatedly be created and closed during operation as the plunger 216 reciprocates. In addition to providing space for the fluid routing plug 600 to deform, the gap 672 also provides a gas and fluid relief area during the forward stroke of the plunger 216.

Continuing with FIG. 82, the intermediate surface 612 of the fluid routing plug 600 further comprises a transition bevel 674. The transition bevel 674 extends between the first sealing surface 650 and the first bevel 664, as shown in FIG. 87. The transition bevel 674 does not engage the first beveled surface 668. The transition bevel 674 helps reduce friction between the fluid routing plug 600 and the housing 602 during installation.

Turning to FIG. 101, another embodiment of a housing 682 having the fluid routing plug 600 installed therein is shown. The housing 682 is identical to the housing 602, but the integral section 604 has been split into a first section 684 joined to a second section 686 by a plurality of fasteners (not shown). Splitting the integral section 604 into two sections allows a wear ring 688 to be installed within a counterbore 690 formed in the first section 684. The first seal 654 is also installed within the counterbore 690. The wear ring 668 surrounds the first seal 654 and provides a barrier between the walls of the housing 682 and the first seal 654, during operation. The wear ring 688 and the first seal 654 are held within the counterbore 690 by joining the second section 686 to the first section 684 of the housing 682. During operation, if either the first seal 654 or the wear ring 688 beings to wear and erode, the first seal 654 and/or the wear ring 688 can be removed and replaced with a new first seal 654 and/or wear ring 688. Using the wear ring 688 helps prevent wear or damage to the housing 682 during operation.

Turning to FIGS. 102 and 103, another embodiment of a fluid routing plug 700 is shown. The fluid routing plug 700 is shown installed within the housing 682. The fluid routing plug 700 is identical to the fluid routing plug 600, but it comprises another embodiment of an intermediate surface 702. Instead of a first sealing surface 650, the intermediate surface 702 comprises a first groove 704 for housing the first seal 654. Thus, the first seal 654 is installed within the fluid routing plug 700 instead of the counterbore 690. The counterbore 690 only houses the wear ring 688. Thus, the counterbore 690 may vary in size depending on components to be installed therein. The first seal 654 engages the wear ring 688 installed within the counterbore 690. During operation, if either the first seal 654 or the wear ring 688 beings to wear and erode, the first seal 654 and/or the wear ring 688 can be removed and replaced with a new first seal 654 and/or wear ring 688.

Turning to FIGS. 104 and 105, another embodiment of a fluid routing plug 750 is shown installed within the housing 602. The fluid routing plug 750 is identical to the fluid routing plug 600, but it comprises another embodiment of an intermediate surface 752. Instead of a second sealing surface 652, the intermediate surface 752 comprises a second groove 754 for housing the second seal 660. Thus, the second seal 660 is installed within the fluid routing plug 750 instead of the counterbore 208 of the third section 76. Only the wear ring 662 is installed within the counterbore 208. The second seal 660 engages the wear ring 662. During operation, if either the second seal 660 or the wear ring 662 begins to wear and erode, the second seal 660 and/or the wear ring 662 can be removed and replaced with a new second seal 660 and/or wear ring 662. In alternative embodiments, a fluid routing plug may have both the first and second seals 654 and 660 installed within grooves formed in the fluid routing plug.

Turning to FIGS. 106-112, another embodiment of a fluid routing plug 800 is shown. The fluid routing plug Boo is identical to the fluid routing plug 600, but it comprises another embodiment of an intermediate surface 802. The fluid routing plug 800 is shown installed within another embodiment of a housing 804. The housing 804 is identical to the housing 60, but it includes another embodiment of a second section 806. An outer intermediate surface of the second section 806 is shaped like the second section 686, shown in FIG. 100, but the interior walls of the second section 806 are modified, as described below.

Continuing with FIGS. 107-112, instead of the first bevel 664, the intermediate surface 802 of the fluid routing plug 800 comprises a cylindrical section 808 joined to a transition section 810 by a landing bevel 812, as shown in FIG. 112. The cylindrical section 808 and the landing bevel 812 are configured to engage a landing bevel counterbore 814 formed in the second section 806 of the housing 804, as shown in FIG. 111.

Continuing with FIG. 111, the landing bevel 812 is configured to only contact the landing bevel counterbore 814 at a single point or very small engagement length. The cross-sectional profile of the landing bevel 812 is thus characterized as a splined curve. In operation, the varying fluid pressures in and around the fluid routing plug 800 cause the plug 800 to stretch or deform as the plunger 216 reciprocates. The landing bevel 812 and landing bevel counterbore 814 are sized so that the surfaces more fully engage as the fluid routing plug 800 stretches or deforms during operation. Such engagement supports the housing 804 and fluid routing plug Boo when in their highest state of loading, thereby reducing stress and increasing the life span of such components.

Continuing with FIGS. 106-110, the intermediate surface 802 further comprises the first groove 704 for housing the first seal 654, as shown in FIG. 111, and comprises the second sealing surface 652. However, the fluid routing plug 800 does not comprise the second bevel 666. The intermediate surface 802 merely tapers outwardly from the transition section 810 to the second sealing surface 652. The intermediate surface 802 between the suction passages 314 and the second sealing surface 652 is sized to closely face the walls of the second section 806 of the housing 804. Axial movement of the fluid routing plug 800 within the housing 804 is prevented by engagement of the landing bevel 812 and the landing bevel counterbore 814, as shown in FIG. 111.

Turning to FIGS. 113-119, another embodiment of a fluid routing plug 900 is shown. The fluid routing plug 900 is identical to the fluid routing plug 800, but it comprises another embodiment of an intermediate surface 902. The intermediate surface 902 is like the intermediate surface 802, with a few modifications. The fluid routing plug 900 is shown installed within another embodiment of a housing 904. The housing 904 is identical to the housing 60, but it comprises another embodiment of a second section 906.

Continuing with FIGS. 114-119, the intermediate surface 902 comprises a cylindrical section 908 joined to a transition section 910 by a landing bevel 912. In contrast to the landing bevel 812, the landing bevel 912 joins the cylindrical section 908 at a sharper angle. However, at least a portion of the landing bevel 912 is still a splined curve. A relief 914 is also formed in the walls of the housing 904 adjacent a landing bevel counterbore 916. The relief 914 allows the landing bevel counterbore 916 to be formed in the walls of the housing 904 at a sharper angle. The shape of the landing bevel counterbore 916 is a straight bevel. The modified configuration of the landing bevel 912 and the landing bevel counterbore 916 allows the surfaces to more fully engage during operation. Specifically, more surface area of the landing bevel 912 engages more surface area of the landing bevel counterbore 916 as the fluid routing plug 900 stretches and deforms during operation. Distributing the load during operation over a larger surface area reduces the stresses within the housing 904 and the fluid routing plug 900.

Continuing with FIGS. 114-119, a first groove 918 for housing a first seal 920 is formed within the cylindrical section 908. In contrast to the first groove 704, the first groove 918 extends a greater length of the cylindrical section 908 and houses a larger first seal 920. By increasing the size of the seal 920 installed within the fluid routing plug 900, the area of the intermediate surface 902 contacted by high pressure fluid is reduced, thereby reducing the total stress applied to the fluid routing plug 900 during operation.

Continuing with FIGS. 114-119, the transition section 910 of the intermediate surface 902 has a smaller outer diameter than that of the fluid routing plug 800. The smaller diameter increases the size of the annular fluid channel 412 formed between the fluid routing plug 900 and the walls of the housing 904 surrounding the suction bores 160 and 162, as shown in FIG. 113. The walls of the housing 904 surrounding the suction bores 160 and 162 may include one or more bevels 922 to further increase the size of the annular fluid channel 412. The increase in size of the annular fluid channel 412 helps optimize fluid flow within the housing 094.

Continuing with FIGS. 117 and 119, to account for the smaller diameter of the transition section 910, the intermediate surface 902 further comprises a step 924 positioned between the suction passages 614 and the second sealing surface 652, as shown in FIG. 117. The step 924 increases the outer diameter of the intermediate surface 902 so that the second sealing surface 652 engages the second seal 660, as shown in FIG. 113.

The fluid routing plugs and corresponding fluid end sections described herein have various embodiments of fluid passages, intermediate surfaces, and corresponding housing sections. While not specifically shown in a figure herein, various features from one fluid routing plug or fluid end section embodiment may be included in another fluid end section embodiment.

In alternative embodiments, features of one of the various fluid routing plugs and corresponding housings described in the '529 application, previously incorporated herein by reference, may be included in one or more of the various fluid routing plugs and/or housings described herein. One of skill in the art will appreciate that the various housing and components described herein may have different shapes and sizes, depending on the shape and size of the various components chosen to assemble each fluid end section.

One or more kits may be useful in assembling a fluid end assembly out of the various fluid end sections described herein. A single kit may comprise a plurality of one of the various embodiments of housings and fasteners described herein. The kit may further comprise a plurality of one or more of the various inner components described herein. The kit may even further comprise a plurality of one or more of the various components attached to the various housings described herein.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A fluid routing plug, comprising:
a body having a suction surface and an opposed discharge surface joined by an outer intermediate surface;
in which the body has a central longitudinal axis that extends through the suction and discharges surfaces;
in which the suction surface is configured to engage a suction valve supported by a suction valve guide; in which the suction surface comprises a central opening joined to an outer rim by a tapered surface; in which the tapered surface is configured to engage the suction valve;
in which the discharge surface is configured to engage a discharge valve;
a plurality of suction passages formed within the body, each suction passage having an opening on the intermediate surface of the body; and
a plurality of discharge passages formed within the body;
in which each of the discharge passages has an opening on the outer rim of the suction surface;
in which the outer intermediate surface of the body comprises:
an annular shoulder positioned between the opening of each suction passage and the suction surface of the body;
in which the annular shoulder is configured to engage an annular insert such that the annular insert is in a spaced-relationship with the suction valve guide.

2. The fluid routing plug of claim 1, in which the outer intermediate surface further comprises:

a first groove formed in the outer intermediate surface of the body adjacent the discharge surface and surrounding the longitudinal axis, the first groove configured to receive a seal; and a second groove formed in the outer intermediate surface of the body adjacent the annular shoulder and surrounding the longitudinal axis, the second groove configured to receive a seal.

3. The fluid routing plug of claim 1, in which a portion of the outer intermediate surface of the body positioned between the opening of each suction passage and the annular shoulder has a first outer diameter; in which the annular insert has a second outer diameter; and in which the second outer diameter is greater than the first outer diameter.

4. The fluid routing plug of claim 1, in which the discharge surface has a first outer diameter and the suction surface has a second outer diameter; and in which the first outer diameter is greater than the second outer diameter.

5. The fluid routing plug of claim 1, in which the outer intermediate surface further comprises:
a first groove formed in the outer intermediate surface of the body adjacent the discharge surface and surrounding the longitudinal axis;
in which the fluid routing plug further comprises:
a seal installed within the first groove, the seal configured to engage a wear ring.

6. The fluid routing plug of claim 5, in which the discharge valve is supported by a discharge valve guide such that the discharge valve guide is in a spaced relationship with the wear ring.

7. The fluid routing plug of claim 1, in which the outer intermediate surface further comprises:
a first groove formed in the outer intermediate surface of the body adjacent the discharge surface and surrounding the longitudinal axis, the first groove configured to receive a seal; and
in which a first portion of the outer intermediate surface of the body positioned between the opening of each suction passage and the first groove has a first outer diameter;
in which a second portion of the outer intermediate surface of the body positioned between the first groove and the discharge surface has a second outer diameter; and
in which the first outer diameter is equal to the second outer diameter.

8. The fluid routing plug of claim 1, further comprising:
a threaded blind bore formed in the body and opening on the discharge surface.

9. The fluid routing plug of claim 1, in which the suction valve guide is in a spaced-relationship with the suction surface of the body.

10. A fluid routing plug, comprising:
a body having a suction surface and an opposed discharge surface joined by an outer intermediate surface;
in which the body has a central longitudinal axis that extends through the suction and discharges surfaces;
in which the suction surface is configured to engage a suction valve supported by a suction valve guide;
in which the discharge surface is configured to engage a discharge valve;
a plurality of suction passages formed within the body, each suction passage having an opening on the outer intermediate surface of the body;
a plurality of discharge passages formed within the body; and a threaded blind bore formed in the body and opening on the discharge surface;
in which the outer intermediate surface of the body comprises:
an annular shoulder positioned between the opening of each suction passage and the suction surface of the body;
in which the annular shoulder is configured to engage an annular insert; and
in which the annular insert is a separate component from the suction valve guide.

11. The fluid routing plug of claim 10, in which the outer intermediate surface further comprises:
a first groove formed in the outer intermediate surface of the body adjacent the discharge surface and surrounding the longitudinal axis, the first groove configured to receive a seal; and
a second groove formed in the outer intermediate surface of the body adjacent the annular shoulder and surrounding the longitudinal axis, the second groove configured to receive a seal.

12. The fluid routing plug of claim 10, in which a portion of the outer intermediate surface of the body positioned between the opening of each suction passage and the annular shoulder has a first outer diameter; in which the annular insert has a second outer diameter; and in which the second outer diameter is greater than the first outer diameter.

13. The fluid routing plug of claim 10, in which the discharge surface has a first outer diameter and the suction surface has a second outer diameter; and in which the first outer diameter is greater than the second outer diameter.

14. The fluid routing plug of claim 10, in which the outer intermediate surface further comprises:
a first groove formed in the outer intermediate surface of the body adjacent the discharge surface and surrounding the longitudinal axis;
in which the fluid routing plug further comprises:
a seal installed within the first groove, the seal configured to engage a wear ring.

15. The fluid routing plug of claim 14, in which the discharge valve is supported by a discharge valve guide; and in which the discharge valve guide is a separate component from the wear ring.

16. The fluid routing plug of claim 10, in which the suction surface comprises a central opening joined to an outer rim by a tapered surface; in which the tapered surface is configured to engage the suction valve; and in which each of the discharge passages has an opening on the outer rim of the suction surface.

17. The fluid routing plug of claim 10, in which the outer intermediate surface further comprises:
a first groove formed in the outer intermediate surface of the body adjacent the discharge surface and surrounding the longitudinal axis, the first groove configured to receive a seal; and
in which a first portion of the outer intermediate surface of the body positioned between the opening of each suction passage and the first groove has a first outer diameter;
in which a second portion of the outer intermediate surface of the body positioned between the first groove and the discharge surface has a second outer diameter; and
in which the first outer diameter is equal to the second outer diameter.

18. The fluid routing plug of claim 10, in which the suction valve guide is in a spaced-relationship with the suction surface of the body.

19. A fluid routing plug, comprising:
- a body having a suction surface and an opposed discharge surface joined by an outer intermediate surface;
- in which the body has a central longitudinal axis that extends through the suction and discharges surfaces;
- in which the suction surface is configured to engage a suction valve supported by a suction valve guide;
- in which the discharge surface is configured to engage a discharge valve;
- a plurality of suction passages formed within the body, each suction passage having an opening on the intermediate surface of the body;
- a plurality of discharge passages formed within the body; and
- a threaded blind bore formed in the body and opening on the discharge surface;
- in which the outer intermediate surface of the body comprises:
- an annular shoulder positioned between the opening of each suction passage and the suction surface of the body;
- in which the annular shoulder is configured to engage an annular insert such that the annular insert is in a spaced-relationship with the suction valve guide.

20. A fluid routing plug, comprising:
- a body having a suction surface and an opposed discharge surface joined by an outer intermediate surface;
- in which the body has a central longitudinal axis that extends through the suction and discharges surfaces;
- in which the suction surface is configured to engage a suction valve supported by a suction valve guide; in which the suction surface comprises a central opening joined to an outer rim by a tapered surface; in which the tapered surface is configured to engage the suction valve;
- in which the discharge surface is configured to engage a discharge valve;
- a plurality of suction passages formed within the body, each suction passage having an opening on the outer intermediate surface of the body; and
- a plurality of discharge passages formed within the body; in which each of the discharge passages has an opening on the outer rim of the suction surface;
- in which the outer intermediate surface of the body comprises:
- an annular shoulder positioned between the opening of each suction passage and the suction surface of the body;
- in which the annular shoulder is configured to engage an annular insert; and
- in which the annular insert is a separate component from the suction valve guide.

* * * * *